US010768936B2

(12) United States Patent
Burger et al.

(10) Patent No.: US 10,768,936 B2
(45) Date of Patent: Sep. 8, 2020

(54) BLOCK-BASED PROCESSOR INCLUDING TOPOLOGY AND CONTROL REGISTERS TO INDICATE RESOURCE SHARING AND SIZE OF LOGICAL PROCESSOR

(71) Applicant: Microsoft Technology Licensing, LLC, Redmond, WA (US)

(72) Inventors: Douglas C. Burger, Bellevue, WA (US); Aaron L. Smith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/998,146

(22) Filed: Dec. 23, 2015

(65) Prior Publication Data

US 2017/0083334 A1    Mar. 23, 2017

Related U.S. Application Data

(60) Provisional application No. 62/221,003, filed on Sep. 19, 2015.

(51) Int. Cl.
*G06F 15/82* (2006.01)
*G06F 9/30* (2018.01)
(Continued)

(52) U.S. Cl.
CPC ............ *G06F 9/3016* (2013.01); *G06F 9/268* (2013.01); *G06F 9/3004* (2013.01);
(Continued)

(58) Field of Classification Search
CPC .... G06F 9/3842; G06F 9/5061; G06F 9/5066; G06F 9/5077; G06F 15/825
See application file for complete search history.

(56) References Cited

U.S. PATENT DOCUMENTS

| | | | |
|---|---|---|---|
| 5,317,734 A | 5/1994 | Gupta | |
| 5,615,350 A | 3/1997 | Hesson | |

(Continued)

FOREIGN PATENT DOCUMENTS

| | | |
|---|---|---|
| CN | 102096579 | 6/2011 |
| CN | 104310225 | 1/2015 |

(Continued)

OTHER PUBLICATIONS

Behnam Robatmili, Katherine E. Coons, Doug Burger, Kathryn S. McKinley. "Strategies for mapping dataflow blocks to distributed hardware" Microarchitecture, 2008. MICRO-41. 2008 41st IEEE/ACM International Symposium on.*

(Continued)

*Primary Examiner* — Jacob Petranek
(74) *Attorney, Agent, or Firm* — Klarquist Sparkman, LLP

(57) ABSTRACT

Systems, apparatuses, and methods related to a block-based processor core topology register are disclosed. In one example of the disclosed technology, a processor can include a plurality of block-based processor cores for executing a program including a plurality of instruction blocks. A respective block-based processor core can include a sharable resource and a programmable composition topology register. The programmable composition topology register can be used to assign a group of the physical processor cores that share the sharable resource.

17 Claims, 18 Drawing Sheets

(51) Int. Cl.

| | | |
|---|---|---|
| *G06F 9/38* | (2018.01) | |
| *G06F 9/46* | (2006.01) | |
| *G06F 9/52* | (2006.01) | |
| *G06F 11/36* | (2006.01) | |
| *G06F 15/78* | (2006.01) | |
| *G06F 9/26* | (2006.01) | |
| *G06F 9/32* | (2018.01) | |
| *G06F 9/345* | (2018.01) | |
| *G06F 9/35* | (2018.01) | |
| *G06F 12/0806* | (2016.01) | |
| *G06F 12/0862* | (2016.01) | |
| *G06F 12/1009* | (2016.01) | |
| *G06F 13/42* | (2006.01) | |
| *G06F 15/80* | (2006.01) | |
| *G06F 9/355* | (2018.01) | |
| *G06F 12/0811* | (2016.01) | |
| *G06F 12/0875* | (2016.01) | |

(52) U.S. Cl.
CPC ........ *G06F 9/3005* (2013.01); *G06F 9/30007* (2013.01); *G06F 9/3009* (2013.01); *G06F 9/30021* (2013.01); *G06F 9/30036* (2013.01); *G06F 9/30043* (2013.01); *G06F 9/30047* (2013.01); *G06F 9/30058* (2013.01); *G06F 9/30072* (2013.01); *G06F 9/30076* (2013.01); *G06F 9/30087* (2013.01); *G06F 9/30098* (2013.01); *G06F 9/30101* (2013.01); *G06F 9/30105* (2013.01); *G06F 9/30138* (2013.01); *G06F 9/30145* (2013.01); *G06F 9/30167* (2013.01); *G06F 9/30189* (2013.01); *G06F 9/32* (2013.01); *G06F 9/345* (2013.01); *G06F 9/35* (2013.01); *G06F 9/3802* (2013.01); *G06F 9/383* (2013.01); *G06F 9/3804* (2013.01); *G06F 9/3822* (2013.01); *G06F 9/3824* (2013.01); *G06F 9/3828* (2013.01); *G06F 9/3836* (2013.01); *G06F 9/3838* (2013.01); *G06F 9/3842* (2013.01); *G06F 9/3848* (2013.01); *G06F 9/3851* (2013.01); *G06F 9/3853* (2013.01); *G06F 9/3855* (2013.01); *G06F 9/3859* (2013.01); *G06F 9/3867* (2013.01); *G06F 9/3891* (2013.01); *G06F 9/466* (2013.01); *G06F 9/528* (2013.01); *G06F 11/36* (2013.01); *G06F 11/3648* (2013.01); *G06F 11/3656* (2013.01); *G06F 12/0806* (2013.01); *G06F 12/0862* (2013.01); *G06F 12/1009* (2013.01); *G06F 13/4221* (2013.01); *G06F 15/7867* (2013.01); *G06F 15/80* (2013.01); *G06F 15/8007* (2013.01); *G06F 9/3013* (2013.01); *G06F 9/321* (2013.01); *G06F 9/355* (2013.01); *G06F 9/3557* (2013.01); *G06F 12/0811* (2013.01); *G06F 12/0875* (2013.01); *G06F 2212/452* (2013.01); *G06F 2212/602* (2013.01); *G06F 2212/604* (2013.01); *G06F 2212/62* (2013.01); *Y02D 10/13* (2018.01); *Y02D 10/14* (2018.01); *Y02D 10/151* (2018.01)

(56) References Cited

U.S. PATENT DOCUMENTS

| | | |
|---|---|---|
| 5,669,001 A | 9/1997 | Moreno |
| 5,729,228 A | 3/1998 | Franaszek et al. |
| 5,790,822 A | 8/1998 | Sheaffer et al. |
| 5,796,997 A | 8/1998 | Lesartre et al. |
| 5,845,103 A | 12/1998 | Sodani et al. |
| 5,905,893 A | 5/1999 | Worrell |
| 5,917,505 A | 6/1999 | Larson |
| 5,943,501 A | 8/1999 | Burger et al. |
| 6,016,399 A | 1/2000 | Chang |
| 6,061,776 A | 5/2000 | Burger et al. |
| 6,161,170 A | 12/2000 | Burger et al. |
| 6,164,841 A | 12/2000 | Mattson et al. |
| 6,178,498 B1 | 1/2001 | Sharangpani et al. |
| 6,240,510 B1 | 5/2001 | Yeh et al. |
| 6,275,919 B1 | 8/2001 | Johnson |
| 6,282,708 B1 | 8/2001 | Augusteijn et al. |
| 6,301,673 B1 | 10/2001 | Foster et al. |
| 6,314,493 B1 | 11/2001 | Luick |
| 6,353,883 B1 | 3/2002 | Grochowski et al. |
| 6,453,344 B1 | 9/2002 | Ellsworth et al. |
| 6,493,820 B2 | 12/2002 | Akkary et al. |
| 6,529,922 B1 | 3/2003 | Hoge |
| 6,662,294 B1 | 12/2003 | Kahle et al. |
| 6,820,192 B2 | 11/2004 | Cho et al. |
| 6,877,059 B2 | 4/2005 | Solomon et al. |
| 6,892,292 B2 | 5/2005 | Henkel et al. |
| 6,918,032 B1 | 7/2005 | Abdallah et al. |
| 6,934,254 B2 | 8/2005 | Brown et al. |
| 6,957,435 B2 | 10/2005 | Armstrong et al. |
| 6,965,969 B2 | 11/2005 | Burger et al. |
| 6,988,183 B1 | 1/2006 | Wong |
| 6,993,640 B2 | 1/2006 | Doing et al. |
| 6,996,698 B2 | 2/2006 | Slegal et al. |
| 7,032,217 B2 | 4/2006 | Wu |
| 7,036,036 B2 | 4/2006 | Vorbach et al. |
| 7,051,188 B1 | 5/2006 | Kubala et al. |
| 7,085,919 B2 | 8/2006 | Grochowski et al. |
| 7,095,343 B2 | 8/2006 | Xie et al. |
| 7,228,402 B2 | 6/2007 | Rychlik et al. |
| 7,284,100 B2 | 10/2007 | Slegal et al. |
| 7,299,458 B2 | 11/2007 | Hammes |
| 7,302,543 B2 | 11/2007 | Lekatsas et al. |
| 7,380,038 B2 | 5/2008 | Gray |
| 7,389,403 B1 | 6/2008 | Alpert et al. |
| 7,392,524 B2 | 6/2008 | Ault et al. |
| 7,487,340 B2 | 2/2009 | Luick |
| 7,526,637 B2 | 4/2009 | Jung et al. |
| 7,587,578 B2 | 9/2009 | Isobe |
| 7,624,386 B2 | 11/2009 | Robison |
| 7,664,940 B2 | 2/2010 | Conklin et al. |
| 7,676,650 B2 | 3/2010 | Ukai |
| 7,676,669 B2 | 3/2010 | Ohwada |
| 7,685,354 B1 | 3/2010 | Hetherington et al. |
| 7,802,073 B1 | 9/2010 | Cheng et al. |
| 7,836,289 B2 | 11/2010 | Tani |
| 7,853,777 B2 | 12/2010 | Jones et al. |
| 7,873,776 B2 | 1/2011 | Hetherington et al. |
| 7,877,580 B2 | 1/2011 | Eickemeyer et al. |
| 7,917,733 B2 | 3/2011 | Kazuma |
| 7,970,965 B2 | 6/2011 | Kedem et al. |
| 8,055,881 B2 | 11/2011 | Burger et al. |
| 8,055,885 B2 | 11/2011 | Nakashima |
| 8,127,119 B2 | 2/2012 | Burger et al. |
| 8,166,282 B2 | 4/2012 | Madriles et al. |
| 8,180,997 B2 | 5/2012 | Burger et al. |
| 8,201,024 B2 | 6/2012 | Burger et al. |
| 8,225,315 B1 | 7/2012 | Cheng et al. |
| 8,250,555 B1 | 8/2012 | Lee et al. |
| 8,312,452 B2 | 11/2012 | Neiger et al. |
| 8,321,850 B2 | 11/2012 | Bruening et al. |
| 8,341,639 B2 | 12/2012 | Lewis |
| 8,433,885 B2 | 4/2013 | Burger et al. |
| 8,447,911 B2 | 5/2013 | Burger et al. |
| 8,464,002 B2 | 6/2013 | Burger et al. |
| 8,490,107 B2 | 7/2013 | Jalal et al. |
| 8,544,014 B2 | 9/2013 | Gopalan et al. |
| 8,583,895 B2 | 11/2013 | Jacobs et al. |
| 8,817,793 B2 | 8/2014 | Mushano |
| 9,021,241 B2 | 4/2015 | Burger et al. |
| 9,043,769 B2 | 5/2015 | Vorbach |
| 9,053,292 B2 | 6/2015 | Abdallah |
| 9,135,079 B2 | 9/2015 | Flemming et al. |
| 2001/0032308 A1 | 10/2001 | Grochowski et al. |
| 2002/0016907 A1 | 2/2002 | Grochowski et al. |
| 2003/0012225 A1 | 1/2003 | Banerjee et al. |

(56) References Cited

U.S. PATENT DOCUMENTS

| | | |
|---|---|---|
| 2003/0023959 A1 | 1/2003 | Park |
| 2003/0065835 A1 | 4/2003 | Maergner et al. |
| 2003/0070062 A1 | 4/2003 | Krishnan et al. |
| 2003/0088759 A1 | 5/2003 | Wilkerson |
| 2004/0083468 A1 | 4/2004 | Ogawa et al. |
| 2004/0163082 A1 | 8/2004 | Tremblay et al. |
| 2004/0193849 A1 | 9/2004 | Dundas |
| 2004/0216095 A1 | 10/2004 | Wu |
| 2005/0172277 A1 | 8/2005 | Chheda et al. |
| 2005/0204348 A1 | 9/2005 | Horning et al. |
| 2006/0020769 A1 | 1/2006 | Herrell et al. |
| 2006/0020944 A1 | 1/2006 | King et al. |
| 2006/0031702 A1 | 2/2006 | Jardine et al. |
| 2006/0075207 A1 | 4/2006 | Togawa et al. |
| 2006/0090063 A1 | 4/2006 | Theis |
| 2006/0282624 A1 | 12/2006 | Yakota |
| 2007/0043960 A1 | 2/2007 | Bose et al. |
| 2007/0055827 A1 | 3/2007 | Tsien |
| 2007/0074011 A1 | 3/2007 | Borkar et al. |
| 2007/0162906 A1 | 7/2007 | Chandhoke |
| 2007/0239965 A1 | 8/2007 | Lewites et al. |
| 2007/0226735 A1 | 9/2007 | Nguyen et al. |
| 2007/0239975 A1 | 10/2007 | Wang |
| 2007/0260854 A1 | 11/2007 | Smith et al. |
| 2007/0288733 A1 | 12/2007 | Luick |
| 2008/0046621 A1 | 2/2008 | Okino et al. |
| 2008/0109637 A1 | 5/2008 | Martinez et al. |
| 2008/0126750 A1 | 5/2008 | Sistla |
| 2009/0013135 A1 | 1/2009 | Burger et al. |
| 2009/0013153 A1 | 1/2009 | Hilton |
| 2009/0013160 A1 | 1/2009 | Burger et al. |
| 2009/0019263 A1 | 1/2009 | Shen et al. |
| 2009/0106541 A1 | 4/2009 | Mizuno et al. |
| 2009/0158017 A1 | 6/2009 | Mutiu et al. |
| 2009/0172371 A1 | 7/2009 | Joao et al. |
| 2009/0177843 A1 | 7/2009 | Wallach et al. |
| 2010/0146209 A1 | 6/2010 | Burger et al. |
| 2010/0161948 A1 | 6/2010 | Abdallah |
| 2010/0191943 A1 | 7/2010 | Bukris |
| 2010/0325395 A1 | 12/2010 | Burger et al. |
| 2011/0035551 A1 | 2/2011 | Hooker et al. |
| 2011/0060889 A1 | 3/2011 | Burger et al. |
| 2011/0072239 A1 | 3/2011 | Burger et al. |
| 2011/0078424 A1 | 3/2011 | Boehm et al. |
| 2011/0093861 A1* | 4/2011 | Flemming .......... G06F 9/45516 718/104 |
| 2011/0202749 A1 | 8/2011 | Jin et al. |
| 2012/0158647 A1 | 6/2012 | Yadappanavar et al. |
| 2012/0246450 A1 | 9/2012 | Abdallah |
| 2012/0246657 A1 | 9/2012 | Abdallah |
| 2012/0303933 A1 | 11/2012 | Manet et al. |
| 2012/0311306 A1 | 12/2012 | Mushano |
| 2013/0198499 A1 | 8/2013 | Dice et al. |
| 2013/0339470 A1 | 12/2013 | Jeswani et al. |
| 2014/0006714 A1 | 1/2014 | Cherukuri et al. |
| 2014/0089635 A1 | 3/2014 | Shifer et al. |
| 2014/0095837 A1 | 4/2014 | Plotnikov et al. |
| 2014/0181475 A1 | 6/2014 | Abdallah |
| 2014/0189239 A1 | 7/2014 | Hum et al. |
| 2014/0281424 A1 | 9/2014 | Bobba et al. |
| 2014/0298336 A1 | 10/2014 | Taniuchi |
| 2014/0372736 A1 | 12/2014 | Greenhalgh |
| 2015/0006452 A1 | 1/2015 | Kim et al. |
| 2015/0026444 A1 | 1/2015 | Anderson et al. |
| 2015/0067214 A1 | 3/2015 | Henry et al. |
| 2015/0067662 A1 | 3/2015 | Palalau |
| 2015/0100757 A1 | 4/2015 | Burger et al. |
| 2015/0127928 A1 | 5/2015 | Burger et al. |
| 2015/0186293 A1 | 7/2015 | Lin |
| 2015/0199199 A1 | 7/2015 | Burger et al. |
| 2016/0055004 A1 | 2/2016 | Grochowski et al. |
| 2016/0140686 A1 | 5/2016 | Lueh et al. |
| 2016/0203081 A1 | 7/2016 | Kimura |
| 2016/0216995 A1 | 7/2016 | Cropper et al. |
| 2016/0259645 A1* | 9/2016 | Wright ................ G06F 9/30145 |
| 2016/0357647 A1* | 12/2016 | Shirai ....................... G06F 9/46 |
| 2017/0083313 A1* | 3/2017 | Sankaralingam ... G06F 15/7867 |
| 2017/0083315 A1 | 3/2017 | Burger et al. |
| 2017/0083316 A1 | 3/2017 | Burger et al. |
| 2017/0083318 A1 | 3/2017 | Burger et al. |
| 2017/0083319 A1 | 3/2017 | Burger et al. |
| 2017/0083320 A1 | 3/2017 | Burger et al. |
| 2017/0083341 A1 | 3/2017 | Burger et al. |

FOREIGN PATENT DOCUMENTS

| | | |
|---|---|---|
| JP | 2001175473 A | 6/2001 |
| JP | 2002149401 A | 5/2002 |
| JP | 2013500539 A | 1/2013 |
| WO | WO 2009/006607 | 1/2009 |
| WO | WO 2014/193878 | 12/2014 |

OTHER PUBLICATIONS

"Explicit Data Graph Execution", Retrieved on: Aug. 6, 2015, Available at: https://en.wikipedia.org/wiki/Explicit_Data_Execution.

"Intel® 64 Architecture Processor Topology Enumeration", in White Paper of Intel, Dec. 13, 2013, pp. 1-29.

"Programmatic API for Building Resources", Published on: Nov. 3, 2014 Available at: https://jersey.java.net/documentation/latest/resource-builder.html.

Anderson, Michael, "A Framework for Composing High-Performance OpenCL from Python Descriptions", in Technical Report of UCB/EECS-2014-210, Dec. 5, 2014, 144 pages.

Bouwens et al., "Architecture Enhancements for the ADRES Coarse-Grained Reconfigurable Array," High Performance Embedded Architectures and Compilers, Springer Berlin Heidelberg pp. 66-81 (2008).

Burger et al., "Design and Implementation of the TRIPS EDGE Architecture", in Proceedings of the 32nd Annual International Symposium on Computer Architecture, Jun. 4, 2005, pp. 1-41.

Burger et al., "Scaling to the End of Silicon with EDGE Architectures," in Proceedings of Computer, vol. 37, Issue 7, Jul. 1, 2004, pp. 44-55.

Coons et al., "A Spatial Path Scheduling Algorithm for EDGE Architectures," in Proceedings of the 12th International Conference on Architectural Support for Programming Languages and Operating Systems (ASPLOS), Oct. 12, 2006, 12 pages.

Desikan et al., "Scalable Selective Re-Execution for EDGE Architectures," in Proceedings of the 11th International Conference on Architectural Support for Programming Languages and Operating Systems, Oct. 9, 2004, 13 pages.

Fallin, et al., "The Heterogeneous Block Architecture", in Proceedings of 32nd IEEE International Conference on Computer Design, Oct. 19, 2014, pp. 1-8.

Gebhart, et al, "An Evaluation of the TRIPS Computer System", in Proceedings of the 14th international conference on Architectural support for programming languages and operating systems, Mar. 11, 2009, pp. 1-12.

Govindan, "E3:Energy-Efficient EDGE Architectures", in Dissertation, Aug. 2010, 244 pages.

Gray and Smith, "Towards an Area-Efficient Implementation of a High ILP EDGE Soft Processor: Comparing Out-of-Order Dataflow Instruction Scheduler Designs," poster temporarily on display during the 22nd IEEE International Symposium on Field-Programmable Custom Computing Machines May 11-13, 2014, Boston, Massachusetts (poster on display for ap.

Hayes, et al., "Unified On-chip Memory Allocation for SIMT Architecture", in Proceedings of the 28th ACM international conference on Supercomputing, Jun. 10, 2014, pp. 293-302.

Huang et al., "Compiler-Assisted Sub-Block Reuse," Retrieved on: Apr. 9, 2015; Available at: http://citeseerx.ist.psu.edu/viewdoc/download?doi=10.1.1.33.155&rep=rep1&type=pdf (also published as Huang & Lilja, "Compiler-Assisted Sub-Block Reuse," UMSI ResearchReport/University of Minnesota Supercomputer Institute 73 (2000)).

(56) References Cited

OTHER PUBLICATIONS

Huang, "Improving Processor Performance Through Compiler-Assisted Block Reuse," in Doctoral Dissertation, May 2000, 125 pages.
Ipek, et al., "Core fusion: Accommodating Software Diversity in Chip Multiprocessors", in Proceedings of the 34th annual international symposium on Computer architecture, Jun. 9, 2007, pp. 186-197.
Keckler et al., "Tera-Op Reliable Intelligently Adaptive Processing System (Trips)," in AFRL-IF-WP-TR-2004-1514, document dated Apr. 2004, 29 Pages.
Kim et al., "Composable Lightweight Processors," 13 pages (document also published as Kim, et al., "Composable lightweight processors," 40th Annual IEEE/ACM International Symposium on Microarchitecture (MICRO 2007), pp. 381-394, (2007).
Kinsy, et al., "Heracles: A Tool for Fast RTL-Based Design Space Exploration of Multicore Processors", in Proceedings of the ACM/SIGDA international symposium on Field programmable gate arrays, Feb. 11, 2013, pp. 125-134.
Kozumplik, et al., "TRIPS to the Semantic EDGE", Retrieved on: Sep. 22, 2015, Available at: http://vbn.aau.dk/ws/files/61072300/1212050422.pdf.
Li et al., "Code Layout Optimization for Defensiveness and Politeness in Shared Cache," 11 pages, (also published as Li, et al, "Code Layout Optimization for Defensiveness and Politeness in Shared Cache" 43rd International Conference on Parallel Processing (ICPP), IEEE, pp. 151-161 (2014)).
Maher, "Atomic Block Formation for Explicit Data Graph Execution Architectures", in Dissertation of Doctor of Philosophy, Aug. 2010, 185 pages.
McDonald et al., "TRIPS Processor Reference Manual," in Technical Report TR-05-19, document marked Mar. 10, 2005, 194 pages.
Mei et al., "ADRES: An Architecture with Tightly Coupled VLIW Processor and Coarse-Grained Reconfiguration Matrix," 10 pages, (also published as Mei, et al. "ADRES: An architecture with tightly coupled VLIW processor and coarse-grained reconfigurable matrix," in Proceedings of 13th International Conference on Field-Programmable Logic and Applications, pp. 61-70 (Sep. 2003)).
Melvin et al., "Enhancing Instruction Scheduling with a Block-Structured ISA," International Journal of Parallel Programming, vol. 23, No. 3, Jun. 1995, 23 pages.
Microsoft Research, "E2," document downloaded on Apr. 10, 2015 from http://research.microsoft.com/en-us/projects/e2/.
Nagarajan et al., "Critical Path Analysis of the TRIPS Architecture," in IEEE International Symposium on Performance Analysis of Systems and Software, Mar. 19, 2006, 11 pages.
Putnam et al., "Dynamic Vectorization in the E2 Dynamic Multicore Architecture," 6 pages (also published as Putnam, et al., "Dynamic vectorization in the E2 dynamic multicore architecture" ACM SIGARCH Computer Architecture News pp. 27-32. (2011)).
Robatmili et al., "How to Implement Effective Prediction and Forwarding for Fusable Dynamic Multicore Architectures," in Proceedings of the 19th IEEE International Symposium on High-Performance Computer Architecture, Feb. 23, 2013, 12 pages.
Sankaralingam et al., "Distributed Microarchitectural Protocols in the TRIPS Prototype Processor," 12 pages (also published as "Distributed Microarchitectural Protocols in the TRIPS Prototype Processor," Proceedings of 39th Annual IEEE/ACM International Symposium on Microarchitecture, pp. 480-491 (2006)).
Sankaralingam et al., "Exploiting ILP, TLP, and DLP with Polymorphous TRIPS Architecture," in Proceedings of the 30th Annual International Symposium on Computer Architecture, Jun. 9, 2003, 12 pages.
Sankaralingam, "Polymorphous Architectures: A Unified Approach for Extracting Concurrency of Different Granularities", in Doctoral Dissertation of Philosophy, Aug. 2007, 276 pages.
Sankaralingam, et al., "TRIPS: A Polymorphous Architecture for Exploiting ILP, TLP, and DLP", in Journal of ACM Transactions on Architecture and Code Optimization, vol. 1, No. 1, Mar. 2004, pp. 62-93.
Sarkar, et al., "Understanding POWER Multiprocessors", in Proceedings of the 32nd ACM SIGPLAN Conference on Programming Language Design and Implementation, Jun. 4, 2011, pp. 175-186.
Sethumadhavan et al., "Design and Implementation of the TRIPS Primary Memory System," in Proceedings of International Conference on Computer Design, Oct. 1, 2006, 7 pages.
Sibi, et al., "Scaling Power and Performance via Processor Composability", in Technical Report of TR-10-14, Aug. 28, 2015, pp. 1-20.
Smith et al., "Compiling for EDGE Architectures," in Proceedings of International Symposium on Code Generation and Optimization, Mar. 26, 2006, 11 pages.
Smith et al., "Dataflow Predication", in Proceedings of 39th Annual IEEE/ACM International Symposium on Microarchitecture, Dec. 9, 2006, 12 pages.
Smith, "Explicit Data Graph Compilation," in Thesis, Dec. 2009, 201 pages.
Smith, "TRIPS Application Binary Interface (ABI) Manual," Technical Report TR-05-22, Department of Computer Sciences, The University of Texas at Austin, Technical Report TR-05-22, document marked Oct. 10, 2006, 16 pages.
Bulpin, James R., "Operating system support for simultaneous multithreaded processors", in Technical Report, No. 619, Feb. 2005, pp. 1-130.
International Search Report and Written Opinion for PCT/US2016/051423, dated Jan. 2, 2017, 12 pages.
Mackerras, Paul, "KVM on IBM POWER8 machines", https://www.linux-kvm.org/images/7/77/01x09a-KVMPower.pdf, Published on: Oct. 15, 2016, 1-16 pages.
Masti, et al., "Logical Partitions on Many-Core Platforms", in Proceedings of 31st Annual Computer Security Applications Conference, Dec. 7, 2015, 10 pages.
"Oracle Partitioning Policy", https://web.archive.org/web/20121002232533/http:/www.oracle.com/us/corporate/pricing/partitioning-070609.pdf, Published on: Oct. 2, 2012, 4 pages.
Rouse, Margaret, "logical partition (LPAR)", http://whatis.techtarget.com/definition/logical-partition-LPAR, Published on: Mar. 2011, 10 pages.
Singhal, Ronak, "Inside Intel Next Generation Nehalem Microarchitecture", http://www.cs.uml.edu/~bill/cs515/Intel_Nehalem_Processor.pdf, Retrieved on: Oct. 7, 2016, pp. 1-165.
Sleiman, et al., "Efficiently Scaling Out-of-Order Cores for Simultaneous Multithreading", in Proceedings of 43rd International Symposium on Computer Architecture, Jun. 18, 2016, 13 pages.
Ueno, et al., "System Performance Improvement by Server Virtualization", in Proceedings of World Congress on Engineering, Jul. 6, 2011, 6 pages.
PCT Chapter II Demand for International Preliminary Examination and amended claims under Article 34 submitted to the European Patent Office dated May 24, 2017, for PCT/US2016/051423, 5 pages.
Aasaraai, et al., "Design Space Exploration of Instruction Schedulers for Out-of-Order Soft Processors", in Proceedings of the International Conference on Field-Programmable Technology, Dec. 8, 2010, 4 pages.
Bakhoda, et al., "E2", Published on: Jun. 19, 2013, Retrieved on: Oct. 4, 2015; http://research.microsoft.com/en-us/projects/e2/, 2 pages.
Carli, "Flexible MIPS Soft Processor Architecture", in Technical Report of Massachusetts Institute of Technology, Jun. 18, 2008, pp. 1-49.
Chang, et al., "Cooperative Caching for Chip Multiprocessors", in Proceedings of the 33rd annual international symposium on Computer Architecture, Jun. 17, 2006, 12 pages.
Cheah, et al., "Analysis and Optimization of a Deeply Pipelined FPGA Soft Processor", in Proceedings of International Conference on Field-Programmable Technology, Dec. 10, 2014, 4 pages.
Choudhury, "Visualizing Program Memory Behavior Using Memory Reference Traces", in Ph.D. Thesis of University of Utah, Aug. 2012, 158 pages.
Coons et al., "Feature Selection for Instruction Placement in an EDGE Architecture," Mar. 17, 2007, 6 pages.
Duric et al., "Dynamic-Vector Execution on a General Purpose EDGE Chip Multiprocessor," in Proceedings of the 2014 Interna-

(56) References Cited

OTHER PUBLICATIONS tional Conference on Embedded Computers Syhstems: Architectures, Modeling, and Simulation (SAMOS XIV), Jul. 14-17, 2014, 8 pages.
Duric et al., "EVX: Vector Execution on Low Power EDGE Cores," Design, Automation and Test in European Conference and Exhibition, Mar. 24-28, 2014, 4 pages.
Duric et al., "ReCompAc: Reconfigurable compute accelerator," IEEE 2013 International Conference on Reconfigurable Computing and FPGAS (Reconfig), Dec. 9, 2013, 4 pages.
Govindan et al., "Scaling Power and Performance via Processor Composability," IEEE Transaction on Computers, No. 1, Aug. 2014, 14 pages.
Govindaraju et al., "DySER: Unifying Functionality and Parallelism Specialization for Energy-Efficient Computing," IEEE Micro, IEEE Service Center, Sep. 1, 2012, 14 pages.
Gulati, et al., "Multitasking Workload Scheduling on Flexible Core Chip Multiprocessors", in Proceedings of the Computer Architecture News, vol. 36, Issue 2, May 2008, 10 pages.
Gupta, "Design Decisions for Tiled Architecture Memory Systems," document marked Sep. 18, 2009, available at: http://cseweb.ucsd.edu/~a2gupta/uploads/2/2/7/3/22734540/researchexam.paper.pdf, 14 pages.
Hao et al., "Increasing the Instruction Fetch Rate via Block-Structured Instruction Set Architectures", in Proceedings of the 29th Annual IEEE/ACM International Symposium on Microarchitecture, Dec. 2, 1996, pp. 191-200.
Hruska, "VISC CPU 'virtual core' design emerges: Could this be the conceptual computing breakthrough we've been waiting for?", Published on: Oct. 24, 2014, Available at: http://www.extremetech.com/extreme/192858-visc-cpu-virtual-core-design-emerges-could-this-be-the-conceptual-breakthrough-weve-been-waiting-for.
Kamaraj, et al., "Design of Out-Of-Order Superscalar Processor with Speculative Thread Level Parallelism", in Proceedings of International Conference on Innovations in Engineering and Technology, Mar. 21, 2014, pp. 1473-1478.
Kavi, et al., "Concurrency, Synchronization, Speculation—the Dataflow Way", in Journal of Advances in Computers, vol. 96, Nov. 23, 2013, pp. 1-41.
Liu, "Hardware Techniques to Improve Cache Efficiency", in Dissertation of the University of Texas at Austin, May 2009, 189 pages.
Maher et al., "Merging Head and Tail Duplication for Convergent Hyperblock Formation," in Annual IEEE/ACM International Symposium on Microarchitecture, Dec. 2006, 12 pages.
McDonald et al., "Characterization of TCC on Chip-Multiprocessors," Parallel Architectures and Compilation Techniques, 2005. PACT 2005. 14th International Conference on. IEEE, 2005, 12 pages.
Munshi, et al., "A Parameterizable SIMD Stream Processor", in Proceedings of Canadian Conference on Electrical and Computer Engineering, May 1, 2005, pp. 806-811.
Muraoka et al., "VCore-based design methodology", in Proceedings of the Asia and South Pacific Design Automation Conference, Jan. 21, 2003, pp. 441-445.
Nagarajan et al., "A Design Space Evaluation of Grid Processor Architectures," in Proceedings of the 34th annual ACM/IEEE international symposium on Microarchitecture, Dec. 1, 2001, pp. 40-51.
Nagarajan et al., "Static Placement, Dynamic Issue (SPDI) Scheduling for EDGE Architectures," in Proceedings of the 13th International Conference on Parallel Architecture and Compilation Techniques, Sep. 29, 2004, 11 pages.
Park et al., "Polymorphic Pipeline Array: A flexible multicore accelerator with virtualized execution for mobile multimedia applications," 42nd Annual IEEE/ACM International Symposium on Microarchitecture, Dec. 12, 2009, 11 pages.
Pengfei et al., "M5 Based EDGE Architecture Modeling", in Proceedings of IEEE International Conference on Computer Design, Oct. 3, 2010, pp. 289-296.
Pierce et al., "Wrong-Path Instruction Prefetching", in Proceedings of the 29th Annual IEEE/ACM International Symposium on Microarchitecture, Dec. 2, 1996, pp. 1-17.
Robatmili et al., "Exploiting Criticality to Reduce Bottlenecks in Distributed Uniprocessors," 17th IEEE International Symposium on High-Performance Computer Architecture (HPCA-17), Feb. 2011, 12 pages.
Roesner, "Counting Dependence Predictors," in Undergraduate Honors Thesis, May 2, 2008, 25 pages.
Sohi et al., "Multiscalar Processors," in Proceedings of 22nd Annual International Symposium on Computer Architecture, Jun. 22-24, 1995, 12 pages.
Sohi, "Retrospective: multiscalar processors," in Proceedings of the 25th Annual International Symposium on Computer Architectures, Jun. 27-Jul. 1, 1998, pp. 1111-1114.
Souza et al., "Dynamically Scheduling VLIW Instructions", in Journal of Parallel and Distributed Computing, vol. 60, Jul. 2000, pp. 1480-1511.
Tamches et al., "Dynamic Kernel Code Optimization," in Workshop on Binary Translation, 2001, 10 pages.
Uhlig, "Trap-driven Memory Simulation," in Doctoral Dissertation of Ph.D., Aug. 1995, 203 pages.
Wong, et al., "Efficient Methods for Out-of-Order Load/Store Execution for High-Performance soft Processors", in Proceedings of International Conference on Field-Programmable Technology, Dec. 9, 2013, pp. 442-445.
Wu et al., "Block Based Fetch Engine for Superscalar Processors", in Proceedings of the 15th International Conference on Computer Applications in Industry and Engineering, Nov. 7, 2002, 4 pages.
Zmily, "Block-Aware Instruction Set Architecture", in Doctoral Dissertation, Jun. 2007, 176 pages.
Zmily et al., "Block-Aware Instruction Set Architecture", in Proceedings of ACM Transactions on Architecture and Code Optimization, vol. 3, Issue 3, Sep. 2006, pp. 327-357.
Zmily, et al., "Improving Instruction Delivery with a Block-Aware ISA", in Proceedings of 11th International Euro-Par Conference on Parallel Processing, Aug. 30, 2005, pp. 530-539.
Second Written Opinion of the International Preliminary Examining Authority issued in corresponding PCT Application No. PCT/US2016/051422 (dated Jul. 26, 2017) 6pp.
PCT Chapter II Demand for International Preliminary Examination and amended claims under Article 34 submitted to the European Patent Office dated Jun. 20, 2017, for PCT/US2016/051422, pp. 1-8.
Second Written Opinion of the International Preliminary Examining Authority issued in International Patent Application No. PCT/US2016/051423 (dated Jul. 25, 2017) 6pp.
"International Preliminary Report on Patentability Issued in PCT Application No. PCT/US2016/051423", dated Dec. 11, 2017, 7 Pages.
"Very Long Instruction Word", Retrieved From: http://en.wikipedia.org/wiki/Verylong_instruction_word, Feb. 13, 2013, 7 Pages.
"Final Office Action Issued in U.S. Appl. No. 14/757,944", dated Jul. 9, 2018, 18 Pages.
"Non Final Office Action Issued in U.S. Appl. No. 14/757,944", dated Sep. 21, 2017, 21 Pages.
August, et al., "A Framework for Balancing Control Flow and Predication", in IEEE/ ACM 30th Annual International Symposium on Microarchitecture, Dec. 3, 1997, 12 Pages.
Chang, et al., "Using Predicated Execution to Improve the Performance of a Dynamically Scheduled Machine with Speculative Execution", in International Journal of Parallel Programming, vol. 24, Issue 3, Jun. 1996, 11 pages.
Chuang, et al., "Predicate Prediction for Efficient Out-of-Order Execution", in Proceedings of the 17th Annual International Conference on Supercomputing, Jun. 23, 2003, 10 Pages.
Coons, et al., "Optimal Huffman Tree-Height Reduction for Instruction-Level Parallelism", in Technical Report TR-08-34, Aug. 2007, 26 Pages.
Ebcioglu, et al., "An Eight-Issue Tree-VLIW Processor for Dynamic Binary Translation", in Proceedings of the International Conference on Computer Design, Nov. 1998. 9 Pages.

(56) References Cited

OTHER PUBLICATIONS

Ferrante, et al., "The Program Dependence Graph and Its Use in Optimization", in Proceedings of ACM Transactions on Programming Languages and Systems, vol. 9, Issue 3. Jul. 1, 1987, 31 Pages.
Havanki, et al., "Treegion Scheduling for Wide Issue Processors", in Proceedings of the 4th International Symposium on High-Performance Computer Architecture, Feb. 1, 1998, 11 Pages.
Huh, et al., "A NUCA Substrate for Flexible CMP Cache Sharing", in Proceedings of 19th International Conference on Supercomputing, Jun. 20, 2005, 10 Pages.
Mahlke, et al., "Effective Compiler Support for Predicated Execution Using the Hyperblock", in Proceedings of the 25th Annual International Symposium on Microarchitecture, Dec. 1992, 10 Pages.
Mahlke, Scott Alan, "Exploiting Instruction Level Parallelism in the Presence of Conditional Branches", in Doctoral Dissertation Submitted in the Department of Electrical and Computer Engineering, Sep. 1996, 292 Pages.
Mai, et al., "Smart Memories: A Modular Reconfigurable Architecture", in Proceedings of the 27th International.Symposium on Computer Architecture, Jun. 14, 2011, 11 Pages.
McDonald, et al., "The Design and Implementation of the Trips Prototype Chip", Retrieved From: http://www.cs.utexas.edu/~trips/talks/hotchips05.pdf, Aug. 17, 2005, 24 Pages.
Moreno, et al., "Scalable Instruction-level Parallelism through Tree-Instructions", in Proceedings of the 11th International Conference on Supercomputing, Jul. 11, 1997, 14 Pages.
Netto, et al., "Code Compression to Reduce Cache Accesses", in Technical Report- IC-03-023, Nov. 2003, 15 Pages.
Pan, et al., "High Performance. Variable-Length Instruction Encodings", in Doctoral Dissertation of Massachusetts Institute of Technology, May 2002, 53 Pages.
Parcerisa, et al., "Design of Clustered Superscalar Microarchitectures", in Thesis Submitted to Polytechnic, University of Catalunya, Barcelona (Spain), Apr. 2004, 28 Pages.
"International Search Report and Written Opinion Issued in PCT Application No. PCT/US2016/051207", dated Dec. 16, 2016, 11 Pages
Pnevmatikatos, et al., "Guarded Execution and Branch Prediction in Dynamic ILP Processors", in Proceedings of the 21st Annual International Symposium on Computer Architecture, Apr. 1994, 11 Pages.
Quinones, et al., "Improving Branch Predication and Predicated Execution in Out-of-Order Processors", in IEEE 13th International Symposium on High Performance Computer Architecture, Feb. 10, 2007, 10 Pages.
Quinones, et al., "Selective Predicate Prediction for Out-of-Order Processors", in Proceedings of the 20th Annual International Conference on Supercomputing, Jun. 28, 2009, 9 Pages.
Ranganathan, Nitya, "Control Flow Speculation for Distributed Architectures", in Dissertation Presented to the Faculty of the Graduate School of the University of Texas at Austin, May 2009, 40 Pages.
Ross, et al., "A Hamming Distance Based VLIW/EPIC Code Compression Technique", in Proceedings of the International Conference on Compilers, Architecture, and Synthesis for Embedded Systems, Sep. 22, 2004, 8 pages.
Sankaralingam, et al., "Universal Mechanisms for Data-Parallel Architectures", in Proceedings of the 36th International Symposium on Microarchitecture, Dec. 3, 2003, 12 Pages.
Simon, et al., "Incorporating Predicate Information Into Branch Predictors", in Proceedings of the 9th International Symposium on High-Performance Computer Architecture, Feb., 2003, 12 Pages.
Sohi, et al., "High-Bandwidth Data Memory Systems for Superscalar Processors", in Proceedings of the 4th International Conference on Architectural Support for Programming Languages and Operating Systems Homepage, Apr. 1991, 8 Pages.
Uht, et al., "Disjoint Eager Execution: An Optimal Form of Speculative Execution", in Proceedings of the 28th International Symposium on Microarchitecture, Nov. 1995, 13 Pages.
Wilson, et al., "Designing High Bandwidth On-Chip Caches", in Proceedings of the 24th Annual International Symposium on Computer Architecture, Jun. 1997, 12 Pages.
Xie, et al,, "A Code Decompression Architecture for VLIW Processors", in Proceedings of 34th ACM/IEEE international Symposium on Microarchitecture, Dec. 1, 2001, 10 Pages.
"Final Office Action Issued in U.S. Appl. No. 15/074,938", dated Dec. 3, 2018, 9 Pages.
"Final Office Action Issued in U.S. Appl. No. 14/942,345", dated Dec. 31, 2018, 14 Pages.
"Non Final Office Action Issued in U.S. Appl. No. 14/942,461", dated Jan. 18, 2019, 9 Pages.
"Final Office Action Issued in U.S. Appl. No. 14/942,557", dated Dec. 31, 2018, 16 Pages.
"Non Final Office Action Issued in U.S. Appl. No. 15/073,365", dated Dec. 4, 2018, 13 Pages.
Salzman, et al.. "The Art of Debugging with GDB and DDD", in Book—The Art of Debugging with GDB and DDD, No Starch Press Publication, Sep. 2008, 27 Pages.
"Office Action Issued in European Patent Application No. 16775379. 7", dated Dec. 11, 2019, 11 Pages.
"Non Final Office Action Issued in U.S. Appl. No. 15/044,045", dated May 1, 2020, 9 Pages.

* cited by examiner

FIG. 9

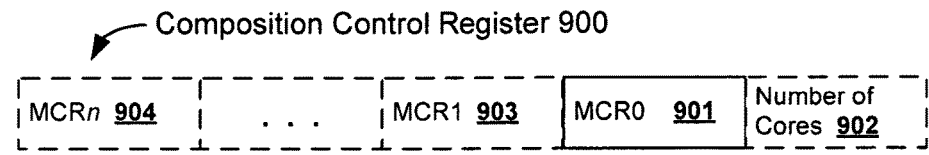

Composition Control Register 900

| MCRn 904 | . . . | MCR1 903 | MCR0 901 | Number of Cores 902 |

| Example Encoding | Example Core Configuration |
|---|---|
| 00000 | Core and all its resources are powered down |
| 10000 | Core is active with no shared resources |
| 00001 | only L1 Data-Cache is shared |
| 00010 | only Register-file is shared |
| 00100 | only Execution units are shared |
| 11001 | Core and L1-D$ are composed |
| 11000 | Core is composed with inactive L1-D$ |

910

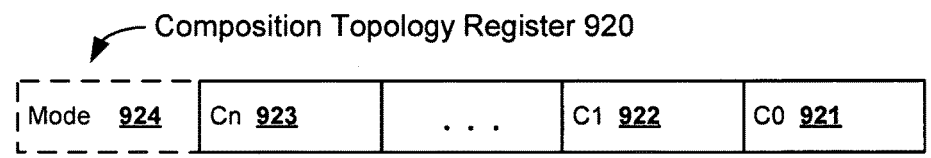

Composition Topology Register 920

| Mode 924 | Cn 923 | . . . | C1 922 | C0 921 |

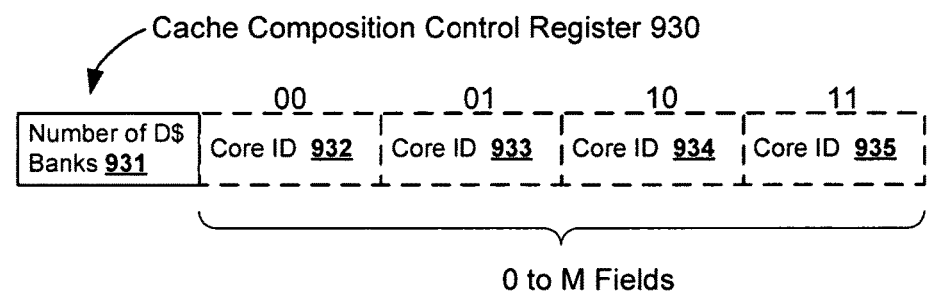

Cache Composition Control Register 930

| Number of D$ Banks 931 | Core ID 932 (00) | Core ID 933 (01) | Core ID 934 (10) | Core ID 935 (11) |

0 to M Fields

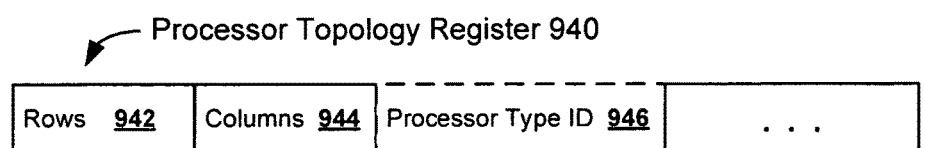

Processor Topology Register 940

| Rows 942 | Columns 944 | Processor Type ID 946 | . . . |

BLOCK-BASED PROCESSOR INCLUDING TOPOLOGY AND CONTROL REGISTERS TO INDICATE RESOURCE SHARING AND SIZE OF LOGICAL PROCESSOR

CROSS-REFERENCE TO RELATED APPLICATIONS

This application claims the benefit of U.S. Provisional Application No. 62/221,003, entitled "BLOCK-BASED PROCESSORS," filed Sep. 19, 2015, the entire disclosure of which is incorporated herein by reference in its entirety.

BACKGROUND

Microprocessors have benefitted from continuing gains in transistor count, integrated circuit cost, manufacturing capital, clock frequency, and energy efficiency due to continued transistor scaling predicted by Moore's law, with little change in associated processor Instruction Set Architectures (ISAs). However, the benefits realized from photolithographic scaling, which drove the semiconductor industry over the last 40 years, are slowing or even reversing. Reduced Instruction Set Computing (RISC) architectures have been the dominant paradigm in processor design for many years. Out-of-order superscalar implementations have not exhibited sustained improvement in area or performance. Accordingly, there is ample opportunity for improvements in processor ISAs to extend performance improvements.

SUMMARY

Methods, apparatus, and computer-readable storage devices are disclosed for composing one or more resources of a processor core into a larger logical processing core. The processor cores implement a block-based processor instruction set architecture (BB-ISA). The described techniques and tools can potentially improve processor performance and can be implemented separately, or in various combinations with each other. As will be described more fully below, the described techniques and tools can be implemented in a digital signal processor, microprocessor, application-specific integrated circuit (ASIC), a soft processor (e.g., a microprocessor core implemented in a field programmable gate array (FPGA) using reconfigurable logic), programmable logic, or other suitable logic circuitry. As will be readily apparent to one of ordinary skill in the art, the disclosed technology can be implemented in various computing platforms, including, but not limited to, servers, mainframes, cellphones, smartphones, PDAs, handheld devices, handheld computers, touch screen tablet devices, tablet computers, wearable computers, and laptop computers.

In some examples of the disclosed technology, a processor can include a plurality of block-based processor cores for executing a program including a plurality of instruction blocks. A respective block-based processor core can include a sharable resource and a programmable composition topology register. The programmable composition topology register can be used to assign a group of the physical processor cores that share the sharable resource.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

BRIEF DESCRIPTION OF THE DRAWINGS

FIG. 9 is a diagram illustrating example control registers of a block-based processor core.

DETAILED DESCRIPTION

I. General Considerations

Figure 1:
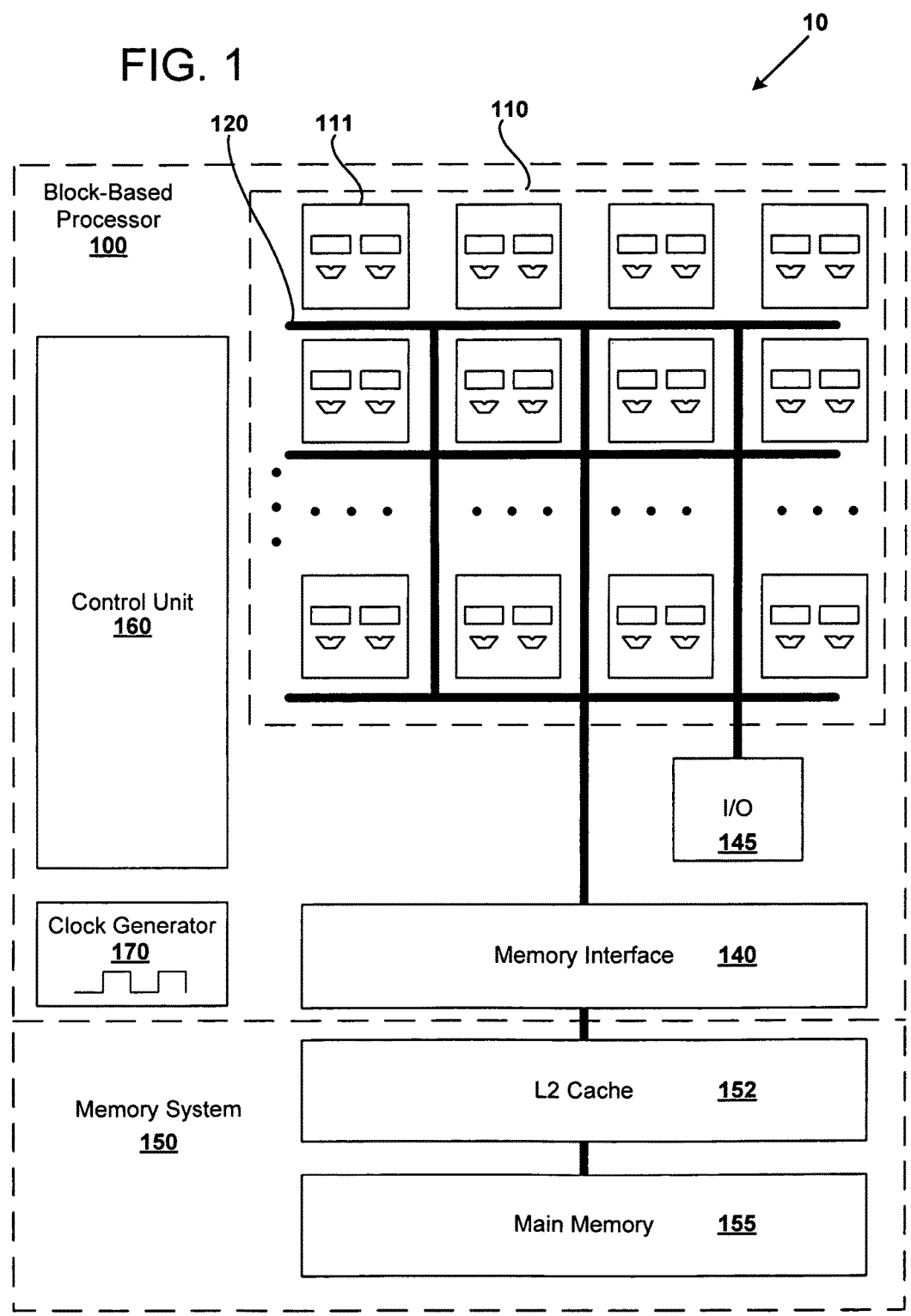
FIG. 1 illustrates a block-based processor including multiple processor cores, as can be used in some examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., with general-purpose and/or block-based processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technologies

Superscalar out-of-order microarchitectures employ substantial circuit resources to rename registers, schedule instructions in dataflow order, clean up after misspeculation, and retire results in-order for precise exceptions. This includes expensive energy-consuming circuits, such as deep, many-ported register files, many-ported content-accessible memories (CAMs) for dataflow instruction scheduling wakeup, and many-wide bus multiplexers and bypass networks, all of which are resource intensive. For example, FPGA-based implementations of multi-read, multi-write RAMs typically require a mix of replication, multi-cycle operation, clock doubling, bank interleaving, live-value tables, and other expensive techniques.

The disclosed technologies can realize energy efficiency and/or performance enhancement through application of techniques including high instruction-level parallelism (ILP), out-of-order (OoO), superscalar execution, while avoiding substantial complexity and overhead in both processor hardware and associated software. In some examples of the disclosed technology, a block-based processor comprising multiple processor cores uses an Explicit Data Graph Execution (EDGE) ISA designed for area- and energy-efficient, high-ILP execution. In some examples, use of EDGE architectures and associated compilers finesses away much of the register renaming, CAMs, and complexity. In some examples, the respective cores of the block-based processor can store or cache fetched and decoded instructions that may be repeatedly executed, and the fetched and decoded instructions can be reused to potentially achieve reduced power and/or increased performance.

In certain examples of the disclosed technology, an EDGE ISA can eliminate the need for one or more complex architectural features, including register renaming, dataflow analysis, misspeculation recovery, and in-order retirement while supporting mainstream programming languages such as C and C++. In certain examples of the disclosed technology, a block-based processor executes a plurality of two or more instructions as an atomic block. Block-based instructions can be used to express semantics of program data flow and/or instruction flow in a more explicit fashion, allowing for improved compiler and processor performance. In certain examples of the disclosed technology, an explicit data graph execution instruction set architecture (EDGE ISA) includes information about program control flow that can be used to improve detection of improper control flow instructions, thereby increasing performance, saving memory resources, and/or and saving energy.

In some examples of the disclosed technology, instructions organized within instruction blocks are fetched, executed, and committed atomically. Intermediate results produced by the instructions within an atomic instruction block are buffered locally until the instruction block is committed. When the instruction block is committed, updates to the visible architectural state resulting from executing the instructions of the instruction block are made visible to other instruction blocks. Instructions inside blocks execute in dataflow order, which reduces or eliminates using register renaming and provides power-efficient OoO execution. A compiler can be used to explicitly encode data dependencies through the ISA, reducing or eliminating burdening processor core control logic from rediscovering dependencies at runtime. Using predicated execution, intra-block branches can be converted to dataflow instructions, and dependencies, other than memory dependencies, can be limited to direct data dependencies. Disclosed target form encoding techniques allow instructions within a block to communicate their operands directly via operand buffers, reducing accesses to a power-hungry, multi-ported physical register files.

Between instruction blocks, instructions can communicate using visible architectural state such as memory and registers. Thus, by utilizing a hybrid dataflow execution model, EDGE architectures can still support imperative programming languages and sequential memory semantics, but desirably also enjoy the benefits of out-of-order execution with near in-order power efficiency and complexity.

The instruction blocks of a single- or multi-threaded program can be executed in parallel using a multi-core processor that can be dynamically adapted for a given workload. For example, physical cores can be combined into a larger logical processor, logical processors can be broken into smaller logical processors or physical cores, and/or resources can be shared between physical cores. A logical processor can include one or more physical cores coordinating among one another to execute instruction blocks within a thread of a program. By dynamically adjusting the composition of logical processors and the sharing of resources of the physical processor cores, programs may execute faster and/or use less energy than processors without the ability to dynamically adapt for a given workload.

As will be readily understood to one of ordinary skill in the relevant art, a spectrum of implementations of the disclosed technology are possible with various area, performance, and power tradeoffs.

III. Example Block-Based Processor

FIG. 1 is a block diagram 10 of a block-based processor 100 as can be implemented in some examples of the disclosed technology. The processor 100 is configured to execute atomic blocks of instructions according to an instruction set architecture (ISA), which describes a number of aspects of processor operation, including a register model, a number of defined operations performed by block-based instructions, a memory model, interrupts, and other architectural features. The block-based processor includes a plurality of processing cores 110, including a processor core 111.

As shown in FIG. 1, the processor cores are connected to each other via core interconnect 120. The core interconnect 120 carries data and control signals between individual ones of the cores 110, a memory interface 140, and an input/output (I/O) interface 145. The core interconnect 120 can transmit and receive signals using electrical, optical, magnetic, or other suitable communication technology and can provide communication connections arranged according to a number of different topologies, depending on a particular desired configuration. For example, the core interconnect 120 can have a crossbar, a bus, a point-to-point bus, or other suitable topology. In some examples, any one of the cores 110 can be connected to any of the other cores, while in other examples, some cores are only connected to a subset of the other cores. For example, each core may only be connected to a nearest 4, 8, or 20 neighboring cores. The core interconnect 120 can be used to transmit input/output data to and from the cores, as well as transmit control signals and other information signals to and from the cores. For example, each of the cores 110 can receive and transmit semaphores that indicate the execution status of instructions currently being executed by each of the respective cores. In some examples, the core interconnect 120 is implemented as wires connecting the cores 110, and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from the processor 100 are not limited to full swing electrical digital signals, but the processor can be configured to include differential signals, pulsed signals, or other suitable signals for transmitting data and control signals.

In the example of FIG. 1, the memory interface 140 of the processor includes interface logic that is used to connect to additional memory, for example, memory located on another integrated circuit besides the processor 100. As shown in FIG. 1 an external memory system 150 includes an L2 cache 152 and main memory 155. In some examples the L2 cache can be implemented using static RAM (SRAM) and the main memory 155 can be implemented using dynamic RAM (DRAM). In some examples the memory system 150 is included on the same integrated circuit as the other components of the processor 100. In some examples, the memory interface 140 includes a direct memory access (DMA) controller allowing transfer of blocks of data in memory without using register file(s) and/or the processor 100. In some examples, the memory interface 140 can include a memory management unit (MMU) for managing and allocating virtual memory, expanding the available main memory 155.

The I/O interface 145 includes circuitry for receiving and sending input and output signals to other components, such as hardware interrupts, system control signals, peripheral interfaces, co-processor control and/or data signals (e.g., signals for a graphics processing unit, floating point coprocessor, physics processing unit, digital signal processor, or other co-processing components), clock signals, semaphores, or other suitable I/O signals. The I/O signals may be synchronous or asynchronous. In some examples, all or a portion of the I/O interface is implemented using memory-mapped I/O techniques in conjunction with the memory interface 140.

The block-based processor 100 can also include a control unit 160. The control unit can communicate with the processing cores 110, the I/O interface 145, and the memory interface 140 via the core interconnect 120 or a side-band interconnect (not shown). The control unit 160 supervises operation of the processor 100. Operations that can be performed by the control unit 160 can include allocation and de-allocation of cores for performing instruction processing, control of input data and output data between any of the cores, register files, the memory interface 140, and/or the I/O interface 145, modification of execution flow, and verifying target location(s) of branch instructions, instruction headers, and other changes in control flow. The control unit 160 can also process hardware interrupts, and control reading and writing of special system registers, for example the program counter stored in one or more register file(s). In some examples of the disclosed technology, the control unit 160 is at least partially implemented using one or more of the processing cores 110, while in other examples, the control unit 160 is implemented using a non-block-based processing core (e.g., a general-purpose RISC processing core coupled to memory). In some examples, the control unit 160 is implemented at least in part using one or more of hardwired finite state machines, programmable microcode, programmable gate arrays, or other suitable control circuits. In alternative examples, control unit functionality can be performed by one or more of the cores 110.

The control unit 160 includes a scheduler that is used to allocate instruction blocks to the processor cores 110. As used herein, scheduler allocation refers to hardware for directing operation of instruction blocks, including initiating instruction block mapping, fetching, decoding, execution, committing, aborting, idling, and refreshing an instruction block. In some examples, the hardware receives signals generated using computer-executable instructions to direct operation of the instruction scheduler. Processor cores 110 are assigned to instruction blocks during instruction block mapping. The recited stages of instruction operation are for illustrative purposes, and in some examples of the disclosed technology, certain operations can be combined, omitted, separated into multiple operations, or additional operations added.

The block-based processor 100 also includes a clock generator 170, which distributes one or more clock signals to various components within the processor (e.g., the cores 110, interconnect 120, memory interface 140, and I/O interface 145). In some examples of the disclosed technology, all of the components share a common clock, while in other examples different components use a different clock, for example, a clock signal having differing clock frequencies. In some examples, a portion of the clock is gated to allow power savings when some of the processor components are not in use. In some examples, the clock signals are generated using a phase-locked loop (PLL) to generate a signal of fixed, constant frequency and duty cycle. Circuitry that receives the clock signals can be triggered on a single edge (e.g., a rising edge) while in other examples, at least some of the receiving circuitry is triggered by rising and falling clock edges. In some examples, the clock signal can be transmitted optically or wirelessly.

IV. Example Block-Based Processor Core

Figure 2:
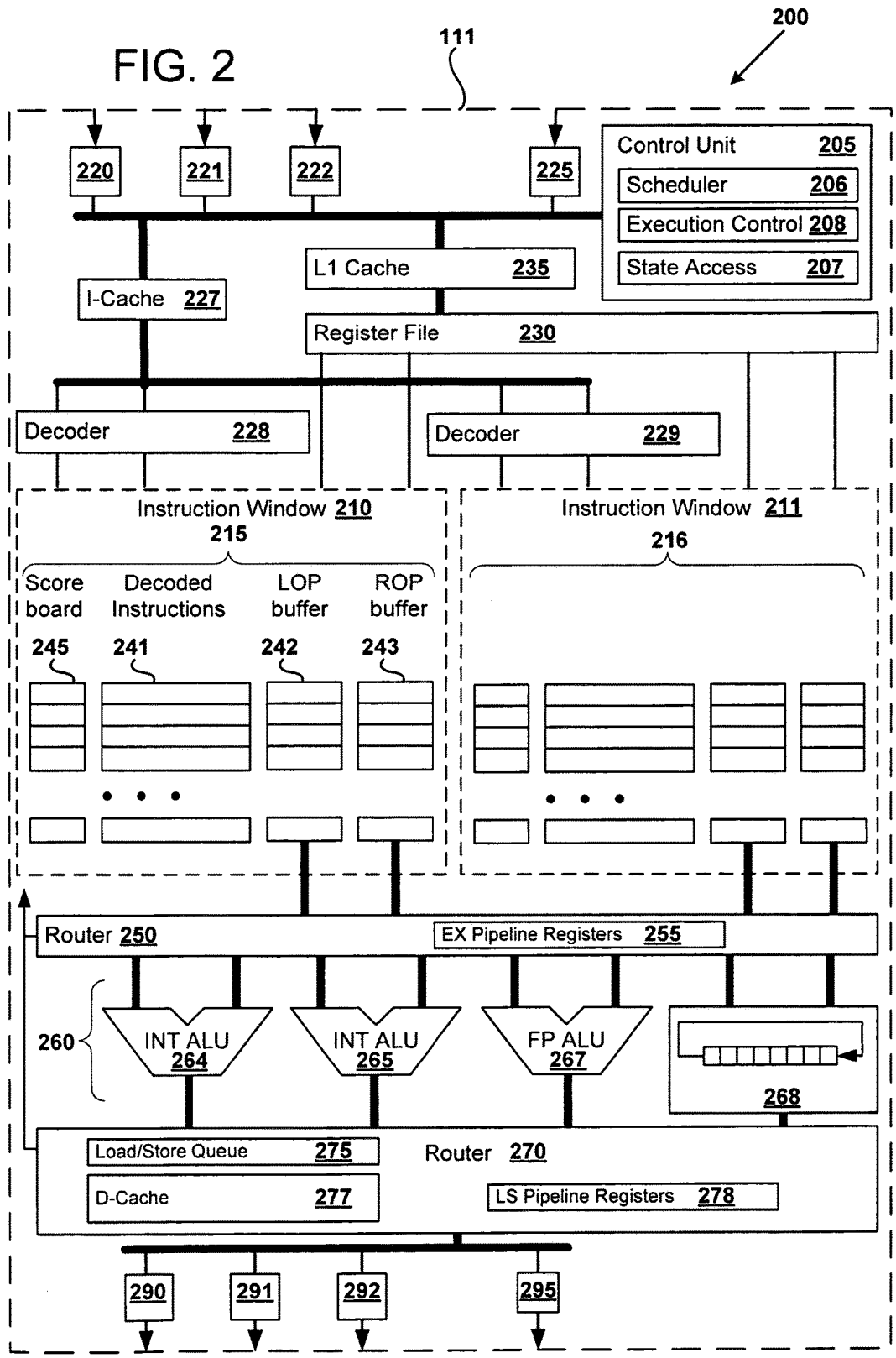
FIG. 2 illustrates a block-based processor core, as can be used in some examples of the disclosed technology.

FIG. 2 is a block diagram 200 further detailing an example microarchitecture for the block-based processor 100, and in particular, an instance of one of the block-based processor cores (processor core 111), as can be used in certain examples of the disclosed technology. For ease of explanation, the exemplary block-based processor core 111 is illustrated with five stages: instruction fetch (IF), decode (DC), operand fetch, execute (EX), and memory/data access (LS). However, it will be readily understood by one of ordinary skill in the relevant art that modifications to the illustrated microarchitecture, such as adding/removing stages, adding/removing units that perform operations, and other implementation details can be modified to suit a particular application for a block-based processor.

In some examples of the disclosed technology, the processor core 111 can be used to execute and commit an instruction block of a program. An instruction block is an atomic collection of block-based-processor instructions that includes an instruction block header and a plurality of instructions. As will be discussed further below, the instruction block header can include information describing an execution mode of the instruction block and information that can be used to further define semantics of one or more of the plurality of instructions within the instruction block. Depending on the particular ISA and processor hardware used, the instruction block header can also be used, during execution of the instructions, to improve performance of executing an instruction block by, for example, allowing for early fetching of instructions and/or data, improved branch prediction, speculative execution, improved energy efficiency, and improved code compactness.

The instructions of the instruction block can be dataflow instructions that explicitly encode relationships between producer-consumer instructions of the instruction block. In particular, an instruction can communicate a result directly to a targeted instruction through an operand buffer that is reserved only for the targeted instruction. The intermediate results stored in the operand buffers are generally not visible to cores outside of the executing core because the block-atomic execution model only passes final results between the instruction blocks. The final results from executing the instructions of the atomic instruction block are made visible outside of the executing core when the instruction block is committed. Thus, the visible architectural state generated by each instruction block can appear as a single transaction outside of the executing core, and the intermediate results are typically not observable outside of the executing core.

As shown in FIG. 2, the processor core 111 includes a control unit 205, which can receive control signals from other cores and generate control signals to regulate core operation and schedules the flow of instructions within the core using an instruction scheduler 206. The control unit 205 can include state access logic 207 for examining core status and/or configuring operating modes of the processor core 111. The control unit 205 can include execution control logic 208 for generating control signals during one or more operating modes of the processor core 111. Operations that can be performed by the control unit 205 and/or instruction scheduler 206 can include allocation and de-allocation of cores for performing instruction processing, control of input data and output data between any of the cores, register files, the memory interface 140, and/or the I/O interface 145. The control unit 205 can also process hardware interrupts, and control reading and writing of special system registers, for example the program counter stored in one or more register file(s). In other examples of the disclosed technology, the control unit 205 and/or instruction scheduler 206 are implemented using a non-block-based processing core (e.g., a general-purpose RISC processing core coupled to memory). In some examples, the control unit 205, instruction scheduler 206, state access logic 207, and/or execution control logic 208 are implemented at least in part using one or more of: hardwired finite state machines, programmable microcode, programmable gate arrays, or other suitable control circuits.

The control unit 205 can decode the instruction block header to obtain information about the instruction block. For example, execution modes of the instruction block can be specified in the instruction block header though various execution flags. The decoded execution mode can be stored in registers of the execution control logic 208. Based on the execution mode, the execution control logic 208 can generate control signals to regulate core operation and schedule the flow of instructions within the core 111, such as by using the instruction scheduler 206. For example, during a default execution mode, the execution control logic 208 can sequence the instructions of one or more instruction blocks executing on one or more instruction windows (e.g., 210, 211) of the processor core 111. Specifically, each of the instructions can be sequenced through the instruction fetch, decode, operand fetch, execute, and memory/data access stages so that the instructions of an instruction block can be pipelined and executed in parallel. The instructions are ready to execute when their operands are available, and the instruction scheduler 206 can select the order in which to execute the instructions.

The state access logic 207 can include an interface for other cores and/or a processor-level control unit (such as the control unit 160 of FIG. 1) to communicate with and access state of the core 111. For example, the state access logic 207 can be connected to a core interconnect (such as the core interconnect 120 of FIG. 1) and the other cores can communicate via control signals, messages, reading and writing registers, and the like.

The state access logic 207 can include control state registers or other logic for modifying and/or examining modes and/or status of an instruction block and/or core status. As an example, the core status can indicate whether an instruction block is mapped to the core 111 or an instruction window (e.g., instruction windows 210, 211) of the core 111, whether an instruction block is resident on the core 111, whether an instruction block is executing on the core 111, whether the instruction block is ready to commit, whether the instruction block is performing a commit, and whether the instruction block is idle. As another example, the status of an instruction block can include a token or flag indicating the instruction block is the oldest instruction block executing and a flag indicating the instruction block is executing speculatively. As another example, the status of the processor core can include a power-state, such as power-states for individual resources of the processor core or for the processor core as a whole.

The control state registers (CSRs) can be mapped to unique memory locations that are reserved for use by the block-based processor. For example, CSRs of the control unit 160 (FIG. 1) can be assigned to a first range of addresses, CSRs of the memory interface 140 (FIG. 1) can be assigned to a second range of addresses, a first processor core can be assigned to a third range of addresses, a second processor core can be assigned to a fourth range of addresses, and so forth. In one embodiment, the CSRs can be accessed using general purpose memory load and store instructions of the block-based processor. Additionally or alternatively, the CSRs can be accessed using specific read and write instructions (e.g., the instructions for reading/writing the CSRs have opcodes different from the memory load and store instructions) for the CSRs. Thus, one core can examine the configuration state of a different core by reading from an address corresponding to the different core's CSRs. Similarly, one core can modify the configuration state of a different core by writing to an address corresponding to the different core's CSRs. The CSRs may be protected or controlled so that only trusted software components can read and write the CSRs. For example, the CSRs may only be accessible from a privileged or kernel mode. Additionally or alternatively, the CSRs can be accessed by shifting commands into the state access logic 207 through serial scan chains, such as through a Joint Test Action Group (JTAG) test access port and boundary scan logic. In this manner, one core can examine the state access logic 207 of a different core and one core can modify the state access logic 207 or modes of a different core.

The state access logic 207 can include registers or other logic for configuring and/or reconfiguring the core to operate in different operating modes, as described further herein. For example, the state access logic 207 can include a composition control register, writable through a CSR, that controls which resources of the processor core can be shared with other processor cores. The composition control register may also specify whether the processor core is composed as part of a logical processor. The composition control register may also control power-states of the processor core. As another example, the state access logic 207 can include a composition topology register, writable through a CSR, that controls which processor cores can be grouped with other processor cores.

Each of the instruction windows 210 and 211 can receive instructions and data from one or more of input ports 220, 221, and 222 which connect to an interconnect bus and instruction cache 227, which in turn is connected to the instruction decoders 228 and 229. Additional control signals can also be received on an additional input port 225. Each of the instruction decoders 228 and 229 decodes instructions for an instruction block and stores the decoded instructions within a memory store 215 and 216 located in each respective instruction window 210 and 211.

The processor core 111 further includes a register file 230 coupled to an L1 (level one) cache 235. The register file 230 stores data for registers defined in the block-based processor architecture, and can have one or more read ports and one or more write ports. For example, a register file may include two or more write ports for storing data in the register file, as well as having a plurality of read ports for reading data from individual registers within the register file. In some examples, a single instruction window (e.g., instruction window 210) can access only one port of the register file at a time, while in other examples, the instruction window 210 can access one read port and one write port, or can access two or more read ports and/or write ports simultaneously. In some examples, the register file 230 can include 64 registers, each of the registers holding a word of 32 bits of data. (This application will refer to 32-bits of data as a word, unless otherwise specified.) In some examples, some of the registers within the register file 230 may be allocated to special purposes. For example, some of the registers can be dedicated as system registers examples of which include registers storing constant values (e.g., an all zero word), program counter(s) (PC), which indicate the current address of a program thread that is being executed, a physical core number, a logical core number, a core assignment topology, core control flags, a processor topology, or other suitable dedicated purpose. In some examples, there are multiple program counter registers, one or each program counter, to allow for concurrent execution of multiple execution threads across one or more processor cores and/or processors. In some examples, program counters are implemented as designated memory locations instead of as registers in a register file. In some examples, use of the system registers may be restricted by the operating system or other supervisory computer instructions. In some examples, the register file 230 is implemented as an array of flip-flops, while in other examples, the register file can be implemented using latches, SRAM, or other forms of memory storage. The ISA specification for a given processor, for example processor 100, specifies how registers within the register file 230 are defined and used.

In some examples, the processor 100 includes a global register file that is shared by a plurality of the processor cores. In some examples, individual register files associated with a processor core can be combined to form a larger file, statically or dynamically, depending on the processor ISA and configuration.

As shown in FIG. 2, the memory store 215 of the instruction window 210 includes a number of decoded instructions 241, a left operand (LOP) buffer 242, a right operand (ROP) buffer 243, and an instruction scoreboard 245. In some examples of the disclosed technology, each instruction of the instruction block is decomposed into a row of decoded instructions, left and right operands, and scoreboard data, as shown in FIG. 2. The decoded instructions 241 can include partially- or fully-decoded versions of instructions stored as bit-level control signals. The operand buffers 242 and 243 store operands (e.g., register values received from the register file 230, data received from memory, immediate operands coded within an instruction, operands calculated by an earlier-issued instruction, or other operand values) until their respective decoded instructions are ready to execute. Instruction operands are read from the operand buffers 242 and 243, not the register file.

The memory store 216 of the second instruction window 211 stores similar instruction information (decoded instructions, operands, and scoreboard) as the memory store 215, but is not shown in FIG. 2 for the sake of simplicity. Instruction blocks can be executed by the second instruction window 211 concurrently or sequentially with respect to the first instruction window, subject to ISA constraints and as directed by the control unit 205.

In some examples of the disclosed technology, front-end pipeline stages IF and DC can run decoupled from the back-end pipelines stages (IS, EX, LS). In one embodiment, the control unit can fetch and decode two instructions per clock cycle into each of the instruction windows 210 and 211. In alternative embodiments, the control unit can fetch and decode one, four, or another number of instructions per clock cycle into a corresponding number of instruction windows. The control unit 205 provides instruction window dataflow scheduling logic to monitor the ready state of each decoded instruction's inputs (e.g., each respective instruction's predicate(s) and operand(s) using the scoreboard 245. When all of the inputs for a particular decoded instruction are ready, the instruction is ready to issue. The control logic 205 then initiates execution of one or more next instruction(s) (e.g., the lowest numbered ready instruction) each cycle and its decoded instruction and input operands are sent to one or more of functional units 260 for execution. The decoded instruction can also encode a number of ready events. The scheduler in the control logic 205 accepts these and/or events from other sources and updates the ready state of other instructions in the window. Thus execution proceeds, starting with the processor core's 111 ready zero input instructions, instructions that are targeted by the zero input instructions, and so forth.

The decoded instructions 241 need not execute in the same order in which they are arranged within the memory store 215 of the instruction window 210. Rather, the instruction scoreboard 245 is used to track dependencies of the decoded instructions and, when the dependencies have been met, the associated individual decoded instruction is scheduled for execution. For example, a reference to a respective instruction can be pushed onto a ready queue when the dependencies have been met for the respective instruction, and instructions can be scheduled in a first-in first-out (FIFO) order from the ready queue. Information stored in the scoreboard 245 can include, but is not limited to, the associated instruction's execution predicate (such as whether the instruction is waiting for a predicate bit to be calculated and whether the instruction executes if the predicate bit is true or false), availability of operands to the instruction, or other prerequisites required before executing the associated individual instruction.

In one embodiment, the scoreboard 245 can include decoded ready state, which is initialized by the instruction decoder 228, and active ready state, which is initialized by the control unit 205 during execution of the instructions. For example, the decoded ready state can encode whether a respective instruction has been decoded, awaits a predicate and/or some operand(s), perhaps via a broadcast channel, or is immediately ready to issue. The active ready state can encode whether a respective instruction awaits a predicate and/or some operand(s), is ready to issue, or has already issued. The decoded ready state can cleared on a block reset or a block refresh. Upon branching to a new instruction block, the decoded ready state and the active ready state is cleared (a block or core reset). However, when an instruction block is re-executed on the core, such as when it branches back to itself (a block refresh), only active ready state is cleared. Block refreshes can occur immediately (when an instruction block branches to itself) or after executing a number of other intervening instruction blocks. The decoded ready state for the instruction block can thus be preserved so that it is not necessary to re-fetch and decode the block's instructions. Hence, block refresh can be used to save time and energy in loops and other repeating program structures.

The number of instructions that are stored in each instruction window generally corresponds to the number of instructions within an instruction block. In some examples, the number of instructions within an instruction block can be 32, 64, 128, 1024, or another number of instructions. In some examples of the disclosed technology, an instruction block is allocated across multiple instruction windows within a processor core. In some examples, the instruction windows 210, 211 can be logically partitioned so that multiple instruction blocks can be executed on a single processor core. For example, one, two, four, or another number of instruction blocks can be executed on one core. The respective instruction blocks can be executed concurrently or sequentially with each other.

Instructions can be allocated and scheduled using the control unit 205 located within the processor core 111. The control unit 205 orchestrates fetching of instructions from memory, decoding of the instructions, execution of instructions once they have been loaded into a respective instruction window, data flow into/out of the processor core 111, and control signals input and output by the processor core. For example, the control unit 205 can include the ready queue, as described above, for use in scheduling instructions. The instructions stored in the memory store 215 and 216 located in each respective instruction window 210 and 211 can be executed atomically. Thus, updates to the visible architectural state (such as the register file 230 and the memory) affected by the executed instructions can be buffered locally within the core until the instructions are committed. The control unit 205 can determine when instructions are ready to be committed, sequence the commit logic, and issue a commit signal. For example, a commit phase for an instruction block can begin when all register writes are buffered, all writes to memory are buffered, and a branch target is calculated. The instruction block can be committed when updates to the visible architectural state are complete. For example, an instruction block can be committed when the register writes are written to the register file, the stores are sent to a load/store unit or memory controller, and the commit signal is generated. The control unit 205 also controls, at least in part, allocation of functional units 260 to each of the respective instructions windows.

As shown in FIG. 2, a first router 250, which has a number of execution pipeline registers 255, is used to send data from either of the instruction windows 210 and 211 to one or more of the functional units 260, which can include but are not limited to, integer ALUs (arithmetic logic units) (e.g., integer ALUs 264 and 265), floating point units (e.g., floating point ALU 267), shift/rotate logic (e.g., barrel shifter 268), or other suitable execution units, which can including graphics functions, physics functions, and other mathematical operations. Data from the functional units 260 can then be routed through a second router 270 to outputs 290, 291, and 292, routed back to an operand buffer (e.g. LOP buffer 242 and/or ROP buffer 243), or fed back to another functional unit, depending on the requirements of the particular instruction being executed. The second router 270 can include a load/store queue 275, which can be used to issue memory instructions, a data cache 277, which stores data being output from the core to memory, and load/store pipeline register 278.

The core also includes control outputs 295 which are used to indicate, for example, when execution of all of the instructions for one or more of the instruction windows 210 or 211 has completed. When execution of an instruction block is complete, the instruction block is designated as "committed" and signals from the control outputs 295 can in turn can be used by other cores within the block-based processor 100 and/or by the control unit 160 to initiate scheduling, fetching, and execution of other instruction blocks. Both the first router 250 and the second router 270 can send data back to the instruction (for example, as operands for other instructions within an instruction block).

As will be readily understood to one of ordinary skill in the relevant art, the components within an individual core are not limited to those shown in FIG. 2, but can be varied according to the requirements of a particular application. For example, a core may have fewer or more instruction windows, a single instruction decoder might be shared by two or more instruction windows, and the number of and type of functional units used can be varied, depending on the particular targeted application for the block-based processor. Other considerations that apply in selecting and allocating resources with an instruction core include performance requirements, energy usage requirements, integrated circuit die, process technology, and/or cost.

It will be readily apparent to one of ordinary skill in the relevant art that trade-offs can be made in processor performance by the design and allocation of resources within the instruction window (e.g., instruction window 210) and control logic 205 of the processor cores 110. The area, clock period, capabilities, and limitations substantially determine the realized performance of the individual cores 110 and the throughput of the block-based processor cores 110.

The instruction scheduler 206 can have diverse functionality. In certain higher performance examples, the instruction scheduler is highly concurrent. For example, each cycle, the decoder(s) write instructions' decoded ready state and decoded instructions into one or more instruction windows, selects the next instruction to issue, and, in response the back end sends ready events—either target-ready events targeting a specific instruction's input slot (predicate, left operand, right operand, etc.), or broadcast-ready events targeting all instructions. The per-instruction ready state bits, together with the decoded ready state can be used to determine that the instruction is ready to issue.

In some examples, the instruction scheduler 206 is implemented using storage (e.g., first-in first-out (FIFO) queues, content addressable memories (CAMs)) storing data indicating information used to schedule execution of instruction blocks according to the disclosed technology. For example, data regarding instruction dependencies, transfers of control, speculation, branch prediction, and/or data loads and stores are arranged in storage to facilitate determinations in mapping instruction blocks to processor cores. For example, instruction block dependencies can be associated with a tag that is stored in a FIFO or CAM and later accessed by selection logic used to map instruction blocks to one or more processor cores. In some examples, the instruction scheduler 206 is implemented using a general purpose processor coupled to memory, the memory being configured to store data for scheduling instruction blocks. In some examples, instruction scheduler 206 is implemented using a special purpose processor or using a block-based processor core coupled to the memory. In some examples, the instruction scheduler 206 is implemented as a finite state machine coupled to the memory. In some examples, an operating system executing on a processor (e.g., a general purpose processor or a block-based processor core) generates priorities, predictions, and other data that can be used at least in part to schedule instruction blocks with the instruction scheduler 206. As will be readily apparent to one of ordinary skill in the relevant art, other circuit structures, implemented in an integrated circuit, programmable logic, or other suitable logic can be used to implement hardware for the instruction scheduler 206.

In some cases, the scheduler 206 accepts events for target instructions that have not yet been decoded and must also inhibit reissue of issued ready instructions. Instructions can be non-predicated, or predicated (based on a true or false condition). A predicated instruction does not become ready until it is targeted by another instruction's predicate result, and that result matches the predicate condition. If the associated predicate does not match, the instruction never issues. In some examples, predicated instructions may be issued and executed speculatively. In some examples, a processor may subsequently check that speculatively issued and executed instructions were correctly speculated. In some examples a mispeculated issued instruction and the specific transitive closure of instructions in the block that consume its outputs may be re-executed, or mispeculated side effects annulled. In some examples, discovery of a mispeculated instruction leads to the complete roll back and re-execution of an entire block of instructions.

V. Example Stream of Instruction Blocks

Figure 3:
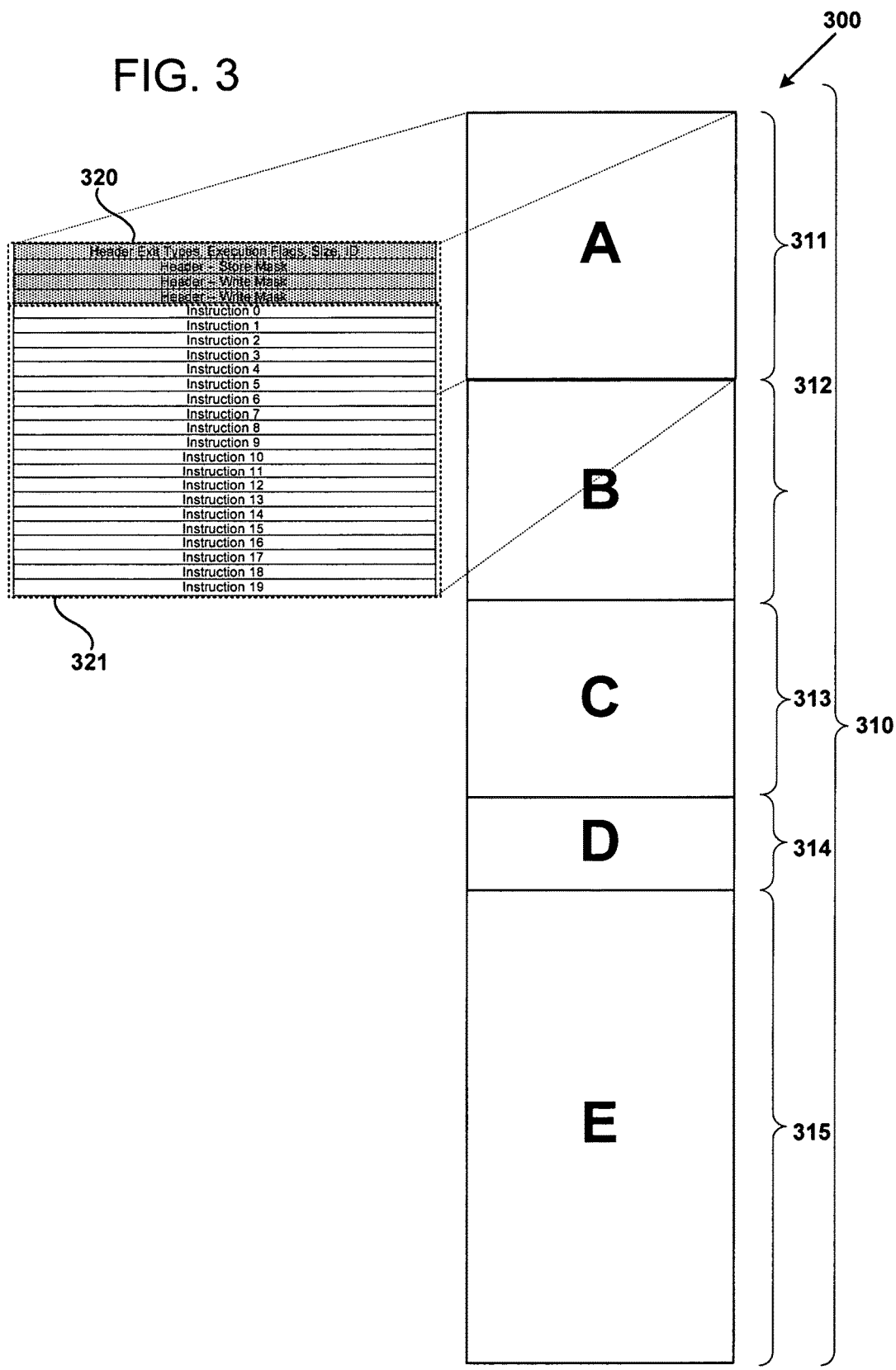
FIG. 3 illustrates a number of instruction blocks, according to certain examples of disclosed technology.

Turning now to the diagram 300 of FIG. 3, a portion 310 of a stream of block-based instructions, including a number of variable length instruction blocks 311-315 (A-E) is illustrated. The stream of instructions can be used to implement user application, system services, or any other suitable use. In the example shown in FIG. 3, each instruction block begins with an instruction header, which is followed by a varying number of instructions. For example, the instruction block 311 includes a header 320 and twenty instructions 321. The particular instruction header 320 illustrated includes a number of data fields that control, in part, execution of the instructions within the instruction block, and also allow for improved performance enhancement techniques including, for example branch prediction, speculative execution, lazy evaluation, and/or other techniques. The instruction header 320 also includes an ID bit which indicates that the header is an instruction header and not an instruction. The instruction header 320 also includes an indication of the instruction block size. The instruction block size can be in larger chunks of instructions than one, for example, the number of 4-instruction chunks contained within the instruction block. In other words, the size of the block is shifted 4 bits in order to compress header space allocated to specifying instruction block size. Thus, a size value of 0 indicates a minimally-sized instruction block which is a block header followed by four instructions. In some examples, the instruction block size is expressed as a number of bytes, as a number of words, as a number of n-word chunks, as an address, as an address offset, or using other suitable expressions for describing the size of instruction blocks. In some examples, the instruction block size is indicated by a terminating bit pattern in the instruction block header and/or footer.

The instruction block header 320 can also include execution flags, which indicate special instruction execution requirements. For example, branch prediction or memory dependence prediction can be inhibited for certain instruction blocks, depending on the particular application.

In some examples of the disclosed technology, the instruction header 320 includes one or more identification bits that indicate that the encoded data is an instruction header. For example; in some block-based processor ISAs, a single ID bit in the least significant bit space is always set to the binary value 1 to indicate the beginning of a valid instruction block. In other examples, different bit encodings can be used for the identification bit(s). In some examples, the instruction header 320 includes information indicating a particular version of the ISA for which the associated instruction block is encoded.

The block instruction header can also include a number of block exit types for use in, for example, branch prediction, control flow determination, and/or bad jump detection. The exit type can indicate what the type of branch instructions are, for example: sequential branch instructions, which point to the next contiguous instruction block in memory; offset instructions, which are branches to another instruction block at a memory address calculated relative to an offset; subroutine calls, or subroutine returns. By encoding the branch exit types in the instruction header, the branch predictor can begin operation, at least partially, before branch instructions within the same instruction block have been fetched and/or decoded.

The instruction block header 320 also includes a store mask which identifies the load-store queue identifiers that are assigned to store operations. The instruction block header can also include a write mask, which identifies which global register(s) the associated instruction block will write. The associated register file must receive a write to each entry before the instruction block can complete. In some examples a block-based processor architecture can include not only scalar instructions, but also single-instruction multiple-data (SIMD) instructions, that allow for operations with a larger number of data operands within a single instruction.

VI. Example Block Instruction Target Encoding

Figure 4:
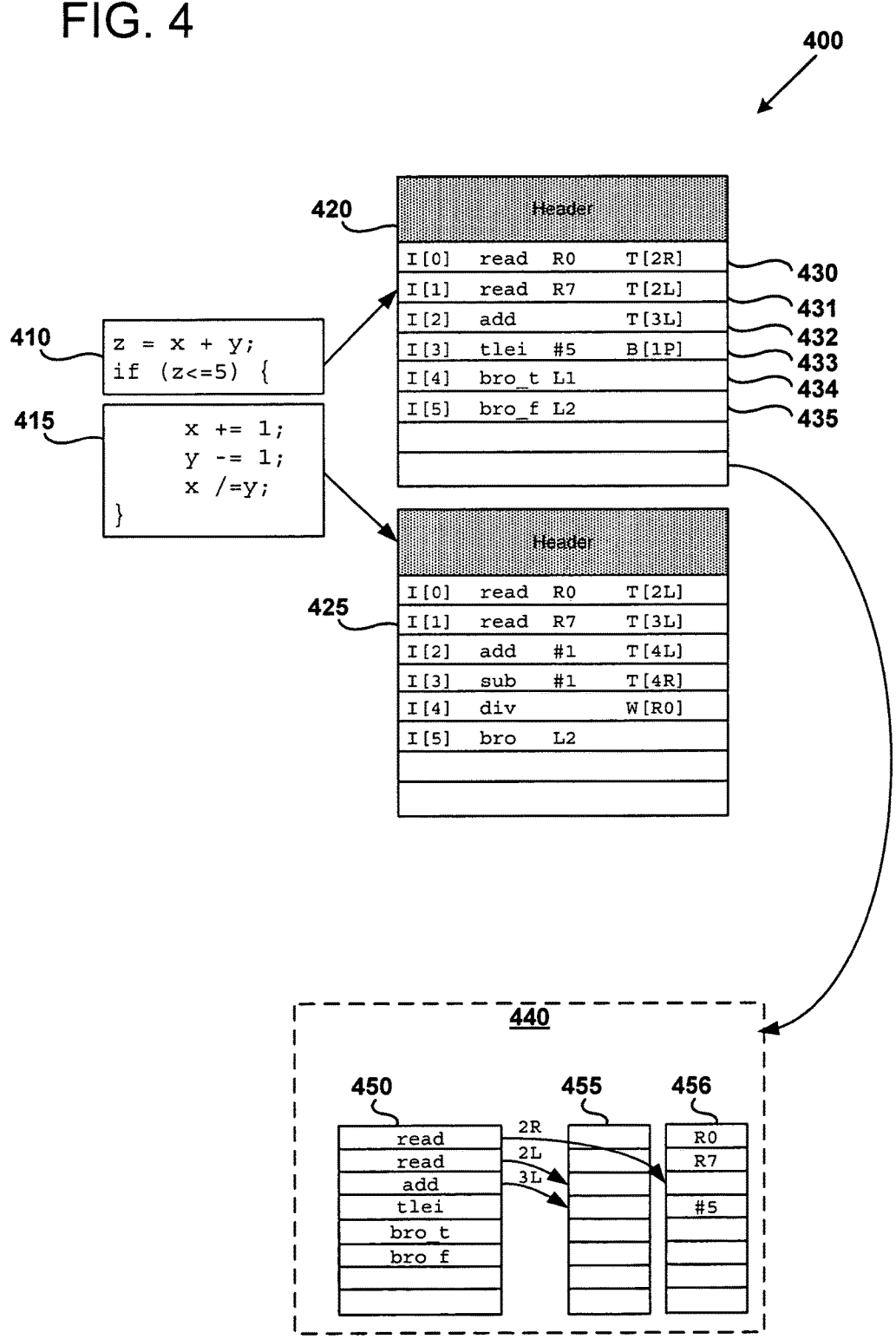
FIG. 4 illustrates portions of source code and respective instruction blocks.

FIG. 4 is a diagram 400 depicting an example of two portions 410 and 415 of C language source code and their respective instruction blocks 420 and 425 (in assembly language), illustrating how block-based instructions can explicitly encode their targets. The high-level C language source code can be translated to the low-level assembly language and machine code by a compiler whose target is a block-based processor. A high-level language can abstract out many of the details of the underlying computer architecture so that a programmer can focus on functionality of the program. In contrast, the machine code encodes the program according to the target computer's ISA so that it can be executed on the target computer, using the computer's hardware resources. Assembly language is a human-readable form of machine code.

In the following examples, the assembly language instructions use the following nomenclature: "I[<number>] specifies the number of the instruction within the instruction block where the numbering begins at zero for the instruction following the instruction header and the instruction number is incremented for each successive instruction; the operation of the instruction (such as READ, ADDI, DIV, and the like) follows the instruction number; optional values (such as the immediate value 1) or references to registers (such as R0 for register 0) follow the operation; and optional targets that are to receive the results of the instruction follow the values and/or operation. Each of the targets can be to another instruction, a broadcast channel to other instructions, or a register that can be visible to another instruction block when the instruction block is committed. An example of an instruction target is T[1R] which targets the right operand of instruction 1. An example of a register target is W[R0], where the target is written to register 0.

In the diagram 400, the first two READ instructions 430 and 431 of the instruction block 420 target the right (T[2R]) and left (T[2L]) operands, respectively, of the ADD instruction 432. In the illustrated ISA, the read instruction is the only instruction that reads from the global register file; however any instruction can target, the global register file. When the ADD instruction 432 receives the result of both register reads it will become ready and execute.

When the TLEI (test-less-than-equal-immediate) instruction 433 receives its single input operand from the ADD, it will become ready and execute. The test then produces a predicate operand that is broadcast on channel one (B[1P]) to all instructions listening on the broadcast channel, which in this example are the two predicated branch instructions (BRO_T 434 and BRO_F 435). The branch that receives a matching predicate will fire.

A dependence graph 440 for the instruction block 420 is also illustrated, as an array 450 of instruction nodes and their corresponding operand targets 455 and 456. This illustrates the correspondence between the block instructions 420, the corresponding instruction window entries, and the underlying dataflow graph represented by the instructions. Here decoded instructions READ 430 and READ 431 are ready to issue, as they have no input dependencies. As they issue and execute, the values read from registers R6 and R7 are written into the right and left operand buffers of ADD 432, marking the left and right operands of ADD 432 "ready." As a result, the ADD 432 instruction becomes ready, issues to an ALU, executes, and the sum is written to the left operand of TLEI 433.

As a comparison, a conventional out-of-order RISC or CISC processor would dynamically build the dependence graph at runtime, using additional hardware complexity, power, area and reducing clock frequency and performance. However, the dependence graph is known statically at compile time and an EDGE compiler can directly encode the producer-consumer relations between the instructions through the ISA, freeing the microarchitecture from rediscovering them dynamically. This can potentially enable a simpler microarchitecture, reducing area, power and boosting frequency and performance.

VII. Example Block-Based Instruction Formats

Figure 5:
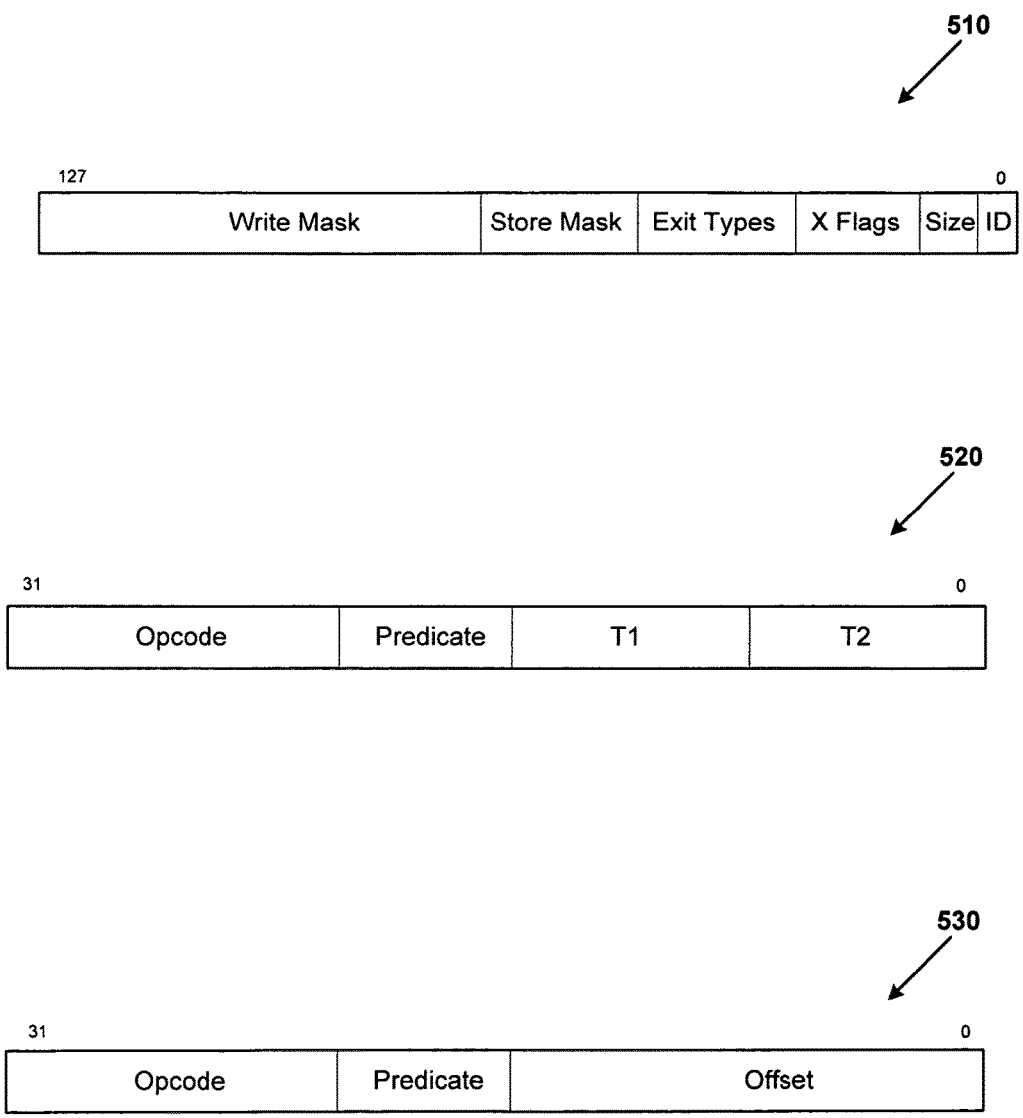
FIG. 5 illustrates block-based processor headers and instructions, as can be used in some examples of the disclosed technology.

FIG. 5 is a diagram illustrating generalized examples of instruction formats for an instruction header 510, a generic instruction 520, and a branch instruction 530. Each of the instruction headers or instructions is labeled according to the number of bits. For example the instruction header 510 includes four 32-bit words and is labeled from its least significant bit (lsb) (bit 0) up to its most significant bit (msb) (bit 127). As shown, the instruction header includes a write mask field, a store mask field, a number of exit type fields, a number of execution flag fields (X flags), an instruction block size field, and an instruction header ID bit (the least significant bit of the instruction header).

The execution flag fields can indicate special instruction execution modes. For example, an "inhibit branch predictor" flag can be used to inhibit branch prediction for the instruction block when the flag is set. As another example, an "inhibit memory dependence prediction" flag can be used to inhibit memory dependence prediction for the instruction block when the flag is set. As another example, a "break after block" flag can be used to halt an instruction thread and raise an interrupt when the instruction block is committed. As another example, a "break before block" flag can be used to halt an instruction thread and raise an interrupt when the instruction block header is decoded and before the instructions of the instruction block are executed.

The exit type fields include data that can be used to indicate the types of control flow and/or synchronization instructions encoded within the instruction block. For example, the exit type fields can indicate that the instruction block includes one or more of the following: sequential branch instructions, offset branch instructions, indirect branch instructions, call instructions, return instructions, and/or break instructions. In some examples, the branch instructions can be any control flow instructions for transferring control flow between instruction blocks, including relative and/or absolute addresses, and using a conditional or unconditional predicate. The exit type fields can be used for branch prediction and speculative execution in addition to determining implicit control flow instructions. In some examples, up to six exit types can be encoded in the exit type fields, and the correspondence between fields and corresponding explicit or implicit control flow instructions can be determined by, for example, examining control flow instructions in the instruction block.

The illustrated generic block instruction 520 is stored as one 32-bit word and includes an opcode field, a predicate field, a broadcast ID field (BID), a first target field (T1), and a second target field (T2). For instructions with more consumers than target fields, a compiler can build a fanout tree using move instructions, or it can assign high-fanout instructions to broadcasts. Broadcasts support sending an operand over a lightweight network to any number of consumer instructions in a core. A broadcast identifier can be encoded in the generic block instruction 520.

While the generic instruction format outlined by the generic instruction 520 can represent some or all instructions processed by a block-based processor, it will be readily understood by one of skill in the art that, even for a particular example of an ISA, one or more of the instruction fields may deviate from the generic format for particular instructions. The opcode field specifies the length or width of the instruction 520 and the operation(s) performed by the instruction 520, such as memory read/write, register load/store, add, subtract, multiply, divide, shift, rotate, system operations, or other suitable instructions. The predicate field specifies the condition under which the instruction will execute. For example, the predicate field can specify the value "true," and the instruction will only execute if a corresponding condition flag matches the specified predicate value. In some examples, the predicate field specifies, at least in part, which is used to compare the predicate, while in other examples, the execution is predicated on a flag set by a previous instruction (e.g., the preceding instruction in the instruction block). In some examples, the predicate field can specify that the instruction will always, or never, be executed. Thus, use of the predicate field can allow for denser object code, improved energy efficiency, and improved processor performance, by reducing the number of branch instructions.

The target fields T1 and T2 specifying the instructions to which the results of the block-based instruction are sent. For example, an ADD instruction at instruction slot 5 can specify that its computed result will be sent to instructions at slots 3 and 10. Depending on the particular instruction and ISA, one or both of the illustrated target fields can be replaced by other information, for example, the first target field T1 can be replaced by an immediate operand, an additional opcode, specify two targets, etc.

The branch instruction 530 includes an opcode field, a predicate field, a broadcast ID field (BID), and an offset field. The opcode and predicate fields are similar in format and function as described regarding the generic instruction. The offset can be expressed in units of four instructions, thus extending the memory address range over which a branch can be executed. The predicate shown with the generic instruction 520 and the branch instruction 530 can be used to avoid additional branching within an instruction block. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. For example, a BRO_F (predicated false) instruction will issue if it is sent a false predicate value.

It should be readily understood that, as used herein, the term "branch instruction" is not limited to changing program execution to a relative memory location, but also includes jumps to an absolute or symbolic memory location, subroutine calls and returns, and other instructions that can modify the execution flow. In some examples, the execution flow is modified by changing the value of a system register (e.g., a program counter PC or instruction pointer), while in other examples, the execution flow can be changed by modifying a value stored at a designated location in memory. In some examples, a jump register branch instruction is used to jump to a memory location stored in a register. In some examples, subroutine calls and returns are implemented using jump and link and jump register instructions, respectively.

VIII. Example States of a Processor Core

Figure 6:
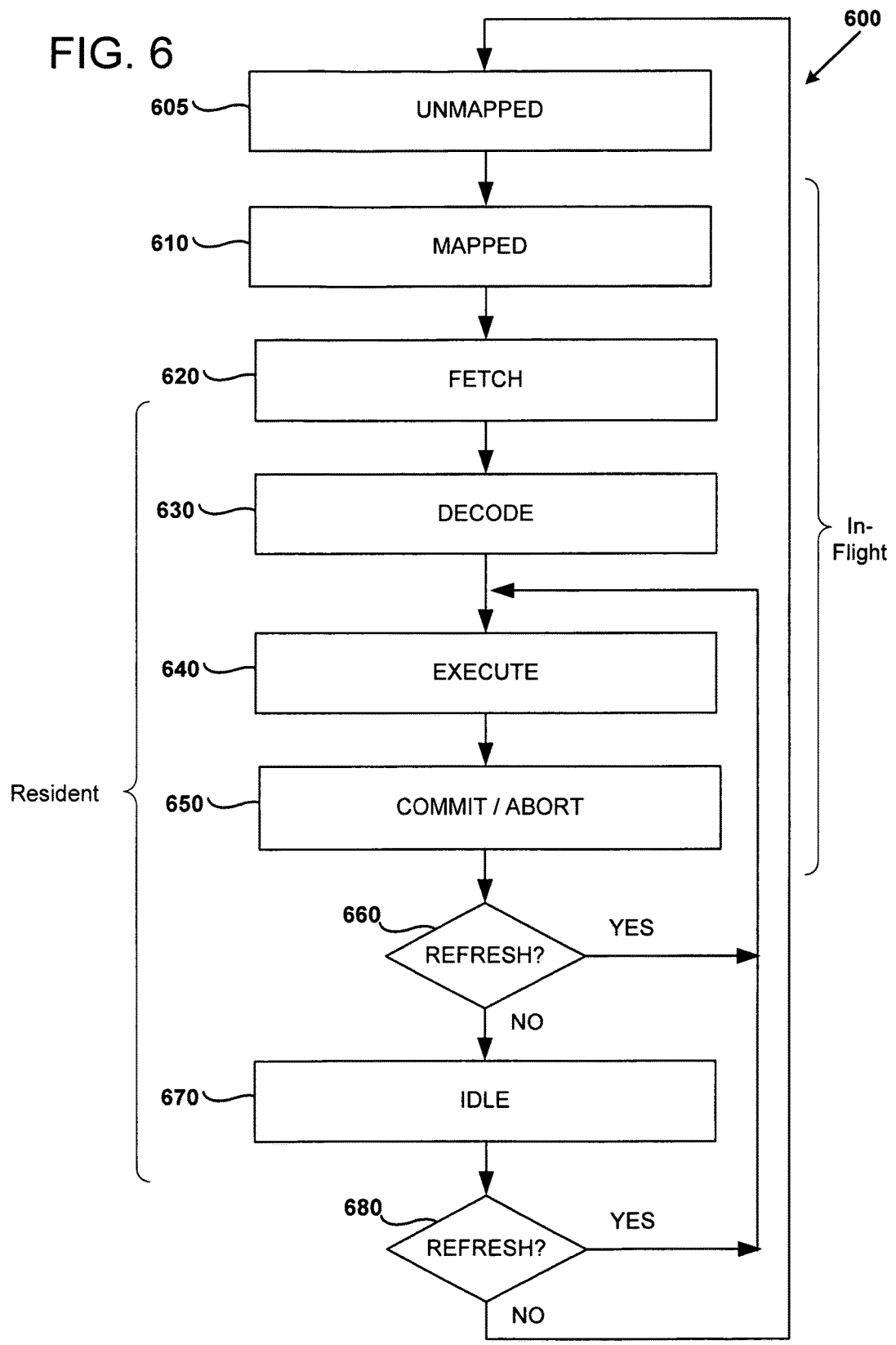
FIG. 6 is a flowchart illustrating an example of a progression of states of a processor core of a block-based processor.

FIG. 6 is a flowchart illustrating an example of a progression of states 600 of a processor core of a block-based computer. The block-based computer is composed of multiple processor cores that are collectively used to run or execute a software program. The program can be written in a variety of high-level languages and then compiled for the block-based processor using a compiler that targets the block-based processor. The compiler can emit code that, when run or executed on the block-based processor, will perform the functionality specified by the high-level program. The compiled code can be stored in a computer-readable memory that can be accessed by the block-based processor. The compiled code can include a stream of instructions grouped into a series of instruction blocks. During execution, one or more of the instruction blocks can be executed by the block-based processor to perform the functionality of the program: Typically, the program will include more instruction blocks than can be executed on the cores at any one time. Thus, blocks of the program are mapped to respective cores, the cores perform the work specified by the blocks, and then the blocks on respective cores are replaced with different blocks until the program is complete. Some of the instruction blocks may be executed more than once, such as during a loop or a subroutine of the program. An "instance" of an instruction block can be created for each time the instruction block will be executed. Thus, each repetition of an instruction block can use a different instance of the instruction block. As the program is run, the respective instruction blocks can be mapped to and executed on the processor cores based on architectural constraints, available hardware resources, and the dynamic flow of the program. During execution of the program, the respective processor cores can transition through a progression of states 600, so that one core can be in one state and another core can be in a different state.

At state 605, a state of a respective processor core can be unmapped. An unmapped processor core is a core that is not currently assigned to execute an instance of an instruction block. For example, the processor core can be unmapped before the program begins execution on the block-based computer. As another example, the processor core can be unmapped after the program begins executing but not all of the cores are being used. In particular, the instruction blocks of the program are executed, at least in part, according to the dynamic flow of the program. Some parts of the program may flow generally serially or sequentially, such as when a later instruction block depends on results from an earlier instruction block. Other parts of the program may have a more parallel flow, such as when multiple instruction blocks can execute at the same time without using the results of the other blocks executing in parallel. Fewer cores can be used to execute the program during more sequential streams of the program and more cores can be used to execute the program during more parallel streams of the program.

At state 610, the state of the respective processor core can be mapped. A mapped processor core is a core that is currently assigned to execute an instance of an instruction block or is reserved as part of a logical resource. When the instruction block is mapped to a specific processor core, the instruction block is in-flight. An in-flight instruction block is a block that is targeted to a particular core of the block-based processor, and the block will be or is executing, either speculatively or non-speculatively, on the particular processor core. In particular, the in-flight instruction blocks correspond to the instruction blocks mapped to processor cores in states 610-650. A block executes non-speculatively when it is known during mapping of the block that the program will use the work provided by the executing instruction block. A block executes speculatively when it is not known during mapping whether the program will or will not use the work provided by the executing instruction block. Executing a block speculatively can potentially increase performance, such as when the speculative block is started earlier than if the block were to be started after or when it is known that the work of the block will be used. However, executing speculatively can potentially increase the energy used when executing the program, such as when the speculative work is not used by the program.

A block-based processor includes a finite number of homogeneous or heterogeneous processor cores. A typical program can include more instruction blocks than can fit onto the processor cores. Thus, the respective instruction blocks of a program will generally share the processor cores with the other instruction blocks of the program. In other words, a given core may execute the instructions of several different instruction blocks during the execution of a program. Having a finite number of processor cores also means that execution of the program may stall or be delayed when all of the processor cores are busy executing instruction blocks and no new cores are available for dispatch. When a processor core becomes available, an instance of an instruction block can be mapped to the processor core.

An instruction block scheduler can assign which instruction block will execute on which processor core and when the instruction block will be executed. The mapping can be based on a variety of factors, such as a target energy to be used for the execution, the number and configuration of the processor cores, the current and/or former usage of the processor cores, the dynamic flow of the program, whether speculative execution is enabled, a confidence level that a speculative block will be executed, and other factors. An instance of an instruction block can be mapped to a processor core that is currently available (such as when no instruction block is currently executing on it). In one embodiment, the instance of the instruction block can be mapped to a processor core that is currently busy (such as when the core is executing a different instance of an instruction block) and the later-mapped instance can begin when the earlier-mapped instance is complete.

At state 620, the state of the respective processor core can be fetch. For example, the IF pipeline stage of the processor core can be active during the fetch state. Fetching an instruction block can include transferring the block from memory (such as the L1 cache, the L2 cache, or main memory) to the processor core, and reading instructions from local buffers of the processor core so that the instructions can be decoded. For example, the instructions of the instruction block can be loaded into an instruction cache, buffer, or registers of the processor core. Multiple instructions of the instruction block can be fetched in parallel (e.g., at the same time) during the same clock cycle. The fetch state can be multiple cycles long and can overlap with the decode (630) and execute (640) states when the processor core is pipelined.

When instructions of the instruction block are loaded onto the processor core, the instruction block is resident on the processor core. The instruction block is partially resident when some, but not all, instructions of the instruction block are loaded. The instruction block is fully resident when all instructions of the instruction block are loaded. The instruction block will be resident on the processor core until the processor core is reset or a different instruction block is fetched onto the processor core. In particular, an instruction block is resident in the processor core when the core is in states 620-670.

At state 630, the state of the respective processor core can be decode. For example, the DC pipeline stage of the processor core can be active during the fetch state. During the decode state, instructions of the instruction block are being decoded so that they can be stored in the memory store of the instruction window of the processor core. In particular, the instructions can be transformed from relatively compact machine code, to a less compact representation that can be used to control hardware resources of the processor core. The decode state can be multiple cycles long and can overlap with the fetch (620) and execute (640) states when the processor core is pipelined. After an instruction of the instruction block is decoded, it can be executed when all dependencies of the instruction are met.

At state 640, the state of the respective processor core can be execute. During the execute state, instructions of the instruction block are being executed. In particular, the EX and/or LS pipeline stages of the processor core can be active during the execute state. The instruction block can be executing speculatively or non-speculatively. A speculative block can execute to completion or it can be terminated prior to completion, such as when it is determined that work performed by the speculative block will not be used. When an instruction block is terminated, the processor can transition to the abort state. A speculative block can complete when it is determined the work of the block will be used, all register writes are buffered, all writes to memory are buffered, and a branch target is calculated, for example. A non-speculative block can execute to completion when all register writes are buffered, all writes to memory are buffered, and a branch target is calculated, for example. The execute state can be multiple cycles long and can overlap with the fetch (620) and decode (630) states when the processor core is pipelined. When the instruction block is complete, the processor can transition to the commit state.

At state 650, the state of the respective processor core can be commit or abort. During commit, the work of the instructions of the instruction block can be atomically committed so that other blocks can use the work of the instructions. In particular, the commit state can include a commit phase where locally buffered architectural state is written to architectural state that is visible to or accessible by other processor cores. When the visible architectural state is updated, a commit signal can be issued and the processor core can be released so that another instruction block can be executed on the processor core. During the abort state, the pipeline of the core can be halted to reduce dynamic power dissipation. In some applications, the core can be power gated to reduce static power dissipation. At the conclusion of the commit/abort states, the processor core can receive a new instruction block to be executed on the processor core, the core can be refreshed, the core can be idled, or the core can be reset.

At state 660, it can be determined if the instruction block resident on the processor core can be refreshed. As used herein, an instruction block refresh or a processor core refresh means enabling the processor core to re-execute one or more instruction blocks that are resident on the processor core. In one embodiment, refreshing a core can include resetting the active-ready state for one or more instruction blocks. It may be desirable to re-execute the instruction block on the same processor core when the instruction block is part of a loop or a repeated sub-routine or when a speculative block was terminated and is to be re-executed. The decision to refresh can be made by the processor core itself (contiguous reuse) or by outside of the processor core (non-contiguous reuse). For example, the decision to refresh can come from another processor core or a control core performing instruction block scheduling. There can be a potential energy savings when an instruction block is refreshed on a core that already executed the instruction as opposed to executing the instruction block on a different core. Energy is used to fetch and decode the instructions of the instruction block, but a refreshed block can save most of the energy used in the fetch and decode states by bypassing these states. In particular, a refreshed block can re-start at the execute state (640) because the instructions have already been fetched and decoded by the core. When a block is refreshed, the decoded instructions and the decoded ready state can be maintained while the active ready state is cleared. The decision to refresh an instruction block can occur as part of the commit operations or at a later time. If an instruction block is not refreshed, the processor core can be idled.

At state 670, the state of the respective processor core can be idle. The performance and power consumption of the block-based processor can potentially be adjusted or traded off based on the number of processor cores that are active at a given time. For example, performing speculative work on concurrently running cores may increase the speed of a computation but increase the power if the speculative misprediction rate is high. As another example, immediately allocating new instruction blocks to processors after committing or aborting an earlier executed instruction block may increase the number of processors executing concurrently, but may reduce the opportunity to reuse instruction blocks that were resident on the processor cores. Reuse may be increased when a cache or pool of idle processor cores is maintained. For example, when a processor core commits a commonly used instruction block, the processor core can be placed in the idle pool so that the core can be refreshed the next time that the same instruction block is to be executed. As described above, refreshing the processor core can save the time and energy used to fetch and decode the resident instruction block. The instruction blocks/processor cores to place in an idle cache can be determined based on a static analysis performed by the compiler or a dynamic analysis performed by the instruction block scheduler. For example, a compiler hint indicating potential reuse of the instruction block can be placed in the header of the block and the instruction block scheduler can use the hint to determine if the block will be idled or reallocated to a different instruction block after committing the instruction block. When idling, the processor core can be placed in a low-power state to reduce dynamic power consumption, for example.

At state 680, it can be determined if the instruction block resident on the idle processor core can be refreshed. If the core is to be refreshed, the block refresh signal can be asserted and the core can transition to the execute state (640). If the core is not going to be refreshed, the block reset signal can be asserted and the core can transition to the unmapped state (605). When the core is reset, the core can be put into a pool with other unmapped cores so that the instruction block scheduler can allocate a new instruction block to the core.

IX. Example Multicore Processor Architectures

Figure 7:
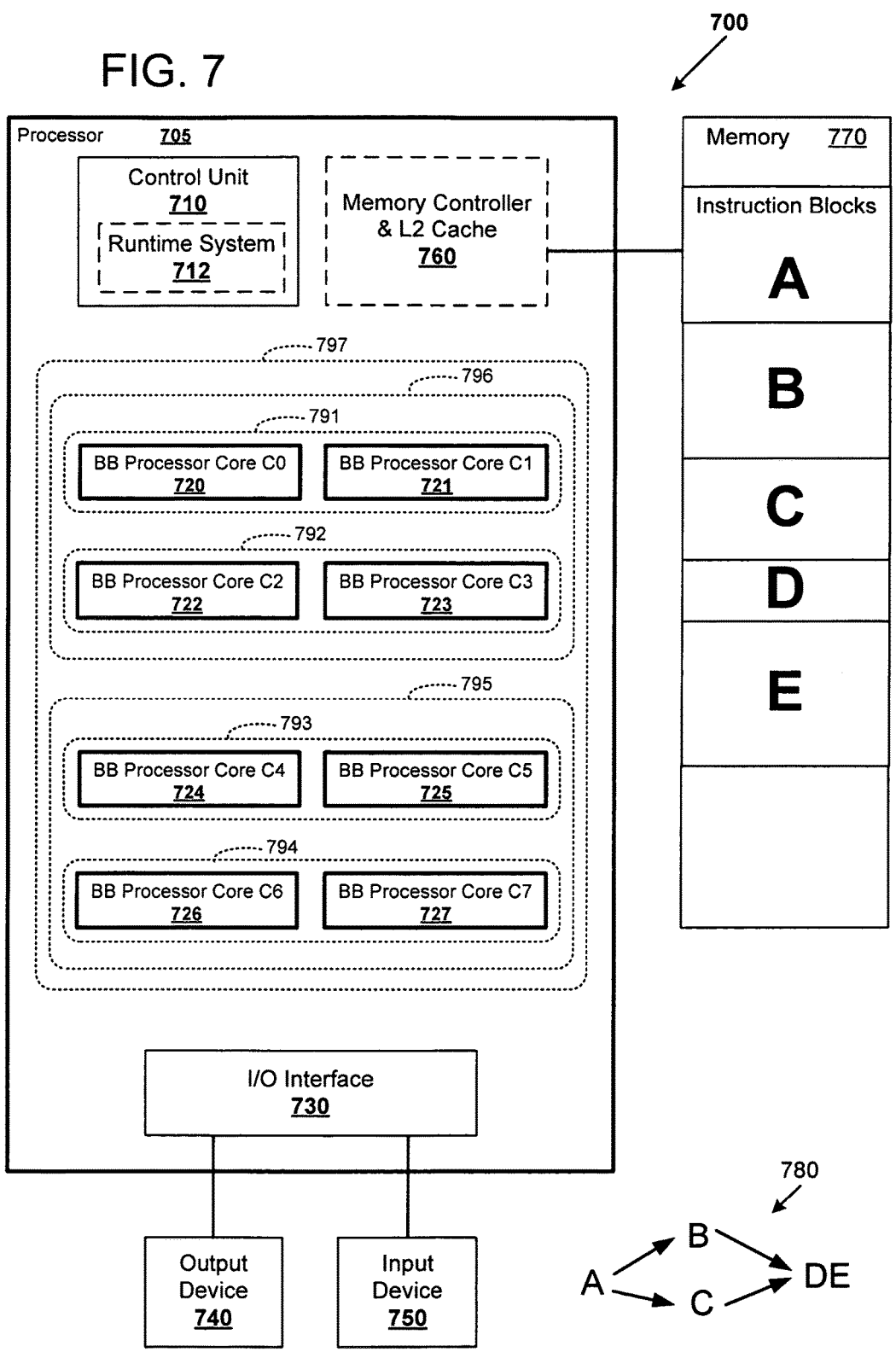
FIG. 7 is a diagram illustrating an example system including a processor having multiple block-based processor cores.
Figure 8:
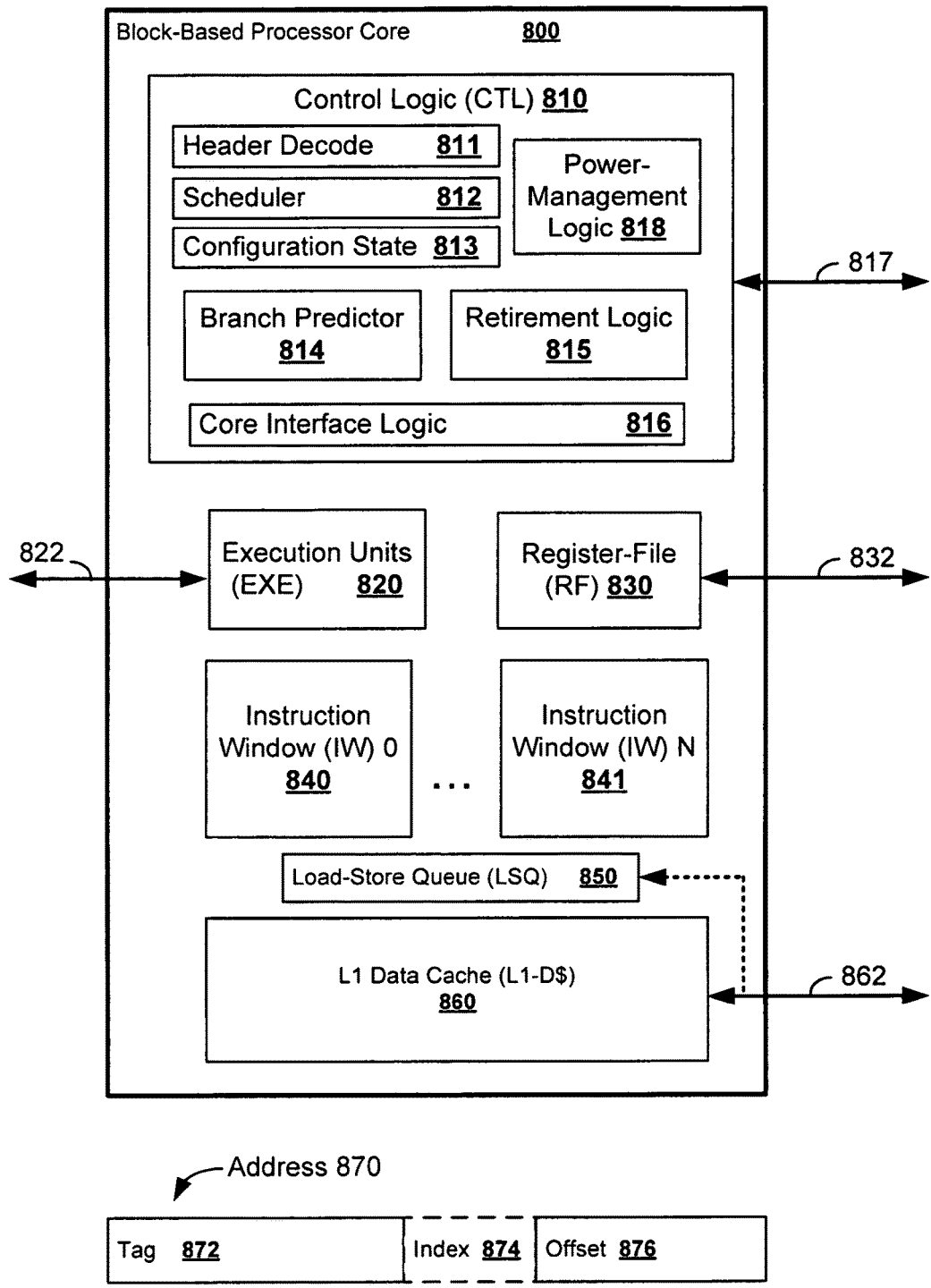
FIG. 8 is a diagram illustrating an example of a block-based processor core including sharable and non-shareable resources.
Figure 10:
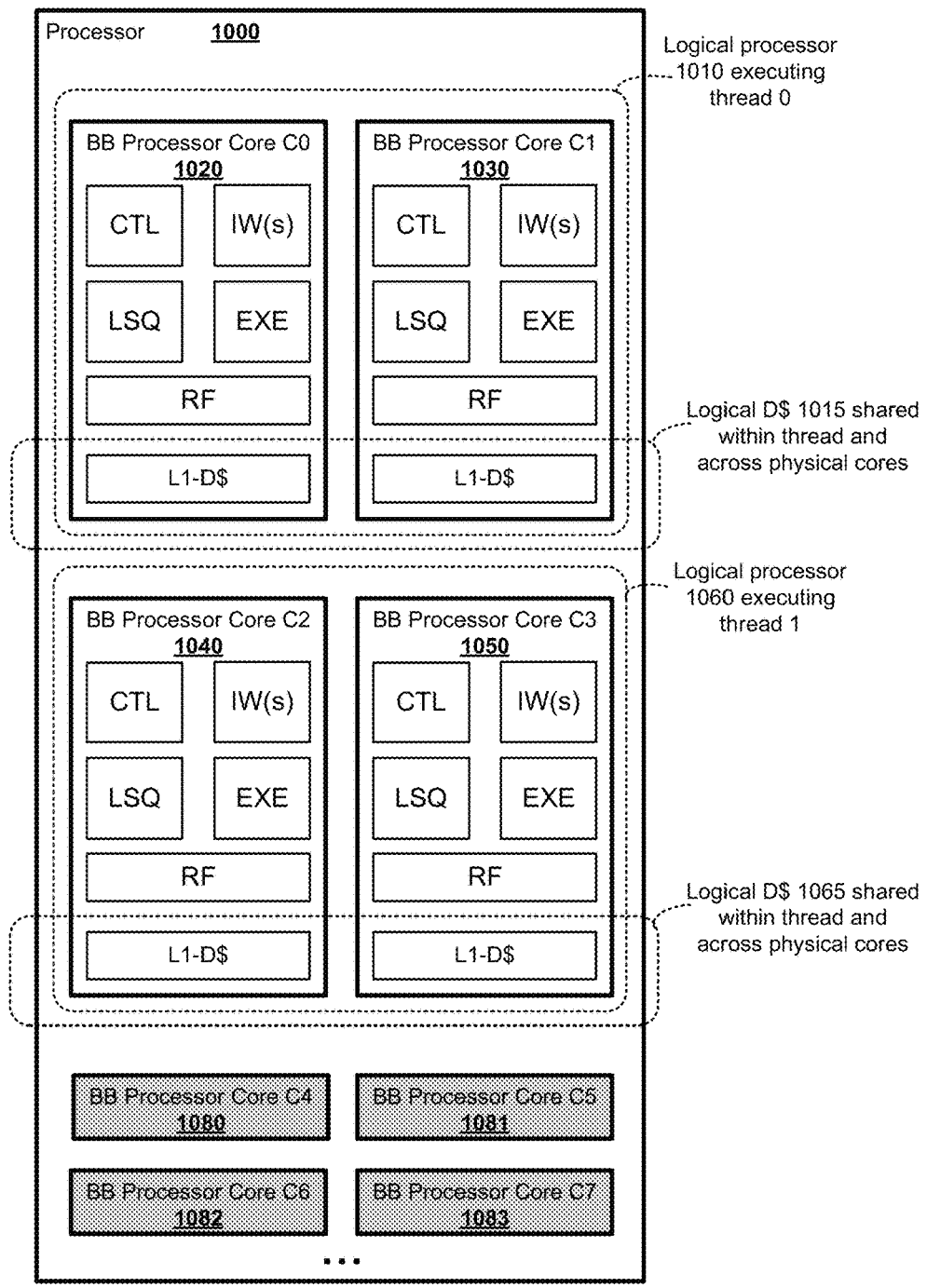
FIGS. 10-12 illustrate examples of multi-core processors configured so that resources are shared between the physical processor cores.
Figure 11:
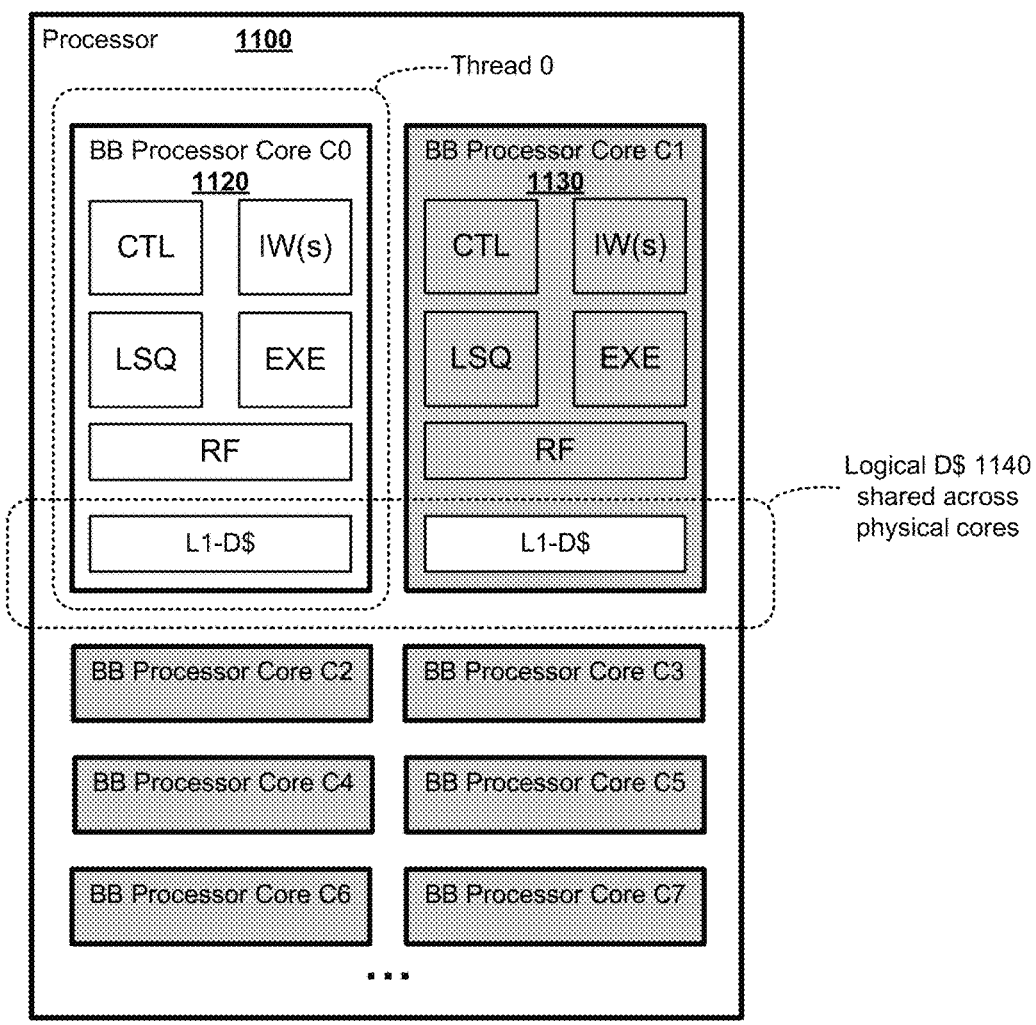
Figure 12:
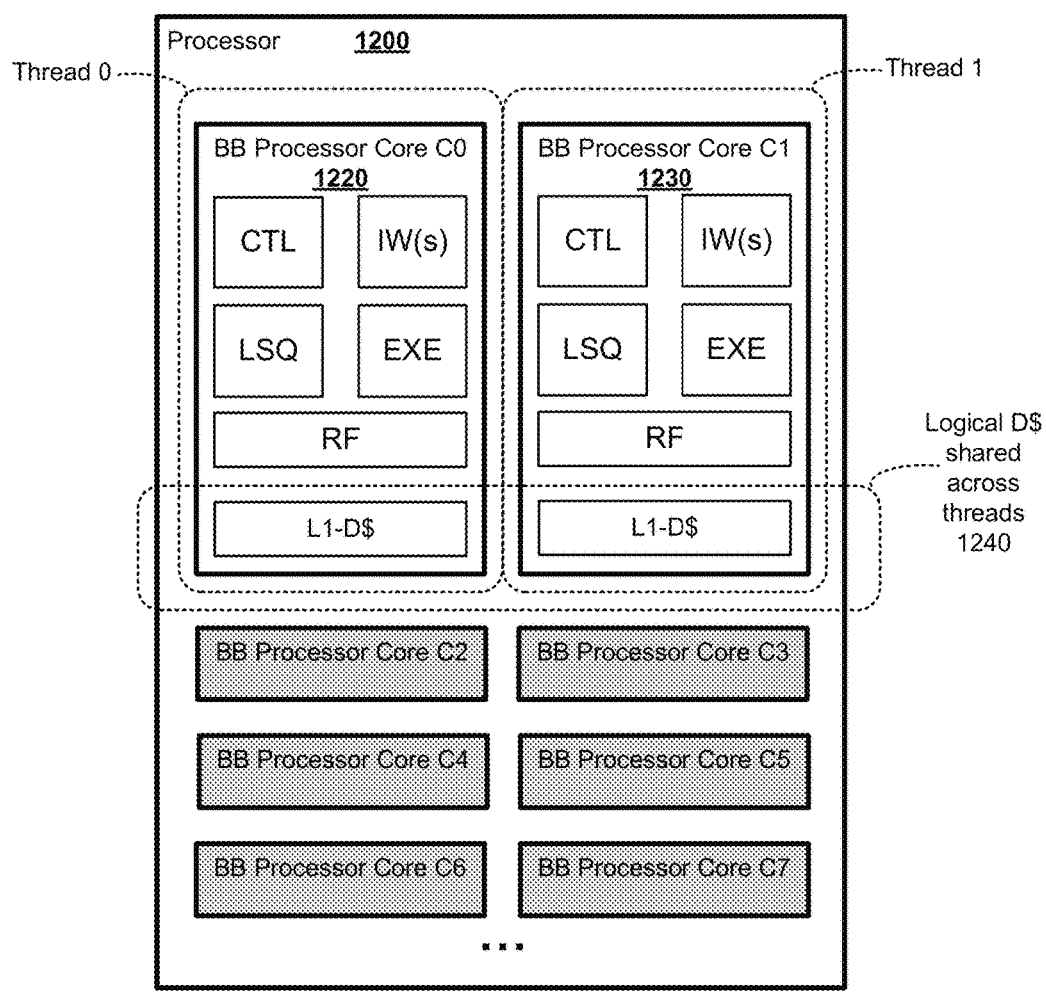

A multi-core processor can include multiple block-based physical processor cores, where each physical core includes one or more shareable resources. A physical processor core corresponds directly to a fabricated processor core of the processor. FIG. 7 illustrates an example system including a processor having multiple physical processor cores. FIG. 8 illustrates an example of a block-based processor core including sharable and non-shareable resources. FIG. 9 illustrates example control registers of a block-based processor core. For example, the control registers can be used to select which resources of a physical core are shared between cores and which physical cores are composed into logical cores. FIGS. 10-12 illustrate various examples of multi-core processors configured so that resources are shared between the physical processor cores.

As described herein, a multi-core processor can be dynamically adapted for a given workload by sharing resources between physical cores, by combining physical cores into a larger logical core, and/or by breaking apart logical cores into smaller logical or physical cores. A logical core can include one or more physical cores coordinating among one another to execute instruction blocks within a thread of a program. A thread is a unit of control within the program where instruction blocks are ordered according to a control flow of the thread. The thread can include one or more instruction blocks of the program. The thread may include a thread identifier to distinguish it from other threads, a program counter referencing a non-speculative instruction block of the thread, a logical register file for passing values between instruction blocks of the thread, and a stack for storing data, such as activation records, local to the thread. A program can be multi-threaded, where each thread can operate independently of the other threads. Thus, different threads can execute on different respective logical cores.

Multiple physical cores can be merged together at runtime to form larger, more powerful logical cores. As a specific example, serial portions of a workload can be handled by composing multiple physical cores into a larger logical processor that performs like an aggressive superscalar. Alternatively, when ample thread-level parallelism is available, the same large logical processor can be decomposed or split into multiple logical processors so each physical processor can work independently and execute instruction blocks from independent threads. Merging physical cores together is called composing logical cores, while splitting logical cores is called decomposing logical cores.

Logical cores can interleave accesses to registers and memory among the physical cores to give the logical core the combined computational resources of all the composed physical cores. For example, a logical core composed of two physical cores can use an additional bit of the address to choose between the cores' two physical caches, effectively doubling the L1 cache capacity. The register files can be similarly interleaved.

Each instruction block of a thread is mapped to a single physical processor. When composed, the architecture can use additional cores of the logical processor to execute speculative instruction blocks of the thread. Speculation can potentially increase performance on serial workloads by performing work earlier than would be performed when using only non-speculative execution. When the non-speculative block commits, it can send a commit signal along with an exit branch address to all other cores in the logical processor. Speculative blocks on the correct path can continue to execute, while blocks on non-taken paths can be aborted.

Composing a logical core may be desirable when the overhead of changing configurations is less than the performance gains of a more efficient configuration. Composition is always done at block boundaries and can be initiated by the runtime system. The runtime system can be distributed among the physical cores or can execute on a global control unit of the processor. The physical cores and the sharable resources of the physical cores can be composed in various different ways, each offering a different trade-off in overhead and efficiency.

A full composition changes the number of physical cores in a logical core, and changes the register file and cache mappings. Dirty cache lines can be written out to main memory lazily. Logical registers and cache locations are distributed evenly throughout the physical cores. Cache lines are mapped into banks, where each bank corresponds to a cache of a specific physical core. Thus, the full composition can include a larger logical cache that is the sum of the cache capacities of all physical cores of the logical core. FIG. 10 illustrates an example of a full composition.

A quick composition adds additional physical cores to a logical processor, but retains the same L1 data cache and register mappings, and does not write dirty cache lines out to main memory during the composition. This results in the logical processor having a smaller data cache than possible with a full composition, but enables accesses to data already in the cache to still hit after composing. Quick composition may be desirable for short-lived bursts of activity where additional execution units are useful, but where the overhead of reconfiguring the caches may be greater than the savings from a larger, more efficient cache configuration.

A resource composition adds additional physical resources to a logical core without adding all capabilities of an additional physical core. For example, a logical cache can be composed using the caches of multiple physical cores. Specifically, a thread may use a dataset that exceeds the cache size of a physical processor. The cache hit-rate of the thread may be potentially improved by increasing the cache size available to the thread by composing a logical cache using the caches from neighboring physical cores. The non-cache resources of the neighboring physical cores can be powered down to conserve energy. FIGS. 11 and 12 illustrate examples of resource compositions. Decomposition removes physical cores or resources from a logical processor and may power down the removed cores or resources to conserve energy. Execution can continue on the remaining physical cores. Decomposition can include flushing the dirty lines of each cache being dropped from the logical processor and updating the cache mapping. Dirty cache lines in the remaining physical cores can be written back when a cache line is evicted.

Turning to FIG. 7, a computing system 700 can include a processor 705, a memory 770, an input device 750, and an output device 740. The processor 705 can include a control unit 710, a plurality of physical block-based (BB) processor cores 720-727, an input/output (I/O) interface 730, and an optional memory controller and/or level-two (L2) cache 760. The control unit 710 includes logic for managing execution of the processor, such as code for executing all or a portion of a runtime system 712. The I/O interface 730 can be used for connecting the processor 705 to various input devices (such as the input device 750) and various output devices (such as the output device 740). The I/O interface 730 may include one or more I/O bridges using one more communication protocols, such as Peripheral Component Interconnect (PCI), PCI-Express, Universal Serial Bus (USB), Accelerated Graphics Port (AGP), and the like. In some examples, the control unit 710, the memory controller and L2 cache 760, and the I/O interface 730 are implemented at least in part using one or more of hardwired finite state machines, programmable microcode, programmable gate arrays, or other suitable control circuits. In some examples, the control unit 710, the memory controller and L2 cache 760, and the I/O interface 730 are implemented at least in part using a processor (e.g., an on-chip processor executing control code) and/or an external computer (e.g., an off-chip processor executing control code and communicating with the processor 705 via a communications interface (not shown)).

The memory 770 can include stored instructions of a program. For example, the program can include the instruction blocks A-E. The processor 705 may communicate with the memory 770 via the memory controller and L2 cache 760 to fetch or load all or portions of the program onto one or more of the physical processor cores 720-727. Specifically, the memory controller and L2 cache 760 can be used to generate the control signals for communicating with the memory 770 and to provide temporary storage for information coming from or going to the memory 770. Alternatively, the physical processor cores 720-727 can communicate directly with the memory 770.

The control unit 710 includes logic for managing execution of the processor, such as code for executing all or a portion of a runtime system 712. For example, the runtime system 712 can include code for: allocating and organizing memory for the instructions of the program; allocating, deallocating, and organizing memory for the data of the program; allocating, deallocating, and scheduling the physical BB processor cores 720-727 for executing the program; allocating, deallocating, and scheduling sharable resources of the physical BB processor cores 720-727; and providing an interface between the program and an operating system. For example, the runtime system 712 can include an instruction block scheduler for allocating the physical BB processor cores 720-727 so that one or more programs can be executed on the processor 705. For example, the instruction block scheduler can allocate instruction blocks of a program to one or more of the physical BB processor cores 720-727 that are idle. The instruction blocks of the program can be allocated to the physical BB processor cores 720-727 as the program is being executed, so only a portion of the instruction blocks of the program may be resident on the physical BB processor cores 720-727 at any given time.

As a specific example, a short program can include a single thread of control including the instruction blocks A-E. The instruction block scheduler can allocate a single logical processor to execute the thread. The logical processor can include a single physical processor core or multiple physical processor cores. Multiple instruction blocks can be scheduled to a given physical processor core. For example, a physical processor core may have storage for up to 128 decoded instructions which can be further divided into instruction block slots or instruction windows with storage for up to 32 decoded instructions. Thus, a given physical processor core may execute from one to four instruction blocks sequentially or concurrently, where different instruction blocks are executed using different respective instruction windows of the given physical processor core.

A thread executes according to a control flow of the thread. For example, the thread including the instruction blocks A-E can have a dependence graph 780. The control flow through the thread may differ depending on inputs to the program. Thus, during one run of the program, the instruction blocks ABDE may be executed and during another run of the program, the instruction blocks ACDE may be executed. In this example, only one of the instruction blocks B and C will execute during a given run of the program. Non-speculative execution of the thread can include serially executing instruction blocks of the thread, according to the control flow, where the next instruction block of the thread is not started until the next instruction block of the thread is known. Thus, when the thread is only executed non-speculatively, the instruction blocks B or C will not begin to execute until instruction block A is committed or until the target address (e.g., the address of block B or C) from block A is known. However, the thread can potentially be sped up by speculatively executing one or more of blocks B and C before the target address from block A is known. For example, only the block B, only the block C, or both of the blocks B and C can begin speculatively executing before the target address from block A is known. The blocks D and E can also begin speculatively executing before the target address from block A is known. Speculative execution of an instruction block can occur on the same physical core (e.g., in a different instruction window) or on a different physical core that is part of the logical processor executing the thread. As one example, the instruction block A can be non-speculatively executing on physical processor core 720 while the instruction blocks B, D, and E are speculatively executing on the physical processor cores 721, 722, and 723, respectively. When the target address from block A is known, the blocks on the correct path can continue to execute, while blocks on non-taken paths can be aborted.

A logical processor for executing the thread of the program can include one or more of the physical processor cores 720-727. The physical processor cores 720-727 have a placement or orientation within the processor 705. For example, the processor 705 can be a monolithic integrated circuit (IC) and the physical processor cores 720-727 can be fabricated over an area of the IC, where each of the physical processor cores 720-727 are non-overlapping. As illustrated, the physical processor cores 720-727 can be arranged in a 2×4 array having two columns and four rows. However, a processor can include various numbers of physical BB processor cores arranged in various topologies. While a 2×4 array is selected for illustrative purposes, 1×4, 2×2, 4×4, 8×8, 4×8, and the like are possible design choices for the physical BB processor cores. The physical cores of a logical core can coordinate with each other via control signals running between the physical cores. Thus, it may be desirable for the physical cores selected for a logical core to be physically close to one another so that control signals can propagate between the cores in less time than if the cores were physically more distant.

As described herein, the specific physical processor cores 720-727 to be assigned to a given logical core can be assigned independent of their physical proximity or assigned based on the topology of the processor 705 and additional criteria. As one example, the runtime system 712 can compose a logical processor using any two idle physical cores, such as the physical processor cores 720 and 727. The physical processor cores 720 and 727 can be physically adjacent or physically apart (as illustrated). As another example, the physical processor cores capable of being part of a given logical processor can be constrained based on the topology of the processor 705 and a number of physical processor cores of the logical processor. As a specific example, any logical processor composed of two cores can be composed from only physical processor cores within a row, such as illustrated with the dotted lines 791-794. Additionally or alternatively, any logical processor composed of four cores can be composed from only physical processor cores within a quad, such as illustrated with the dotted lines 795-796. Additionally or alternatively, a logical processor can be composed from all of the physical processor cores, such as illustrated with the dotted line 797. It should be noted that the physical processor cores composing a logical processor can be constrained in various different ways. For example, pairs and/or quads of physical processor cores can be grouped within columns.

Some resources of an individual physical processor core can be shared by other physical processor cores within a logical processor. For example, each of the physical processor cores can include a level-one (L1) data cache, and all physical processor cores of a logical core can share the L1 data caches so that the logical processor effectively has a larger L1 data cache than any of the individual physical processor cores. Additionally or alternatively, some resources of an individual physical processor core can be shared by other physical processor cores outside of a logical processor. Additionally or alternatively, other resources of the individual physical processor core can be private and not shared by other physical processor cores outside of the individual physical processor core.

FIG. 8 illustrates an example of a physical block-based processor core 800 including both sharable and non-shareable resources. The processor core 800 can include control logic 810, execution units 820, a register file 830, instruction windows 840-841, a load-store queue 850, and an L1 data cache 860. In one embodiment, the sharable resources may include the execution units 820, the register file 830, and the L1 data cache 860. The non-sharable resources may include the control logic 810, the instruction windows 840-841, and the load-store queue 850. In alternative embodiments, the sharable and non-sharable resources may be partitioned differently. In some examples, the control logic 810, the execution units 820, the register file 830, the instruction windows 840-841, the load-store queue 850, and the L1 data cache 860 are implemented at least in part using one or more of: hardwired finite state machines, programmable microcode, programmable gate arrays, or other suitable control circuits.

The control logic 810 can include logic for controlling operation of the physical block-based processor core 800. For example, the control logic 810 can include header decode logic 811, an instruction scheduler 812, configuration state 813, a branch predictor 814, retirement logic 815, core interface logic 816, and power-management logic 818. The header decode logic 811 can be used for decoding instruction block headers for instruction blocks that are to be executed on the processor core 800. The instruction scheduler 812 can be used to schedule instructions of an instruction block executing on the processor core 800. For example, the instructions can be scheduled in dataflow order as operands become available for the respective instructions. The configuration state 813 can include registers, such as described in reference to FIG. 9, for programming the processor core 800 to be associated with a given logical processor and/or to share one or more sharable resources with another processor core. The registers can be memory mapped into visible architectural state of the processor core 800 so that the values of the registers are changed only during a commit phase of an instruction block writing to the registers. Specifically, the values of the registers may be changed during a commit phase of an instruction block executing on a processor core different than the processor core 800.

The branch predictor 814 can speculate across instruction blocks by predicting a branch exit address for each instruction block. The branch predictor 814 can speculate across instruction blocks using various algorithms, such as by using sequential block prediction (e.g., assuming the next sequential instruction block is taken) or look-ahead branch prediction (e.g., using a fetch table buffer). Predicting the branch exit address allows instruction blocks to be fetched and begin speculative execution before the current block has completed. The oldest instruction block is marked as non-speculative, and may predict a branch exit address. The predicted address (corresponding to a predicted instruction block) can be fetched and the predicted instruction block can begin executing on another physical core in the logical processor or on the same physical core (e.g., the processor core 800) if there is an available instruction window.

The taken branch address may resolve before the instruction block completes. In this case, the non-speculative block can notify the other cores in the logical processor of the taken address using a taken branch signal. The oldest instruction block then becomes the non-speculative block. Any blocks that were not correctly speculated can be aborted. The taken branch signal is different from the commit signal. While the taken branch allows the next block to continue speculation and begin fetching a new instruction block, updated register and memory values are not valid until after the commit signal The branch predictor 814 can speculate within instruction blocks by predicting predicate values and a control flow path through the instruction block. Three different types of speculation can be used within an instruction block including predicate speculation, memory speculation, and load speculation. Predicate speculation can be used to predict the value of predicates. Memory speculation includes loading values for a speculative block from the L1 cache that may be changed by less-speculative blocks. Load speculation can include using the load-store queue to allow loads to execute before stores with lower load-store identifiers. In all three cases, mispeculation causes re-execution of the entire instruction block. For example the valid bits in all of the operand buffers can be reset and zero operand instructions can be reloaded.

The retirement logic 815 can monitor the progress of an executing block and manage the commit phase of non-speculative instruction blocks. An instruction block can be completed without executing all of the instructions in a block because of predicated execution. An instruction block can be complete when one (and only one) branch has executed, and all instructions that modify external state (register writes and stores) have executed. For example, the compiler can encode the register writes and store identifiers in the instruction block header so that the retirement logic 815 can identify when all register writes and stores are complete. During execution, the instructions of the block do not modify visible architectural state. Instead, all changes are buffered and commit together during the commit phase. Once the processor core 800 enters the commit phase for the instruction block, the logical register file is updated with all register writes, and all stores in the load-store queue are sent to the logical L1 data cache beginning with the lowest sequence identifier. As described further below, the logical register file can include the register file 830 and/or register files from other physical processor cores. Similarly, the logical L1 data cache can include the L1 data cache 860 and/or L1 data caches from other physical processor cores. Once all register writes and stores have committed, the retirement logic 815 can send a commit signal to all other physical cores in the same logical processor. Only non-speculative blocks can be committed and speculative blocks will wait to commit until the speculative block is the oldest block and thus, no longer speculative.

The core interface logic 816 provides logic for communicating with other physical processor cores. For example, the core interface logic 816 can be used to communicate with other physical processor cores within a logical processor using the control interface 817. The control interface 817 can include a collection of control signals, a bus, or a network on a chip (NOC), for example. The control interface 817 can include the taken branch signal, a target address signal, a commit signal, and other various signals for communicating between the physical processor cores.

The power-management logic 818 can include logic for dynamically and selectively reducing energy consumption of the processor core 800. For example, the power-management logic 818 can include logic to place one or more components of the processor core 800 into a low-power mode. The low-power mode can include clock-gating, voltage-scaling, frequency-scaling, and/or power-gating the respective component. The power-management logic 818 can include logic to wake up components of the processor core 800 that are in the low-power mode. Various different amounts of the processor core 800 can be selected to be placed in the low-power mode depending on performance and power goals. For example, sharable and non-sharable resources of the processor core 800 can be fabricated on different voltage islands and/or with different clock-trees. The non-sharable resources can be on one voltage island and clock-tree and the different sharable resources can be have different respective voltage islands and clock-trees. As a specific example, the sharable resources can include the execution units 820, the register file 830, and the L1 Data cache 860. Each of the sharable resources can have a different voltage island and/or clock-tree so that each of the sharable resources can independently be placed in a low-power mode, such as by programming a register of the power-management logic 818. Alternatively, the majority of the processor core 800 can be in a low-power mode while one or more sharable components are in full operational mode. As a specific example, the majority of the processor core 800 can be in a low-power mode while only the L1 data cache 860 is powered on. The majority of the processor core 800 can include all sharable and non-sharable resources other than a resource that is specifically powered-on and the power-management logic 818. The power-management logic 818 is powered on even when the rest of the processor core 800 is in low-power mode so that the power-management logic 818 can respond to a wake-up request.

The L1 data cache 860 can be used to temporarily store program data. The L1 data cache 860 can include a content addressable memory (CAM) and logic to access and manage the contents of the CAM. The L1 data cache 860 can be arranged in lines, where each line corresponds to a contiguous range of addresses in main memory. The L1 data cache 860 is generally smaller than the main memory, so the L1 data cache 860 can hold a subset of the data that is in main memory. The subset of the data is tracked by storing a reference to the addresses associated with each line of data from the main memory that is stored in the L1 data cache 860. An address 870 can be divided into different fields to provide a mapping of the addresses in memory to the lines stored in the L1 data cache 860. For example, the address 870 can be divided into a tag field 872, an optional index field 874, and an offset field 876. The tag field 872 is stored in the L1 data cache 860 when the contents of the memory are loaded into a line of the L1 data cache 860. The tag field references the memory location where the data was read from and/or will be written back to. The offset field 876 is an address of data within the line. For example, if the cache line is 1024 bits, there are 128 bytes and 32 32-bit words in the cache line. The offset field 876 can distinguish between the different bytes and/or words within the cache line when less than the entire cache line is referenced. The index field 874 can be used to map a cache line to a bank and/or set of a logical cache. The index field 874 is not used when the logical cache includes only a single direct-mapped cache since there is only one bank. However, the index field 874 is used to distinguish between different banks of the logical cache when the logical cache includes multiple physical caches.

The L1 data cache 860 can be sharable with other physical processor cores. As one example, the L1 data cache 860 can be shared with other physical processor cores of a logical processor. Additionally or alternatively, the L1 data cache 860 can be shared with other physical processor cores that are not part of a logical processor. When the L1 data cache 860 is shared with other physical processor cores, the L1 data cache 860 is part of a larger logical cache. For example, the L1 data cache 860 can be a bank of the logical cache. As described further below, each physical cache can be assigned a bank identifier corresponding to a value of the index field 874. When the index field bits of an address to memory hits or matches the bank identifier of the L1 data cache 860, the L1 data cache 860 is used when responding to the memory access.

The L1 data cache 860 can communicate with other processor cores using a cache interface 862. The cache interface 862 can include a read/write enable, address signals, and data signals. For example, the L1 data cache 860 can provide data to another processor core issuing a request for the data using the cache interface 862. The L1 data cache 860 is visible architectural state and so it is updated when an instruction block commits. Specifically, intermediate results of the instruction block can be buffered in the load-store queue 850 before being committed to the L1 data cache 860. In some embodiments, the load-store queue 850 can be accessed when the L1 data cache 860 is shared with other processor cores.

The execution units 820 can be used to execute instructions of an instruction block. The execution units 820 can include one or more of arithmetic logic units (ALUs), floating point units (FPUs), barrel-shifters, multipliers, graphics accelerators, physics accelerators, and various other logic functions for executing mathematical and/or logical operations of an instruction. The decoded instructions of the instruction block and operands of the instructions can be stored in the instruction windows 840-841. An instruction is executed in part by routing the operands of the instruction to the appropriate execution unit 820 and storing the output of the execution unit 820 in the operand buffer of another instruction, the load-store queue 850, and/or the register file 830. Under the dataflow execution model of the block-based processor core 800, instructions can potentially issue or execute as soon as the instruction is decoded and all of the operands are available for the instruction. However, the number of instructions that can execute in parallel can be limited by a number of execution units 820 that are available on the processor core 800. As a specific example, if there are four ALU instructions ready to execute, but the processor core 800 has access to only two ALUs, then only two ALU instructions can be issued in parallel in the same cycle. However, the execution units 820 can be sharable among the physical processor cores to form a logical group of execution units. Issue logic of the instruction scheduler 812 can choose individual execution units from within the logical group of execution units to execute the instructions of the instruction block. For example, control signals, operands, and results can be passed between the physical cores using an execution unit interface 822. Specifically, operands can be routed from an instruction window of a first physical processor core to an execution unit of a second physical processor core using the execution unit interface 822. Results from the execution unit of the second physical processor core can be routed back to first physical processor core using the execution unit interface 822. Executing instructions on a non-local processor core may add delays to account for communication between the physical processor cores, so the instruction scheduler 812 may prioritize executing instructions on the local physical processor core.

The register file 830 is visible architectural state that can be used to store data that is passed between instruction blocks. The register file 830 can include buffers or a shadow register file for storing intermediate results of the instruction block and the register file 830 can be updated during the commit phase. The register file 830 can be sharable among the physical processor cores to form a logical register file. The individual registers of the register file 830 are numbered or addressed similar to locations in memory. Each physical register file can be a bank of a logical register file and so an index within the register number can be used to determine which bank is referenced. A register file interface 832 can be used to communicate control signals, addresses, and data to register files on different physical processor cores.

FIG. 9 is a diagram illustrating example control registers of a physical block-based processor core. The control registers can be used to program which resources of the physical processor core are shared with other physical processor cores. The control registers can be used to program which physical processor cores can share resources among each other. The control registers are visible architectural state that can be programmed at a runtime of a program. Specifically, the control registers are updated during a commit phase of an instruction block. The control registers can be accessed in a variety of ways, including one or more of: general purpose memory-mapped loads and stores; specific instructions for reading and writing the control registers; protected (such as through a privileged or kernel mode) memory-mapped loads and stores; and commands scanned in through a test access port. In some examples, the control registers are implemented at least in part using one or more of: flip-flops, latches, a register file, static random access memory (SRAM), dynamic random access memory, electrically erasable programmable read-only memory (EEPROM), Flash memory, or other suitable memory element.

A composition control register 900 of a given physical processor core can be used to program which resources of the given physical processor core are shared with other physical processor cores. For example, a master control register (MCR) field 901 can be encoded to indicate the resources of the given physical processor core that are shared with other physical cores. The MCR field 901 can include a number of bits to enable sharing of various resources, indicate the given physical core is part of a logical core, and/or to power-down the majority of the given physical processor core or specific resources of the given physical processor core. One example of encodings for the MCR field 901 are illustrated in table 910. In this example, the least significant bit (bit 0) can be used to enable sharing of the L1 data cache; bit 1 can be used to enable sharing of the register file; bit 2 can be used to enable sharing of the execution units; bit 3 can be used to indicate that the given physical processor core is part of a larger logical processor core; and the most significant bit (bit 4) can be used to indicate a default power-state for the given physical processor core, where a "0" indicates the default state is low-power mode and a "1" indicates the default state is powered up. Multiple bits can be set at the same time to share multiple resources. Specific examples of encodings of the MCR field 901 include: a "00000" encoding can power down the majority of the given physical processor core including the shareable resources of the core; a "10000" encoding can power up the given physical processor core and keep the shareable resources private within the given physical processor core; a "00001" encoding can enable the L1 data cache to be shared among the other physical processor cores and power down the rest of the given physical processor core; a "00010" encoding can enable the register-file to be shared among the other physical processor cores and power down the rest of the given physical processor core; a "00100" encoding can enable the execution units to be shared among the other physical processor cores and power down the rest of the given physical processor core; a "11001" encoding can indicate the given physical processor core is part of a larger logical processor core and enable the L1 data cache to be shared among the other physical processor cores; and a "11000" encoding can indicate the given physical processor core is part of a larger logical processor core and can power-down the L1 data cache. It should be noted that these encodings are selected for illustrative purposes, and different various encodings having more or less bits are possible.

The composition control register 900 can include an optional number of cores field 902 for programming a number of physical processor cores that can share resources among each other. As one example, the number of cores field can be programmable with any number up to a maximum number of cores of the processor. In another example, the number of cores field can include separate bits corresponding to different legal numbers of physical cores that can be grouped. As a particular example, the physical cores may only be grouped in powers of two so that index fields of the address are fully mapped to cores. Thus, groupings of one, two, four, and eight physical processor cores may be allowed for a processor comprising eight physical processor cores. The number of cores field 902 may include a first bit for grouping two physical processor cores, a second bit for grouping four physical processor cores, and a third bit for grouping eight physical processor cores, for example. Alternatively, the value programmed in the number of cores field 902 may indicate the power of two cores that are grouped, so a value of three can indicate that eight cores are grouped together.

The value programmed in the number of cores field 902 and the relative physical position of the given physical processor core can be used to compose a logical processor and/or a logical resource. For example, the sharing of resources can be constrained based on the topology of the processor, such as described with reference to FIG. 7. In particular, a grouping of two physical cores can be constrained to a row of the processor and a grouping of four physical cores can be constrained to a quad of the processor. The MCR field 901 can determine whether the grouping of processor cores corresponds to a logical core and/or a logical resource. For example, if a bit (e.g., bit 3) of the MCR field 901 is set, the given physical processor core is part of a larger logical processor core. However, if the bit of the MCR field 901 is clear and another bit corresponding to a shareable resource is set, the resource can be shared without the given physical processor core being part of a larger logical processor core.

The MCR fields of different processor cores within a grouping of physical processor cores can be programmed differently so that the different processor cores share resources differently. For example, a logical processor can include a first processor and a second processor. The first processor can share its L1 cache and the second processor can have its L1 cache disabled.

The composition control register 900 can be a processor-level register rather than a processor core level register. For example, the composition control register 900 can be part of a processor-level control unit. The composition control register 900 can include separate MCR fields for each respective processor core of the processor. For example, the composition control register 900 can include a MCR0 field 901 corresponding to a processor core 0, a MCR1 field 903 corresponding to a processor core 1, and a MCRn field 904 corresponding to a processor core n, where the processor includes n processor cores. The values of the processor-level composition control register 900 can be communicated to the individual processor cores in various ways. For example, the values of the processor-level composition control register 900 can be continuously delivered to the individual processor cores via dedicated control signals. As another example, updates to the processor-level composition control register 900 can be communicated to the individual processor cores via interrupts or messages sent over an on-chip network.

In one embodiment, a given processor core can include a composition control register 900 and a composition topology register 920. The composition control register 900 can be used to indicate which resources of the given physical processor core are shared among a group of physical processor cores and the composition topology register 920 can be used to indicate which physical processor cores are part of the group of physical processor cores. For example, the composition topology register 920 can include a plurality of bits 921-923 that can be programmed to logically group physical processor cores together. As a specific example, the bits 921-923 can represent a bit-map of the processor cores that are part of the logical group. Bit C0 921 can correspond to a first physical processor core, bit C1 922 can correspond to a second physical processor core, and bit Cn 923 can correspond to an nth physical processor core, where the processor includes n physical processor cores. Thus, if the bits C0 921 and C1 922 are the only bits set in the composition topology register 920, then the first and second physical processor cores are part of a logical group. As a particular example, if the MCR fields of the respective composition control registers 900 indicate the physical processor cores are part of a larger logical processor core then the first and second physical processor cores are part of a logical processor. Alternatively, if the MCR fields of the respective composition control registers 900 indicate the physical processor cores only share their L1 caches, then the L1 caches of the first and second physical processor cores form a logical L1 cache, but the first and second physical processor cores are not part of a logical processor.

The bits 921-923 can be programmed so that the selected physical processor cores are sparsely distributed across the topology of the processor. However, it may be desirable to closely group the physical processor cores of a logical group to reduce communication delays between the physical processor cores. The physical processor core can include monitoring logic to analyze the programmed value of the composition topology register 920. As an example, the processor core can assert an interrupt or reject programming values that fail proximity criteria of the grouping.

The composition topology register 920 can include an optional topology mode setting 924 for indicating how to interpret the bits 921-923. For example, if the topology mode setting 924 is programmed with a first value (e.g., a "0"), the bits 921-923 can be a bitmap of the physical processor cores, as described earlier. If the topology mode setting 924 is programmed with a second value (e.g., a "1"), the bits 921-923 can be a number of physical processor cores for the group. The number of physical processor cores combined with a relative position of a respective physical processor core can be used to define the physical processor cores of the grouping. For example, each physical processor core can be grouped only within a predefined row, column, quad, and so forth.

In an alternative embodiment, a control register can be dedicated to a single sharable resource and used to program the accessibility of the sharable resource. For example, the sharable resource can be one or more of a cache, a register file, or an execution unit. As a specific example, a cache composition control register 930 can be used to program the grouping of physical processor cores that can share the caches of the respective physical processor cores. The cache composition control register 930 can include a number of data cache banks field 931 for programming how many physical cache banks are used to create a logical cache. In one example, the number of physical cache banks and a relative physical position of a respective physical processor core within a topology of the processor is used to determine all of the physical cache banks of the logical cache. For example, each physical cache bank can be grouped only within a predefined row, column, quad, and so forth. In another example, the logical cache can include physical cache banks from any of the physical processor cores of the processor. As a specific example, a number of identification fields, such as core identification (Core ID) fields 932-935, can be used to identify the individual physical cache banks. For example, a particular core identification field can be programmed with an address or identifier corresponding to a particular physical processor core. In particular, each of the physical processor cores can be identified with a unique number and/or a position (e.g., a row and column) within the processor. The number of identification fields can vary from zero to M, where M is a maximum number of cache banks allowed for a logical cache. M may be less than or equal to the number of physical cache banks on a processor.

The position of the core identification field within the cache composition control register 930 can be used to map an index field of an address to a particular physical cache bank of a logical cache. As a specific example, the logical cache can be configured to have two physical cache banks by programming the number of data cache banks field 931 with a "2;" the core identification field 932 can correspond to an index field of "0" and the core identification field 933 can correspond to an index field of "1." As another example, the logical cache can be configured to have four physical cache banks by programming the number of data cache banks field 931 with a "4;" the core identification field 932 can correspond to an index field of "00," the core identification field 933 can correspond to an index field of "01," the core identification field 934 can correspond to an index field of "10," and the core identification field 935 can correspond to an index field of "11." Similarly, additional core identification fields can be added to map to more index field bits to the physical cache banks of larger logical caches.

A processor topology register 940 can provide topology information of a processor to a runtime system. The runtime system can use the topology information to make decisions regarding how to group physical processor cores and/or shareable resources into logical cores and/or resources. The processor topology register 940 can indicate a number of rows of physical processor cores using a rows field 942. The processor topology register 940 can indicate a number of columns of physical processor cores using a columns field 944. The number of rows and columns reported by the processor topology register 940 can be fixed when the processor is designed and provided by a read-only memory. The processor topology register 940 can indicate a unique identifier for the type of processor using a processor type identifier field 946. For example, during an initialization sequence, the runtime system can read the processor type identifier field 946 to determine what type of processor is executing the runtime system, and based on the value read from the processor type identifier field 946, the topology information of the processor can be determined. For example, topology information for different processor types can be stored in tables associated with different respective processor type identifiers. Thus, by providing a unique identifier for the type of processor, topology information can be determined using software (e.g., reading the tables) as well as by reading values hard-coded in the processor topology register 940.

FIGS. 10-12 illustrate examples of multi-core processors configured so that resources are shared between the physical processor cores. FIG. 10 illustrates an example of multiple logical processors executing multiple threads of a program. FIG. 11 illustrates an example of a logical cache including multiple physical cache banks. FIG. 12 illustrates an example of multiple logical processors executing multiple threads of a program and using a shared logical cache.

In FIG. 10, a processor 1000 comprises eight physical block-based processor cores 1020, 1030, 1040, 1050, and 1080-1083 arranged in a two column by four row array. The processor 1000 is illustrated during execution of a program having multiple threads including thread 0 and thread 1. Each of the threads can include one or more instruction blocks that can be executed on a logical processor of the processor 1000. For example, thread 0 can be executed on a logical processor 1010 comprising the physical processor cores 1020 and 1030; and thread 1 can be executed on a logical processor 1060 comprising the physical processor cores 1040 and 1050. The logical processors can be composed by a runtime system that programs control registers of the processor 1000 and/or the physical block-based processor cores. For example, each of the logical processors can be configured by programming respective composition control registers and composition topology registers of the physical processor cores. As a specific example, the logical processor 1010 can be configured by: programming composition control registers of physical processor cores 1020 and 1030 so that each of the physical processor cores are composed as part of a logical processor and so that the L1 data caches are shared; and programming composition topology registers of physical processor cores 1020 and 1030 so that the physical processor cores 1020 and 1030 are grouped together. Thus, the physical processor cores 1020 and 1030 can be composed into a logical processor 1010 having a logical cache 1015. The L1 data cache of physical processor core 1020 can be a first bank of the logical cache 1015 and the L1 data cache of physical processor core 1030 can be a second bank of the logical cache 1015. The grouping of the physical processor cores 1020 and 1030 into the logical processor 1010 can be specified by programming only a number of physical processor cores in the composition topology registers of physical processor cores 1020 and 1030. Alternatively, the grouping of the physical processor cores 1020 and 1030 into the logical processor 1010 can be specified by programming a bitmap of the physical processor cores in the composition topology registers of physical processor cores 1020 and 1030.

Similarly, the logical processor 1060 can be configured by: programming composition control registers of physical processor cores 1040 and 1050 so that each of the physical processor cores are composed as part of a logical processor and so that the L1 data caches are shared; and programming composition topology registers of physical processor cores 1040 and 1050 so that the physical processor cores 1040 and 1050 are grouped together. Thus, the physical processor cores 1040 and 1050 can be composed into a logical processor 1060 having a logical cache 1065. The L1 data cache of physical processor core 1040 can be a first bank of the logical cache 1065 and the L1 data cache of physical processor core 1050 can be a second bank of the logical cache 1065.

Once the logical processors 1010 and 1060 are configured, the threads 0 and 1 can execute independently on the respective logical processors. For example, one instruction block of thread 0 can execute non-speculatively on a physical processor core (e.g., physical processor core 1020) and a different instruction block of thread 0 can execute speculatively on a different physical processor core (e.g., physical processor core 1030). When the non-speculative instruction block is committed, the formerly speculative execution block can become non-speculative if the block was correctly predicted and if the block is the oldest block executing within the thread. An instruction block executing on one physical processor core can access the logical cache that is distributed across both physical processor cores 1020 and 1030. Thus, the logical cache can provide a larger cache than compared with only using the physical cache of a single physical processor core.

The physical block-based processor cores 1080-1083 can be powered down to save energy. For example, each of the physical processor cores 1080-1083 can be powered down by programming respective composition control registers or other power control registers of the respective physical processor cores. Powering down the physical processor cores 1080-1083 can include putting the physical processor cores 1080-1083 in a low-power mode. For example, the physical processor cores 1080-1083 can be clock gated, clocked at a reduced frequency, powered at a lower voltage, or powered off.

FIG. 11 illustrates an example of a processor 1100 comprising eight physical block-based processor cores arranged in a two column by four row array. The processor 1100 is illustrated during execution of a single thread of a program. The thread can include one or more instruction blocks that can be executed on the physical processor core 1120. The physical processor core 1120 can access a logical data cache 1140 that extends beyond the physical processor core 1120. The logical data cache 1140 can be composed by a runtime system that programs control registers of the processor 1100 and/or the physical block-based processor cores. As a specific example, the logical data cache 1140 can be configured by: programming a composition control register of the physical processor core 1120 so that the L1 data cache is shared and the physical processor core is powered up and not composed; programming a composition control register of the physical processor core 1130 so that the majority of the physical processor core is powered down and the L1 data cache is powered up and shared; and programming composition topology registers of the physical processor cores 1120 and 1130 so that the physical processor cores 1120 and 1130 are grouped together. Thus, the physical processor cores 1120 and 1130 can be grouped so that the physical processor core 1120 can execute instruction blocks of the thread using a logical data cache 1140 that is double the size of the physical data cache of a single physical processor core. This may result in higher performance through a lower miss-rate in the data cache compared to executing the thread with a single physical processor core, and in lower power for executing the thread compared to having both of the physical processor cores 1120 and 1130 execute the thread.

FIG. 12 illustrates an example of a processor 1200 comprising eight physical block-based processor cores arranged in a two column by four row array. The processor 1200 is illustrated during execution of a program having multiple threads including thread 0 and thread 1. Each of the threads can include one or more instruction blocks that can be executed on a logical processor of the processor 1200. For example, thread 0 can be executed on a logical processor comprising the physical processor core 1220; and thread 1 can be executed on a logical processor comprising the physical processor core 1230. The logical processors and threads can share a logical data cache 1240. For example, this may be beneficial when the different threads are reading from a common data set. The logical processors and logical cache can be composed by a runtime system that programs control registers of the processor 1200 and/or the physical block-based processor cores. As a specific example, the processor configuration can be configured by: programming a composition control register of physical processor core 1220 so that the L1 data cache is shared and the physical processor core 1220 is powered up and not composed; programming a composition control register of physical processor core 1230 so that the L1 data cache is shared and the physical processor core 1230 is powered up and not composed; and programming composition topology registers of physical processor cores 1220 and 1230 so that the physical processor cores 1220 and 1230 are grouped together. Thus, the physical processor cores 1220 and 1230 can execute independent threads that share a logical cache 1240. This may result in higher performance through a lower miss-rate in the data cache compared to executing the threads using a single data cache within a physical processor core.

X. Example Methods of Programming a Processor

Figure 13:
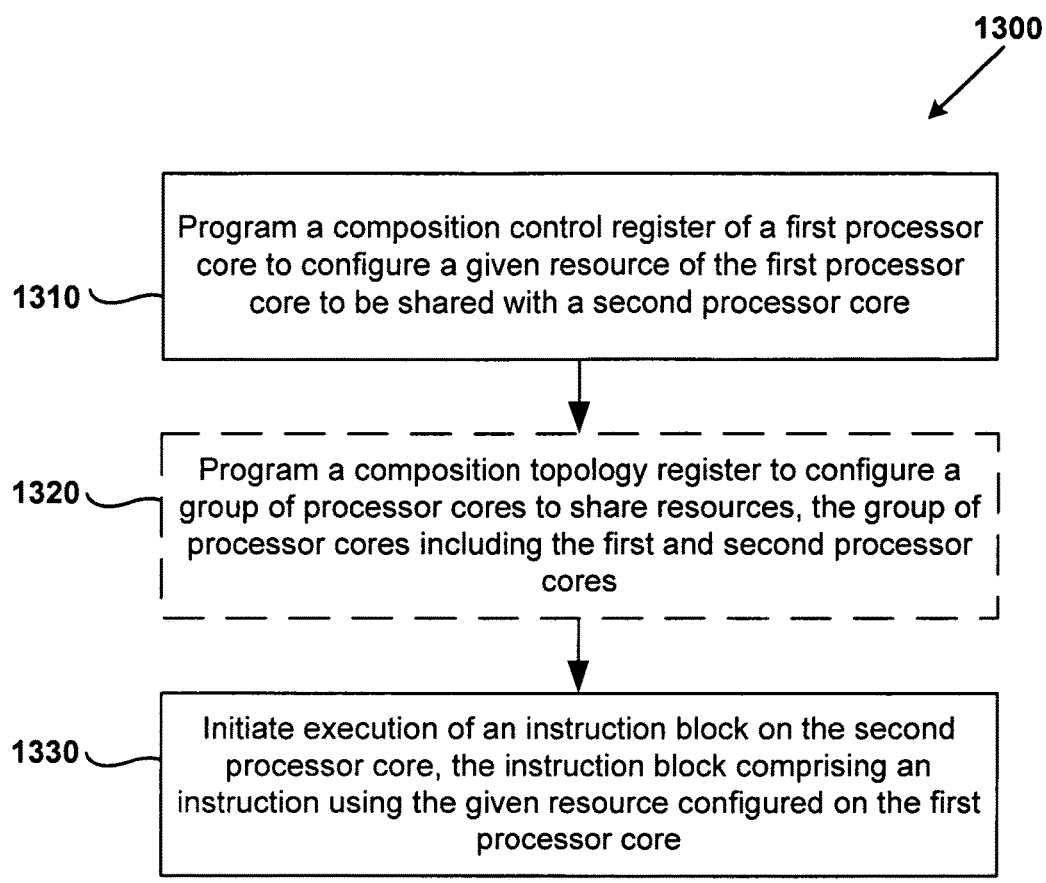
FIGS. 13 and 14 are flowcharts illustrating example methods of programming a processor to execute a thread using a logical processor and/or a logical resource, as can be performed in some examples of the disclosed technology.
Figure 14:
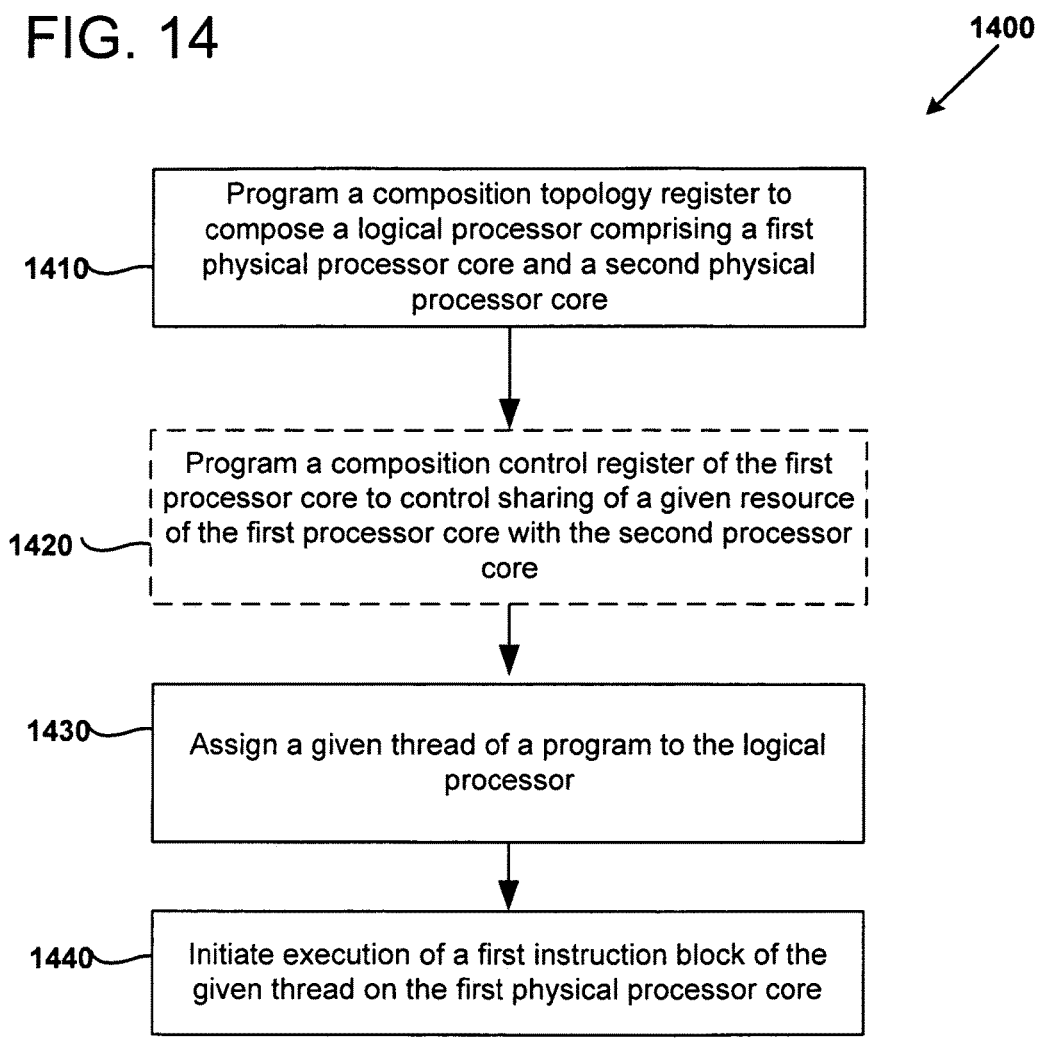

FIGS. 13 and 14 are flowcharts illustrating example methods of programming a processor to execute a thread of a program using a logical processor and/or a logical resource. For example, the methods can be performed by a runtime system executing software instructions, at least in part, on a control unit of a processor or on a physical block-based processor core of the processor. FIG. 13 is a flowchart illustrating an example method 1300 for programming a processor to execute a thread of a program using a shared logical resource. For example, the processor can include a plurality of block-based physical processor cores including a first physical processor core and a second physical processor core. A respective physical processor core can include one or more sharable resources, such as a cache, a register file, an execution unit, and/or various other logical or mathematical components.

At process block 1310, a composition control register of the first physical processor core can be programmed to configure a given resource of the first physical processor core to be shared with a second physical processor core. For example, a program can include a thread initialization instruction block and the first physical processor core can be programmed using instructions of the thread initialization instruction block during a runtime of the program. The thread initialization instruction block can be executing on any of the plurality of physical processor cores or a control unit of the processor. The composition control register can be programmed by executing a store instruction to a memory-mapped address corresponding to the cache composition control register. System registers, such as the composition control register and the composition topology register, can be visible architectural state and so the values stored in the system registers may only be updated during a commit phase of the instruction block updating the system registers. Thus, the value to be written to the composition control register can be initially buffered when the store instruction is executed and the composition control register can be updated during a commit phase of the thread initialization instruction block.

As described above, one or more of the sharable resources can be shared with other physical processor cores to create a logical resource. The physical processor cores sharing the logical resource can have different relationships to each other. For example, the first processor core and the second processor core can be composed to form a logical processor core executing a single thread of the program. Thus, the logical resource can be shared within the single thread. As another example, the first processor core and the second processor core can be configured to execute different threads of the program. Thus, the logical resource can be shared across different threads.

The composition control register or a power control register of the first physical processor core can be programmed to configure the first physical processor core in different power modes when the given resource of the first physical processor core is shared with the second physical processor core. For example, the first physical processor core can be in a low-power mode. As a specific example, the resources of the first physical processor core can default to a low-power mode unless a particular resource is shared among the different physical processor cores. Thus, by selecting only a cache of the first physical processor core to be shared, the cache can be powered up in an operational mode and the rest of the first physical processor core can be in a low-power mode. By powering down portions of the first physical processor core, energy can be saved when executing the program.

At process block 1320, a composition topology register can be optionally programmed to configure a group of physical processor cores to share resources. For example, the group of physical processor cores can include the first physical processor core and the second physical processor core. The group of physical processor cores can be specified by providing a bitmap of the group or by providing a number of physical processor cores of the group. For example, the bitmap can be used to specify physical processor cores from anywhere on the processor, whether the physical processor cores are adjacent or not adjacent to each other. As another example, providing the number of physical processor cores can form an automatic grouping based on the number in the group and the topology of the processor.

At process block 1330, execution of an instruction block can be initiated on the second physical processor core. The instruction block can include an instruction using the given sharable resource configured on the first physical processor core so that the instruction is executed on the second physical processor core using the sharable resource of the first physical processor core. For example, the execution of an instruction block can be initiated on the second physical processor core by allocating the instruction block to the second physical processor core. In particular, an address corresponding to the instruction block can be loaded into a program counter of the second physical processor core so that the second physical processor core can fetch and execute the instruction block.

FIG. 14 is a flowchart illustrating an example method 1400 for programming a logical processor to execute a thread of a program. For example, the processor can include a plurality of block-based physical processor cores including a first physical processor core and a second physical processor core. A respective physical processor core can include one or more sharable resources, such as a cache, a register file, an execution unit, and/or various other logical or mathematical components.

At process block 1410, a composition topology register can be programmed to compose a logical processor including the first physical processor core and the second physical processor core. For example, the composition topology register can be programmed during a runtime of a program, such as by executing instructions of a thread initialization instruction block for a given thread. The logical processor can be used to execute non-speculative and speculative instruction blocks of the given thread of the program. The physical processor cores of the logical processor can be specified by providing a bitmap of the group or by providing a number of physical processor cores of the group. For example, the bitmap can be used to specify physical processor cores from anywhere on the processor, whether the physical processor cores are physically proximate or not. As another example, providing the number of physical processor cores can form an automatic grouping based on the number in the group and the topology of the processor.

The runtime system can be designed to run on a variety of different platforms and it can select the physical processor cores of the logical core based on various factors such as the topology of the processor, a utilization of the physical processor cores, or a fixed mapping of functions within the processor. As one example, a processor topology register can store topology information about the processor, such as an arrangement of the physical processor cores. Thus, the runtime system can be executed on a processor having physical processor cores arranged in a 1×4, 2×2, 2×4, 4×4, 8×8, 4×8, or other sized array. Using the topology information, the runtime system can determine which physical processor cores are physically adjacent and/or physically close to each other. It may be desirable for the physical processor cores of the logical core to be close together to reduce communication delays between the physical processor cores. The runtime system can maintain a list of idle physical processor cores. The runtime system can prioritize selecting physical processor cores of the logical core from an area of the processor where a sufficient number of idle and adjacent physical processor cores are present. Alternatively, the runtime system can select the physical processor cores of the logical core using idle physical processor cores from anywhere on the processor.

At process block 1420, a composition control register of the first physical processor core can optionally be programmed to control sharing of a given resource of the first physical processor core with a second physical processor core. For example, controlling the sharing of the given resource can include keeping the given resource private to the first physical processor core. Thus, within a logical processor, respective physical processor cores can have private resources that are not shared among other physical processor cores of the logical processor. As another example, controlling the sharing of the given resource can include sharing the given resource with the second physical processor core. When the given resource is shared, it can be part of a larger logical resource. The composition control register of the first physical processor core may also be programmed to configure the first physical processor core in different power modes. As a specific example, a cache of the first physical processor core can be in a low-power mode and not used by the logical processor. This may be beneficial when the first physical processor core is added to an existing logical processor and it is desired that the caches not be remapped. Additionally, the data set of a thread may be small and powering down the cache of the first physical processor core may save energy when executing the program.

At process block 1430, a given thread of the program can be assigned to the logical processor. For example, the logical processor can be reserved for instruction blocks associated with a thread identifier of the given thread. A logical core number can be assigned to the logical processor and stored in a logical core number register of each physical processor core of the logical processor. The logical core number can be the same as the thread identifier or can be associated with the thread identifier.

At process block 1440, execution of a first instruction block of the given thread can be initiated on the first physical processor core of the logical processor. For example, an address of the first instruction block can be loaded onto the first physical processor core so that the instructions of the first instruction block can be fetched and executed by the first physical processor core. As a specific example, the thread initialization instruction block can store the address of the first instruction block of the given thread in a program counter register of the first physical processor core. The first instruction block (and the given thread) can begin execution when the thread initialization instruction block commits and the address of the first instruction block is updated in the program counter register.

XI. Example Methods of Executing a Program

Figure 15:
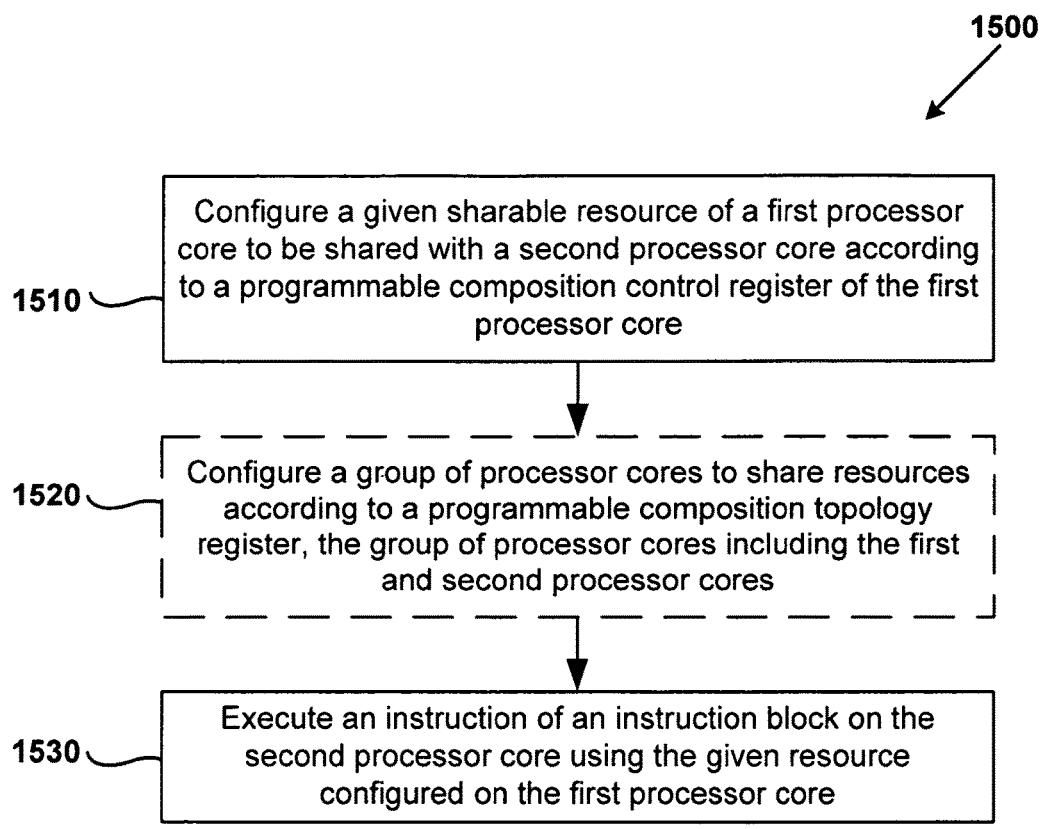
FIGS. 15-17 are flowcharts illustrating example methods of configuring and/or executing a thread of a program on a logical processor and/or a logical resource, as can be used in some examples of the disclosed technology.
Figure 16:
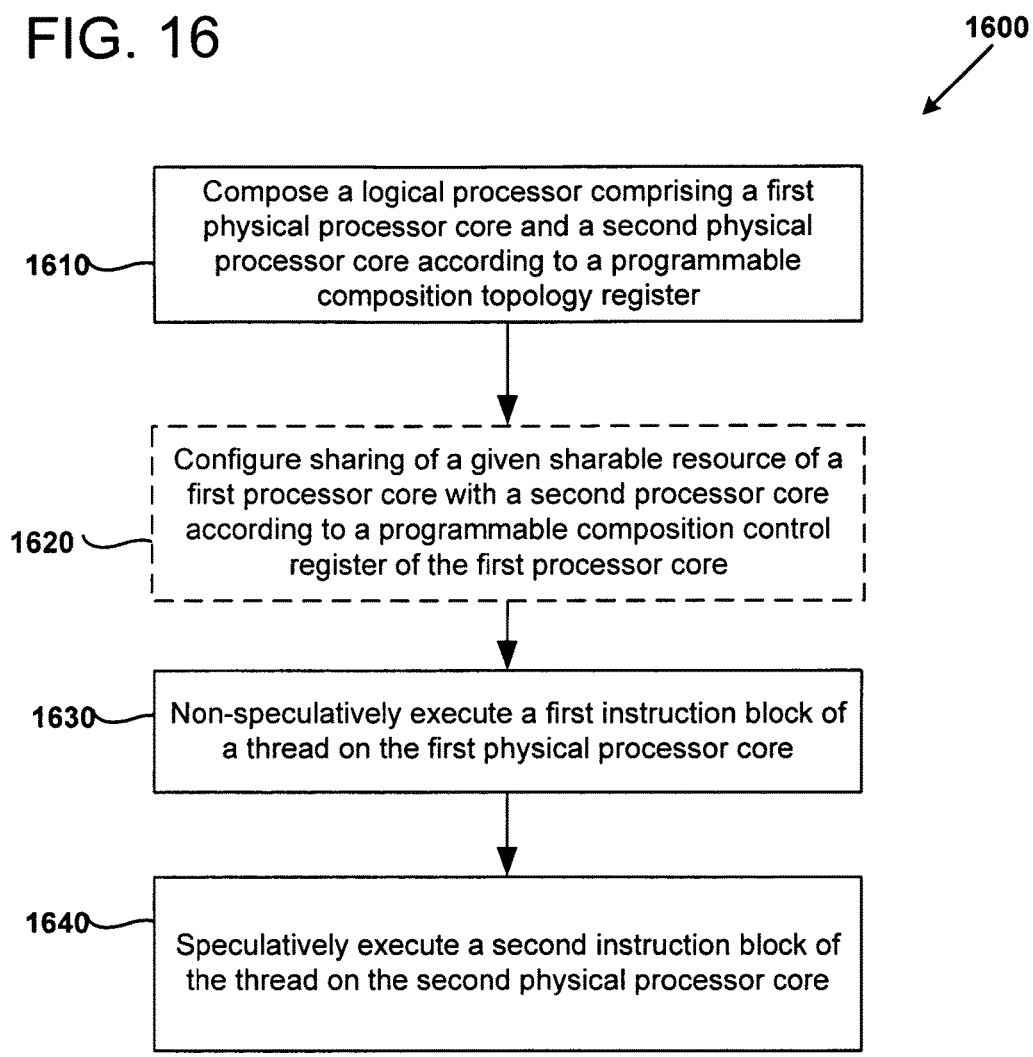
Figure 17:
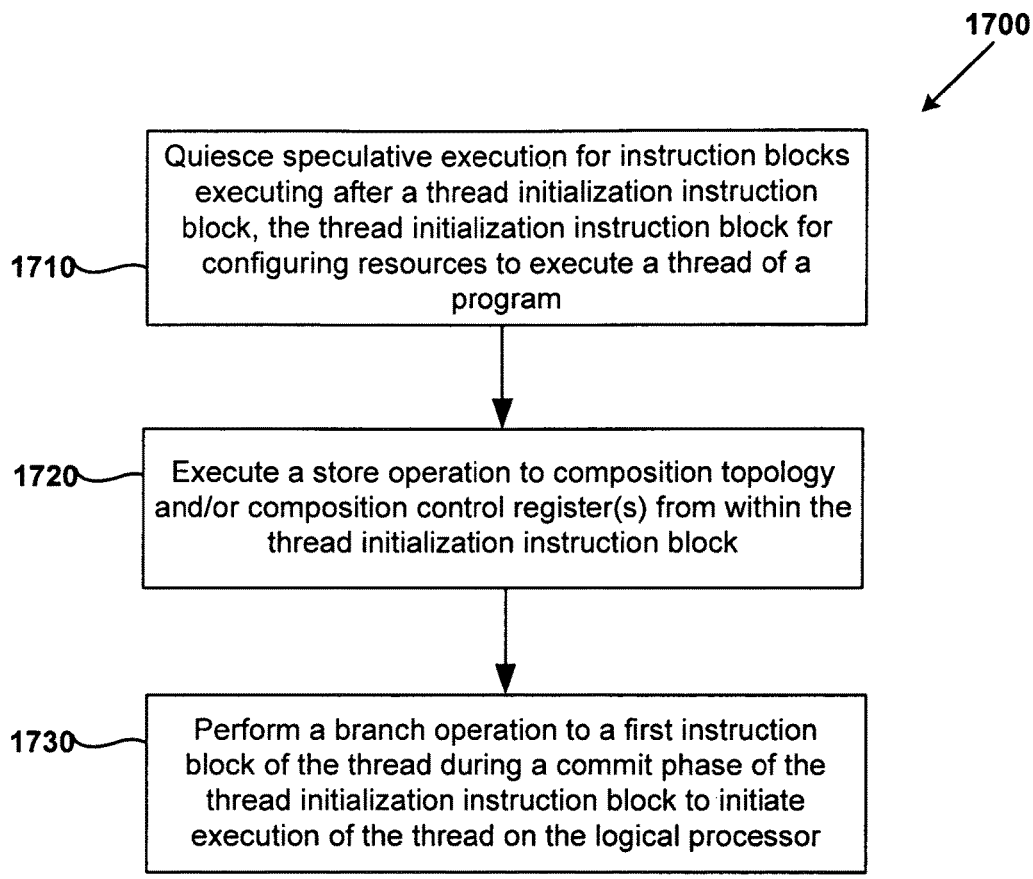

FIGS. 15-17 are flowcharts illustrating example methods of configuring and/or executing a thread of a program on a logical processor and/or a logical resource of a processor. For example, the processor can include a plurality of block-based physical processor cores including a first physical processor core and a second physical processor core. A respective physical processor core can include one or more sharable resources, such as a cache, a register file, an execution unit, and/or various other logical or mathematical components. The physical processor cores can be grouped or composed into logical processors. Similarly, the sharable resources of the physical processor cores can be grouped or composed into logical resources. FIG. 15 is a flowchart illustrating an example method 1500 for executing an instruction of a thread of a program on a physical processor core using a shared logical resource.

At process block 1510, a given resource of the first physical processor core can be configured to be shared with a second physical processor core according to a programmable composition control register of the first physical processor core. For example, the composition control register can be programmed by a thread initialization instruction block during a runtime of the program. The given resource can be configured to be shared when the thread initialization instruction block when the thread initialization instruction block is committed. The given resource can be configured to be part of a larger logical resource. For example, the given resource can be a cache and the given resource can be a bank of a larger logical cache. The sharable resources of the first physical processor core can be selectively shared so that a first resource may be shared and other resources are not shared. The resources that are not shared can be used locally by the first physical processor core or the non-shared resources can be powered down. For example, the given resource can be the only major functional unit of the first physical processor core to be powered up and operational.

At process block 1520, a group of physical processor cores can be optionally configured to share resources according to a programmable composition topology register. For example, the group of physical processor cores can include the first physical processor core and the second physical processor core. The group of physical processor cores can be specified by a bitmap of the group within fields of the composition topology register. Alternatively, the group of physical processor cores can be specified by a number of physical processor cores of the group programmed into the composition topology register. For example, the bitmap can be used to specify physical processor cores from anywhere on the processor, whether the physical processor cores are adjacent or not adjacent to each other. As another example, the number of physical processor cores can form an automatic grouping based on the number in the group and the topology of the processor. Specifically, there can be a fixed mapping of physical processor cores to logical processors for a given size of the logical processor, such as described in reference to FIG. 7.

At process block 1530, an instruction of an instruction block can be executed on the second physical processor core using the sharable resource of the first physical processor core. Specifically, the decoded instruction can be stored in an instruction window of the second physical processor core and issued for execution by instruction issue or scheduling logic of the second physical processor core. The sharable resource of the first physical processor core is used for the execution of the instruction. As one example, an operand of the instruction can be loaded or read from the sharable resource. As another example, the instruction can be partially or fully executed using a shared execution unit of the first physical processor core. As another example, the instruction can store or write an output result to the sharable resource.

Executing the instruction can include various steps or micro-operations of the instruction including: managing communication between the second physical processor core and the first physical processor core; mapping an index field associated with the instruction to the sharable resource; scheduling micro-operations of the instruction; and marking the instruction as complete in the instruction window of the second physical processor core. The instruction can take multiple clock cycles to complete to account for communication delays between the second physical processor core and the first physical processor core.

FIG. 16 is a flowchart illustrating an example method 1600 for executing a thread of a program on a logical processor. For example, the processor can include a plurality of block-based physical processor cores including a first physical processor core and a second physical processor core. A respective physical processor core can include one or more sharable resources, such as a cache, a register file, an execution unit, and/or various other logical or mathematical components. The physical processor cores can be grouped or composed into logical processors. Similarly, the sharable resources of the physical processor cores can be grouped or composed into logical resources.

At process block 1610, a logical processor can be composed according to a programmable composition topology register. The logical processor can include the first physical processor core and the second physical processor core. For example, the composition topology register can be programmed during a runtime of a program, such as by executing instructions of a thread initialization instruction block for a thread. The logical processor can be used to execute non-speculative and speculative instruction blocks of the thread of the program. The physical processor cores of the logical processor can be specified by providing a bitmap of the group or by providing a number of physical processor cores of the group. For example, the bitmap can be used to specify individual physical processor cores from anywhere on the processor. As another example, the physical processor cores of the group can have a fixed mapping depending on the number in the group and the topology of the processor.

At process block 1620, a given resource of the first physical processor core can optionally be configured to be shared with the second physical processor core according to a composition control register of the first physical processor core. The sharable resources of the physical processor cores can have a default setting to indicate whether the resource is shared with other physical processor cores. For example, the sharable resources can be private within the physical processor cores by default. As another example, the sharable resources can be shared among the physical processor cores of a logical processor by default. Different sharable resources can have different default settings. For example, a cache can default to being shared among the physical processor cores of a logical processor and an execution unit can default to being private within its physical processor core. The composition control register can be used to override the default sharing settings by programming a different sharing setting in the composition control register.

At process block 1630, a first instruction block of the thread can be non-speculatively executed on the first physical processor core. A thread can have a single non-speculative instruction block executing at a given time. The non-speculative instruction block is the first issued or oldest instruction block of the thread. Additional instruction blocks of the thread can begin on different instruction windows or different physical processor cores before the non-speculative instruction block is committed. However, the additional instruction blocks are speculative until it is known that the additional instruction blocks will commit. For example, the non-speculative instruction block may receive an interrupt to be serviced before the additional instruction blocks can be committed. As another example, the additional instruction blocks may be on a mispredicted path. When the non-speculative block commits, it can send a commit signal along with an exit branch address to all other physical processor cores of the logical processor. Speculative blocks on the correct path can continue to execute, while blocks on non-taken paths can be aborted.

Non-speculative execution of the first instruction block can include: predicting a branch target address of the first instruction block so that a path for speculative instruction blocks of the thread can be determined; sending the predicted branch target address to one or more physical processor cores of the logical processor; executing an instruction of the first instruction block using a logical resource shared with another physical processor core; determining whether a commit condition is satisfied; beginning a commit phase when the commit condition is satisfied; and sending a commit signal and a target branch address to other physical processor cores of the logical processor when the commit phase is completed.

At process block 1640, a second instruction block of the thread can be speculatively executed on the second physical processor core. The second physical processor core can speculatively issue instructions until it is known whether the second instruction block is on a wrongly predicted path or until the second instruction block becomes the non-speculative instruction block. For example, if the starting address of the second instruction block matches the target branch address of the committing non-speculative instruction block, then the second instruction block can become the non-speculative instruction block. A speculative instruction block cannot commit, even if the speculative instruction block finishes execution before the non-speculative instruction block, until the speculative instruction block is transformed into the non-speculative instruction block.

Speculative execution of the second instruction block can include: fetching the second instruction block before the first instruction block commits; executing an instruction of the first instruction block using a logical resource shared with another physical processor core; comparing the starting address of the second instruction block to the target branch address when the commit signal is received; transforming the second instruction block into the non-speculative instruction block when the starting address of the second instruction block matches the target branch address when the commit signal is received; comparing a predicted path to an execution path; aborting the second instruction block when the predicted path is different from the executed path; and delaying a commit phase until after the second instruction block is the non-speculative instruction block.

In this manner, the physical processor cores of the logical processor can be used to execute the instruction blocks of the thread. Specifically, both speculative and non-speculative instruction blocks can be executed concurrently on the physical processor cores of the logical processor. When speculative paths are predicted correctly, the non-speculative instruction block can migrate between the physical processor cores by transforming one of the speculative instruction blocks into the non-speculative instruction block when the earlier non-speculative instruction block commits. The physical processor core selected to speculatively execute a respective instruction block of the thread can be selected according to an allocation policy. For example, the allocation policy can be round-robin scheduling of the physical processor cores of the logical processor.

FIG. 17 is a flowchart illustrating an example method 1700 for initiating execution of a thread of a program on a logical processor. For example, the processor can include a plurality of block-based physical processor cores. A respective physical processor core can include one or more sharable resources, such as a cache, a register file, an execution unit, and/or various other logical or mathematical components. The physical processor cores can be grouped or composed into logical processors. Similarly, the sharable resources of the physical processor cores can be grouped or composed into logical resources.

At 1710, speculative execution can be quiesced for instruction blocks executing after a thread initialization instruction block. The thread initialization instruction block can include instructions for configuring resources to execute a thread of a program. By quiescing or stopping speculative execution after the thread initialization instruction block, idle physical processor cores can be identified and programmed to compose a logical processor. The runtime system can dynamically track the idle physical processor cores so that composition of the logical processors can be based on current runtime information.

At 1720, a store operation to composition topology and/or composition control register(s) can be executed from within the thread initialization instruction block. For example, each physical processor core of a logical processor can have a composition topology register for specifying whether the physical processor core is composed as part of a logical processor core and whether resources of the physical processor core are shared. The composition topology register for respective physical processor cores of the logical processor can be programmed differently so that different resources of respective physical processor cores are shared. Each physical processor core of the logical processor can have a composition topology register for specifying a group of physical processor cores to be composed with and/or to share resources with.

At 1730, a branch operation to a first instruction block of the thread can be performed during a commit phase of the thread initialization instruction block to initiate execution of the thread on the logical processor. The branch operation can include loading an address of the first instruction block into a program counter of one of the physical processor cores of the logical processor. When the thread initialization instruction block is committed, the non-speculative instruction block will be the first instruction block of the thread. Thus, the thread can begin execution with the first instruction block.

XII. Example Computing Environment

Figure 18:
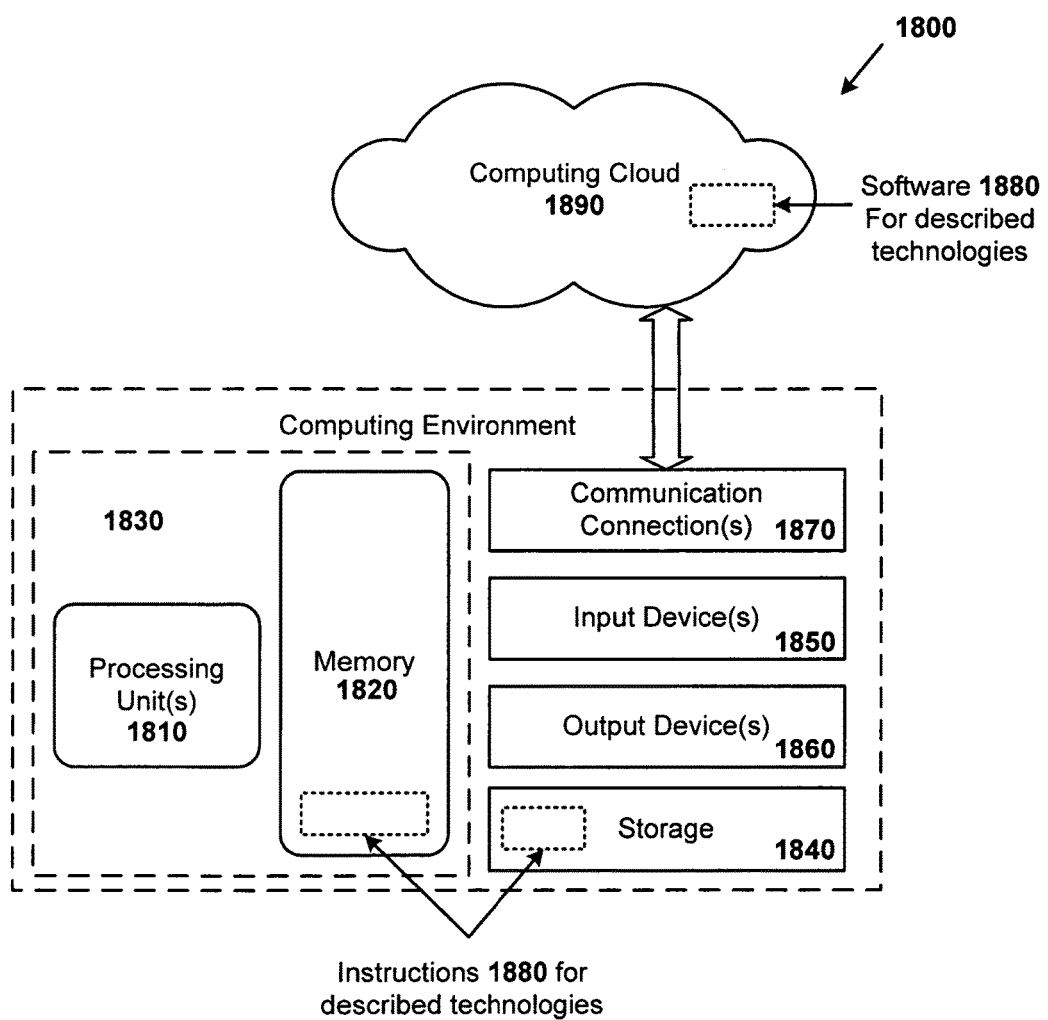
FIG. 18 is a block diagram illustrating a suitable computing environment for implementing some embodiments of the disclosed technology.

FIG. 18 illustrates a generalized example of a suitable computing environment 1800 in which described embodiments, techniques, and technologies can be implemented.

The computing environment 1800 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 18, the computing environment 1800 includes at least one block-based processing unit 1810 and memory 1820. In FIG. 18, this most basic configuration 1830 is included within a dashed line. The block-based processing unit 1810 executes computer-executable instructions and may be a real or a virtual processor. In a multi-processing system, multiple processing units execute computer-executable instructions to increase processing power and as such, multiple processors can be running simultaneously. The memory 1820 may be volatile memory (e.g., registers, cache, RAM), non-volatile memory (e.g., ROM, EEPROM, flash memory, etc.), or some combination of the two. The memory 1820 stores software 1880, images, and video that can, for example, implement the technologies described herein. A computing environment may have additional features. For example, the computing environment 1800 includes storage 1840, one or more input devices 1850, one or more output devices 1860, and one or more communication connections 1870. An interconnection mechanism (not shown) such as a bus, a controller, or a network, interconnects the components of the computing environment

1800. Typically, operating system software (not shown) provides an operating environment for other software executing in the computing environment 1800, and coordinates activities of the components of the computing environment 1800.

The storage 1840 may be removable or non-removable, and includes magnetic disks, magnetic tapes or cassettes, CD-ROMs, CD-RWs, DVDs, or any other medium which can be used to store information and that can be accessed within the computing environment 1800. The storage 1840 stores instructions for the software 1880, plugin data, and messages, which can be used to implement technologies described herein.

The input device(s) 1850 may be a touch input device, such as a keyboard, keypad, mouse, touch screen display, pen, or trackball, a voice input device, a scanning device, or another device, that provides input to the computing environment 1800. For audio, the input device(s) 1850 may be a sound card or similar device that accepts audio input in analog or digital form, or a CD-ROM reader that provides audio samples to the computing environment 1800. The output device(s) 1860 may be a display, printer, speaker, CD-writer, or another device that provides output from the computing environment 1800.

The communication connection(s) 1870 enable communication over a communication medium (e.g., a connecting network) to another computing entity. The communication medium conveys information such as computer-executable instructions, compressed graphics information, video, or other data in a modulated data signal. The communication connection(s) 1870 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1890. For example, disclosed compilers and/or block-based-processor servers are located in the computing environment 1830, or the disclosed compilers can be executed on servers located in the computing cloud 1890. In some examples, the disclosed compilers execute on traditional central processing units (e.g., RISC or CISC processors).

Computer-readable media are any available media that can be accessed within a computing environment 1800. By way of example, and not limitation, with the computing environment 1800, computer-readable media include memory 1820 and/or storage 1840. As should be readily understood, the term computer-readable storage media includes the media for data storage such as memory 1820 and storage 1840, and not transmission media such as modulated data signals.

XIII. Additional Examples of the Disclosed Technology

Additional examples of the disclosed subject matter are discussed herein in accordance with the examples discussed above.

In one embodiment, a processor includes a plurality of block-based physical processor cores for executing a program comprising a plurality of instruction blocks, and a respective block-based physical processor core includes a branch predictor and a programmable composition topology register. The branch predictor is configured to select an instruction block of the plurality of instruction blocks to be speculatively executed by a logical processor. The programmable composition topology register is used for assigning a number of physical processor cores of the plurality of block-based physical processor cores to the logical processor. The programmable composition topology register is dynamically programmable during execution of the program. The composition topology register can be programmable in part by performing a store instruction of an instruction block executing on any of the plurality of cores to a memory-mapped address corresponding to the composition topology register. A value of the composition topology register can be updated during a commit phase of the instruction block having the store instruction to the memory-mapped address corresponding to the composition topology register.

As one example, the physical processor cores of the logical processor can be determined only by the number of the physical processor cores programmed in the composition topology register and a position of the respective physical processor core within a topology of the processor. As another example, the physical processor cores of the logical processor can be programmed using a composition field of the composition topology register that identifies each physical processor core of the logical processor. As another example, the composition topology register can include a composition field and a mode field for specifying a meaning of the composition field. The composition field can provide a bit-map of the physical processor cores of the logical processor when the mode field is programmed with a first value. The composition field can provide only the number of the physical processor cores of the logical processor when the mode field is programmed with a second value.

The respective physical processor core can further include one or more sharable resources and a programmable composition control register. The one or more sharable resources can be configurable to be shared by the physical processor cores of the logical processor. For example, the one or more sharable resources can be used for executing instructions of instruction blocks executing on the logical processor. The programmable composition control register can be used for configuring which of the one or more sharable resources are shared with other physical processor cores of the logical processor.

The processor can be used in a variety of different computing systems. For example, a server computer can include non-volatile memory and/or storage devices; a network connection; memory storing one or more instruction blocks; and the processor including the block-based processor core for executing the instruction blocks. As another example, a device can include a user-interface component; non-volatile memory and/or storage devices; a cellular and/or network connection; memory storing one or more of the instruction blocks; and the processor including the block-based processor for executing the instruction blocks. The user-interface component can include at least one or more of the following: a display, a touchscreen display, a haptic input/output device, a motion sensing input device, and/or a voice input device.

In one embodiment, a processor includes a plurality of block-based physical processor cores for executing a program comprising a plurality of instruction blocks, and a respective block-based physical processor core includes a sharable resource and a programmable composition topology register. The sharable resource is configurable to be shared with a group of physical processor cores of the plurality of block-based physical processor cores. For example, the sharable resource can be used for executing instructions of instruction blocks executing on the group of physical processor cores. The programmable composition topology register is used for assigning the group of the physical processor cores that share the sharable resource. The programmable composition topology register is dynamically programmable during execution of the program. For example, a value of the cache composition topology register can be updated during a commit phase of an instruction block comprising a store instruction to a memory-mapped address corresponding to the cache topology control register.

As one example, the group of physical processor cores can be determined only by a number of the physical processor cores programmed in the composition topology register and a position of the respective physical processor core within a topology of the processor. As another example, the group of physical processor cores can be programmed using a composition field of the composition topology register that identifies each physical processor core of the group of physical processor cores. As a specific example, each physical processor core of the group of physical processor cores can be identified with a bitmap of the physical processor cores.

The respective physical processor core can further include a programmable composition control register for selecting the sharable resource from one or more sharable resources of the respective processor core. The one or more sharable resources can be selected from a data cache, a register file, or an execution unit.

In one embodiment, a method can be used to execute a program on a processor comprising a first physical processor core and a second physical processor core. The program includes a plurality of instruction blocks arranged in one or more threads. The method includes composing a logical processor comprising the first physical processor core and the second physical processor core according to a programmable composition topology register. The method includes non-speculatively executing a first instruction block of the thread on the first physical processor core. The method includes speculatively executing a second instruction block of the thread on the second physical processor core.

The method can include quiescing speculative execution for instruction blocks executing after a thread initialization instruction block; performing a store operation to the composition topology register from within the thread initialization instruction block; and performing a branch operation to the first instruction block during a commit phase of the thread initialization instruction block to initiate execution of the thread on the logical processor. The method can include during execution of the thread on the logical processor, selecting physical processor cores of the logical processor for speculatively executing instruction blocks of the thread according to an allocation policy. For example, the allocation policy can be round-robin scheduling of the physical processor cores of the logical processor. The method can include configuring sharing of a resource of the first physical processor core according to a programmable composition control register of the first physical processor core. The method can include using the resource of the first physical processor core when executing an instruction of the second instruction block on the second physical processor core.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. A processor comprising a plurality of physical processor cores for executing a program comprising a plurality of instruction blocks, the processor comprising:
   a branch predictor configured to select a first group of instructions to be speculatively executed by a logical processor; and
   a programmable composition topology register for assigning a number of physical processor cores of the plurality of physical processor cores to the logical processor, the programmable composition topology register being dynamically programmable during execution of the program, the composition topology register comprising a composition field and a mode field for specifying a meaning of the composition field, the composition field providing a bit-map of the physical processor cores of the logical processor when the mode field is programmed with a first value, and the composition field providing the number of the physical processor cores of the logical processor when the mode field is programmed with a second value.

2. The processor of claim 1, wherein the physical processor cores of the logical processor are determined by the number of the physical processor cores programmed in the composition topology register and a position of the respective physical processor core within a topology of the processor.

3. The processor of claim 1, wherein the physical processor cores of the logical processor are programmed using a composition field of the composition topology register that identifies each physical processor core of the logical processor.

4. The processor of claim 1, further comprising:
   one or more sharable resources configurable to be shared by the physical processor cores of the logical processor, the one or more sharable resources used for executing instructions executing on the logical processor; and
   a programmable composition control register for configuring which of the one or more sharable resources are shared with other physical processor cores of the logical processor.

5. The processor of claim 1, wherein the composition topology register is programmable in part by performing a store instruction executing on any of the plurality of cores to a memory-mapped address corresponding to the composition topology register.

6. The processor of claim 5, wherein a value of the composition topology register is updated during a commit phase of the store instruction to the memory-mapped address corresponding to the composition topology register.

7. A processor comprising a plurality of physical processor cores for executing a plurality of instructions, a respective physical processor core comprising:
   a sharable resource configurable to be shared with a group of physical processor cores of the plurality of physical processor cores, the sharable resource used for executing instructions on the group of physical processor cores; and a programmable composition topology register for assigning the group of the physical processor cores that share the sharable resource, the programmable composition topology register being dynamically programmable during execution of the program, wherein the group of physical processor cores is programmed using a composition field of the composition topology register that identifies each physical processor core of the group of physical processor cores, and each physical processor core of the group of physical processor cores is identified with a bitmap of the physical processor cores.

8. The processor of claim 7, wherein the respective physical processor core further comprises:

a programmable composition control register for selecting the sharable resource from one or more sharable resources of the respective processor core.

9. The processor of claim 8, wherein the one or more sharable resources are selected from a data cache, a register file, or an execution unit.

10. The processor of claim 7, wherein a value of a cache composition topology register is updated during a commit phase of a store instruction to a memory-mapped address corresponding to a cache topology control register.

11. A method of executing a program on a processor comprising a first physical processor core and a second physical processor core, the program comprising a plurality of instructions arranged in one or more threads, the method comprising:

composing a logical processor comprising the first physical processor core and the second physical processor core according to a value stored in a composition topology register, the composition topology register comprising a composition field that identifies each physical processor core of a logical processor using a bitmap of the physical processor cores, the value stored in the composition topology register representing the bitmap of the physical processor cores;

non-speculatively executing a first set of instuctions of the thread on the first physical processor core; and speculatively executing a second set of instructions of the thread on the second physical processor core.

12. The method of claim 11, further comprising:

quiescing speculative execution for instructions executing after a plurality of thread initialization instructions;

performing a store operation to the composition topology register from within the plurality of thread initialization instruction blocks; and performing a branch operation to the first set of instructions during a commit phase of the plurality of thread initialization instructions to initiate execution of the thread on the logical processor.

13. The method of claim 11, further comprising:

during execution of the thread on the logical processor, selecting physical processor cores of the logical processor for speculatively executing instructions of the thread according to an allocation policy.

14. The method of claim 13, wherein the allocation policy is round-robin scheduling of the physical processor cores of the logical processor.

15. The method of claim 11, further comprising:

configuring sharing of a resource of the first physical processor core according to a composition control register of the first physical processor core.

16. The method of claim 15, further comprising:

using the resource of the first physical processor core when executing an instruction of the second set of instructions on the second physical processor core.

17. The method of claim 11, wherein the value stored in the composition topology register is generated by committing a store to an address mapped to the composition topology register of the processor.

* * * * *